(12) United States Patent
Ben-Yoseph

(10) Patent No.: US 9,531,826 B2
(45) Date of Patent: Dec. 27, 2016

(54) MANAGING ELECTRONIC MESSAGES BASED ON INFERENCE SCORES

(75) Inventor: Roy Ben-Yoseph, Ashburn, VA (US)

(73) Assignee: FACEBOOK, INC., Menlo Park, CA (US)

(*) Notice: Subject to any disclaimer, the term of this patent is extended or adjusted under 35 U.S.C. 154(b) by 128 days.

(21) Appl. No.: 13/615,134

(22) Filed: Sep. 13, 2012

(65) Prior Publication Data

US 2013/0066991 A1 Mar. 14, 2013

Related U.S. Application Data

(63) Continuation of application No. 13/372,371, filed on Feb. 13, 2012, now Pat. No. 8,874,672, which is a continuation of application No. 10/747,682, filed on Dec. 30, 2003, now Pat. No. 8,117,265.

(60) Provisional application No. 60/488,376, filed on Jul. 21, 2003, provisional application No. 60/457,320, filed on Mar. 26, 2003.

(51) Int. Cl.
| | |
|---|---|
| *G06F 15/16* | (2006.01) |
| *G06F 3/00* | (2006.01) |
| *H04L 29/08* | (2006.01) |
| *H04L 12/58* | (2006.01) |

(52) U.S. Cl.
CPC .......... *H04L 67/24* (2013.01); *H04L 12/5815* (2013.01); *H04L 51/043* (2013.01); *H04L 67/36* (2013.01); *H04L 12/585* (2013.01)

(58) Field of Classification Search
CPC ....... G06Q 10/10; G06Q 10/107; H04L 29/06; H04L 29/08072; H04L 29/06027; H04L 12/581; H04L 12/585; H04L 12/58; H04L 12/5855; H04L 29/0899

USPC .................................................. 709/206, 204
See application file for complete search history.

(56) References Cited

U.S. PATENT DOCUMENTS

| | | | |
|---|---|---|---|
| 4,323,987 A | 4/1982 | Holtz et al. | |
| 4,365,293 A | 12/1982 | Holtz | |
| 4,517,561 A | 5/1985 | Burke et al. | |
| 4,650,927 A | 3/1987 | James | |
| 4,817,129 A | 3/1989 | Riskin | |
| 4,837,798 A | 6/1989 | Cohen et al. | |
| 4,860,339 A | 8/1989 | D'Agosto et al. | |
| 5,008,853 A | 4/1991 | Bly et al. | |
| 5,021,949 A | 6/1991 | Morten et al. | |

(Continued)

FOREIGN PATENT DOCUMENTS

| | | |
|---|---|---|
| CA | 2547240 | 12/2009 |
| CA | 2506417 | 6/2011 |

(Continued)

OTHER PUBLICATIONS

U.S. Appl. No. 11/023,652, Apr. 29, 2014, Office Action.

(Continued)

*Primary Examiner* — David Lozaro
*Assistant Examiner* — Mahran Abu Roumi
(74) *Attorney, Agent, or Firm* — Keller Jolley Preece

(57) ABSTRACT

The people a user is presumed to know or be associated with may be determined using a number of techniques. This information about people that the user knows is used in relation to the user's communications. For example access to a user's online presence may be restricted based on the known people such that access to presence is provided only to those people that the user knows.

40 Claims, 16 Drawing Sheets

(56) References Cited

U.S. PATENT DOCUMENTS

| | | |
|---|---|---|
| 5,025,252 A | 6/1991 | DeLuca et al. |
| 5,086,394 A | 2/1992 | Shapira |
| 5,101,424 A | 3/1992 | Clayto et al. |
| 5,251,248 A | 10/1993 | Tokunaga et al. |
| 5,276,905 A | 1/1994 | Hurst et al. |
| 5,315,636 A | 5/1994 | Patel |
| 5,327,486 A | 7/1994 | Wolff et al. |
| 5,329,619 A | 7/1994 | Page et al. |
| 5,351,235 A | 9/1994 | Lahtinen |
| 5,377,354 A | 12/1994 | Scannell et al. |
| 5,425,028 A | 6/1995 | Bitton et al. |
| 5,436,960 A | 7/1995 | Campana, Jr. et al. |
| 5,438,611 A | 8/1995 | Campana, Jr. et al. |
| 5,440,551 A | 8/1995 | Suzuki |
| 5,448,566 A | 9/1995 | Richter et al. |
| 5,448,567 A | 9/1995 | Dighe et al. |
| 5,459,458 A | 10/1995 | Richardson et al. |
| 5,479,472 A | 12/1995 | Campana, Jr. et al. |
| 5,487,100 A | 1/1996 | Kane |
| 5,491,800 A | 2/1996 | Goldsmith et al. |
| 5,497,463 A | 3/1996 | Stein et al. |
| 5,499,343 A | 3/1996 | Pettus |
| 5,548,637 A | 8/1996 | Heller |
| 5,553,110 A | 9/1996 | Sentoku et al. |
| 5,557,320 A | 9/1996 | Krebs |
| 5,557,659 A | 9/1996 | Hyde-Thomson |
| 5,559,949 A | 9/1996 | Reimer et al. |
| 5,561,703 A | 10/1996 | Arledge et al. |
| 5,568,536 A | 10/1996 | Tiller et al. |
| 5,572,643 A | 11/1996 | Judson |
| 5,579,472 A | 11/1996 | Keyworth, II et al. |
| 5,583,920 A | 12/1996 | Wheeler, Jr. |
| 5,590,133 A | 12/1996 | Bilstrom et al. |
| 5,592,538 A | 1/1997 | Kosowsky et al. |
| 5,604,788 A | 2/1997 | Tett |
| 5,608,786 A | 3/1997 | Gordon |
| 5,610,910 A | 3/1997 | Focsaneanu et al. |
| 5,615,336 A | 3/1997 | Robson et al. |
| 5,619,648 A | 4/1997 | Canale et al. |
| 5,625,670 A | 4/1997 | Campana, Jr. et al. |
| 5,631,946 A | 5/1997 | Campana, Jr. et al. |
| 5,634,129 A | 5/1997 | Dickinson |
| 5,646,982 A | 7/1997 | Hogan et al. |
| 5,650,994 A | 7/1997 | Daley |
| 5,673,308 A | 9/1997 | Akhavan |
| 5,678,179 A | 10/1997 | Turcotte et al. |
| 5,684,494 A | 11/1997 | Nathrath et al. |
| 5,694,616 A | 12/1997 | Johnson |
| 5,697,060 A | 12/1997 | Akahane |
| 5,706,211 A | 1/1998 | Beletic et al. |
| 5,706,501 A | 1/1998 | Horikiri |
| 5,710,884 A | 1/1998 | Dedrick |
| 5,721,906 A | 2/1998 | Siefert |
| 5,724,410 A | 3/1998 | Parvulescu et al. |
| 5,726,984 A | 3/1998 | Kubler et al. |
| 5,737,726 A | 4/1998 | Cameron et al. |
| 5,742,668 A | 4/1998 | Pepe et al. |
| 5,742,905 A | 4/1998 | Pepe et al. |
| 5,749,081 A | 5/1998 | Whiteis et al. |
| 5,760,771 A | 6/1998 | Blonder et al. |
| 5,761,196 A | 6/1998 | Ayerst et al. |
| 5,764,916 A | 6/1998 | Busey et al. |
| 5,771,280 A | 6/1998 | Johnson et al. |
| 5,774,670 A | 6/1998 | Montulli |
| 5,774,673 A | 6/1998 | Beuk |
| 5,790,800 A | 8/1998 | Gauvin et al. |
| 5,793,365 A | 8/1998 | Tang et al. |
| 5,793,762 A | 8/1998 | Penners et al. |
| 5,796,394 A | 8/1998 | Wicks et al. |
| 5,796,948 A | 8/1998 | Cohen |
| 5,799,157 A | 8/1998 | Escallon |
| 5,799,284 A | 8/1998 | Bourquin |
| 5,802,466 A | 9/1998 | Gallant et al. |
| 5,802,470 A | 9/1998 | Gaulke et al. |
| 5,806,692 A | 9/1998 | Pepper |
| 5,812,770 A | 9/1998 | Sakai |
| 5,812,865 A | 9/1998 | Theimer et al. |
| 5,819,084 A | 10/1998 | Shapiro et al. |
| 5,826,025 A | 10/1998 | Gramlich |
| 5,831,611 A | 11/1998 | Kennedy et al. |
| 5,835,089 A | 11/1998 | Skarbo et al. |
| 5,835,722 A | 11/1998 | Bradshaw et al. |
| 5,835,724 A | 11/1998 | Smith |
| 5,835,905 A | 11/1998 | Pirolli et al. |
| 5,845,073 A | 12/1998 | Carlin et al. |
| 5,845,300 A | 12/1998 | Comer et al. |
| 5,848,134 A | 12/1998 | Sekiguchi et al. |
| 5,850,594 A | 12/1998 | Cannon et al. |
| 5,859,979 A | 1/1999 | Tung et al. |
| 5,864,684 A | 1/1999 | Nielsen |
| 5,864,874 A | 1/1999 | Shapiro |
| 5,867,162 A | 2/1999 | O'Leary |
| 5,870,744 A | 2/1999 | Sprague |
| 5,872,521 A | 2/1999 | Lopatukin et al. |
| 5,878,219 A | 3/1999 | Vance, Jr. et al. |
| 5,878,233 A | 3/1999 | Schloss |
| 5,878,397 A | 3/1999 | Stille et al. |
| 5,889,799 A | 3/1999 | Grossman et al. |
| 5,893,091 A | 4/1999 | Hunt et al. |
| 5,893,099 A | 4/1999 | Schreiber et al. |
| 5,895,454 A | 4/1999 | Harrington |
| 5,896,321 A | 4/1999 | Miller et al. |
| 5,897,635 A | 4/1999 | Torres et al. |
| 5,903,726 A | 5/1999 | Donovan et al. |
| 5,913,032 A | 6/1999 | Schwartz et al. |
| 5,919,247 A | 7/1999 | Van Hoff et al. |
| 5,920,692 A | 7/1999 | Nguyen et al. |
| 5,933,477 A | 8/1999 | Wu |
| 5,938,725 A | 8/1999 | Hara |
| 5,940,379 A | 8/1999 | Startup et al. |
| 5,940,488 A | 8/1999 | DeGrazia et al. |
| 5,944,791 A | 8/1999 | Scherpbier |
| 5,946,616 A | 8/1999 | Schornack |
| 5,946,617 A | 8/1999 | Portaro et al. |
| 5,946,629 A | 8/1999 | Sawyer et al. |
| 5,946,630 A | 8/1999 | Willars et al. |
| 5,948,058 A | 9/1999 | Kudoh et al. |
| 5,950,193 A | 9/1999 | Kulkarni |
| 5,951,643 A | 9/1999 | Shelton et al. |
| 5,951,646 A | 9/1999 | Brandon |
| 5,951,652 A | 9/1999 | Ingrassia, Jr. et al. |
| 5,954,798 A | 9/1999 | Shelton et al. |
| 5,956,716 A | 9/1999 | Kenner et al. |
| 5,960,074 A | 9/1999 | Clark |
| 5,960,173 A | 9/1999 | Tang et al. |
| 5,960,429 A | 9/1999 | Peercy et al. |
| 5,961,620 A | 10/1999 | Trent et al. |
| 5,966,663 A | 10/1999 | Gleason |
| 5,966,714 A | 10/1999 | Huang et al. |
| 5,970,122 A | 10/1999 | LaPorta et al. |
| 5,974,446 A | 10/1999 | Sonnenreich et al. |
| 5,978,673 A | 11/1999 | Alperovich et al. |
| 5,983,369 A | 11/1999 | Bakoglu et al. |
| 5,987,113 A | 11/1999 | James |
| 5,987,376 A | 11/1999 | Olson et al. |
| 5,987,407 A | 11/1999 | Wu et al. |
| 5,991,791 A | 11/1999 | Siefert |
| 5,995,023 A | 11/1999 | Kreft |
| 5,999,932 A | 12/1999 | Paul |
| 6,002,402 A | 12/1999 | Schacher |
| 6,006,179 A | 12/1999 | Wu et al. |
| 6,006,215 A | 12/1999 | Retallick |
| 6,006,331 A | 12/1999 | Chu et al. |
| 6,009,413 A | 12/1999 | Webber et al. |
| 6,012,051 A | 1/2000 | Sammon, Jr. et al. |
| 6,014,135 A | 1/2000 | Fernandes |
| 6,014,429 A | 1/2000 | LaPorta et al. |
| 6,014,638 A | 1/2000 | Burge et al. |
| 6,020,884 A | 2/2000 | MacNaughton et al. |
| 6,023,723 A | 2/2000 | McCormick et al. |
| 6,026,403 A | 2/2000 | Siefert |
| 6,026,429 A | 2/2000 | Jones et al. |
| 6,028,866 A | 2/2000 | Engel |
| 6,038,451 A | 3/2000 | Syed et al. |

(56) References Cited

U.S. PATENT DOCUMENTS

| | | | |
|---|---|---|---|
| 6,041,311 A | 3/2000 | Chislenko et al. | |
| 6,049,533 A | 4/2000 | Norman et al. | |
| 6,052,709 A | 4/2000 | Paul | |
| 6,064,723 A | 5/2000 | Cohen et al. | |
| 6,065,047 A | 5/2000 | Carpenter et al. | |
| 6,065,056 A | 5/2000 | Bradshaw et al. | |
| 6,067,529 A | 5/2000 | Ray et al. | |
| 6,067,561 A | 5/2000 | Dillon | |
| 6,070,171 A | 5/2000 | Snyder et al. | |
| 6,073,109 A | 6/2000 | Flores | |
| 6,073,138 A * | 6/2000 | de l'Etraz et al. | 707/748 |
| 6,076,100 A | 6/2000 | Cottrille et al. | |
| 6,081,829 A | 6/2000 | Sidana | |
| 6,081,830 A | 6/2000 | Schindler | |
| 6,085,223 A | 7/2000 | Carino, Jr. et al. | |
| 6,088,435 A | 7/2000 | Barber | |
| 6,091,948 A | 7/2000 | Carr et al. | |
| 6,091,958 A | 7/2000 | Bergkvist et al. | |
| 6,092,049 A | 7/2000 | Chislenko et al. | |
| 6,108,691 A | 8/2000 | Lee et al. | |
| 6,112,078 A | 8/2000 | Sormunen et al. | |
| 6,112,181 A | 8/2000 | Shear | |
| 6,115,455 A | 9/2000 | Picard | |
| 6,115,605 A | 9/2000 | Siccardo et al. | |
| 6,119,014 A | 9/2000 | Alperovich et al. | |
| 6,119,114 A | 9/2000 | Smadja | |
| 6,128,739 A | 10/2000 | Fleming, III | |
| 6,134,432 A | 10/2000 | Holmes et al. | |
| 6,134,582 A | 10/2000 | Kennedy | |
| 6,138,146 A | 10/2000 | Moon et al. | |
| 6,138,158 A | 10/2000 | Boyle et al. | |
| 6,141,545 A | 10/2000 | Begeja et al. | |
| 6,144,934 A | 11/2000 | Stockwell et al. | |
| 6,144,959 A | 11/2000 | Anderson | |
| 6,144,991 A | 11/2000 | England | |
| 6,148,328 A | 11/2000 | Cuomo et al. | |
| 6,148,377 A | 11/2000 | Carter | |
| 6,151,584 A | 11/2000 | Papiernak et al. | |
| 6,157,618 A | 12/2000 | Boss et al. | |
| 6,161,129 A | 12/2000 | Rochkind | |
| 6,161,130 A * | 12/2000 | Horvitz | G06F 17/30707 707/999.005 |
| 6,166,730 A | 12/2000 | Goode et al. | |
| 6,167,256 A | 12/2000 | Yla-Outinen | |
| 6,169,911 B1 | 1/2001 | Wagner et al. | |
| 6,175,831 B1 | 1/2001 | Weinreich et al. | |
| 6,175,859 B1 | 1/2001 | Mohler | |
| 6,178,331 B1 | 1/2001 | Holmes et al. | |
| 6,182,227 B1 | 1/2001 | Blair et al. | |
| 6,185,603 B1 | 2/2001 | Henderson et al. | |
| 6,189,026 B1 | 2/2001 | Birrell et al. | |
| 6,192,395 B1 | 2/2001 | Lerner et al. | |
| 6,192,396 B1 | 2/2001 | Kohler | |
| 6,195,354 B1 | 2/2001 | Skalecki et al. | |
| 6,198,738 B1 | 3/2001 | Chang et al. | |
| 6,199,099 B1 | 3/2001 | Gershman et al. | |
| 6,199,103 B1 | 3/2001 | Sakaguchi et al. | |
| 6,202,058 B1 | 3/2001 | Rose et al. | |
| 6,208,996 B1 | 3/2001 | Ben-Shachar et al. | |
| 6,212,175 B1 | 4/2001 | Harsch | |
| 6,212,548 B1 | 4/2001 | DeSimone et al. | |
| 6,212,550 B1 | 4/2001 | Segur | |
| 6,223,177 B1 | 4/2001 | Tatham | |
| 6,223,213 B1 | 4/2001 | Cleron et al. | |
| 6,226,372 B1 | 5/2001 | Beebe et al. | |
| 6,233,577 B1 | 5/2001 | Ramasubramani et al. | |
| 6,237,027 B1 | 5/2001 | Namekawa | |
| 6,237,092 B1 | 5/2001 | Hayes, Jr. | |
| 6,243,039 B1 | 6/2001 | Elliot | |
| 6,243,714 B1 | 6/2001 | Shapiro et al. | |
| 6,247,043 B1 | 6/2001 | Bates et al. | |
| 6,249,740 B1 | 6/2001 | Ito et al. | |
| 6,252,952 B1 | 6/2001 | Kung et al. | |
| 6,256,516 B1 | 7/2001 | Wagner et al. | |
| 6,259,911 B1 | 7/2001 | Bims et al. | |
| 6,260,148 B1 | 7/2001 | Aggarwal et al. | |
| 6,269,369 B1 | 7/2001 | Robertson | |
| 6,282,435 B1 | 8/2001 | Wagner et al. | |
| 6,292,743 B1 | 9/2001 | Pu et al. | |
| 6,301,609 B1 | 10/2001 | Aravamudan et al. | |
| 6,304,864 B1 | 10/2001 | Liddy et al. | |
| 6,311,211 B1 | 10/2001 | Shaw | |
| 6,314,420 B1 | 11/2001 | Lang et al. | |
| 6,314,450 B1 | 11/2001 | Hachiya et al. | |
| 6,317,776 B1 | 11/2001 | Broussard et al. | |
| 6,324,541 B1 | 11/2001 | de l'Etraz et al. | |
| 6,327,590 B1 | 12/2001 | Chidlovski et al. | |
| 6,330,079 B1 | 12/2001 | Dugan et al. | |
| 6,330,590 B1 | 12/2001 | Cotten | |
| 6,332,153 B1 | 12/2001 | Cohen | |
| 6,334,111 B1 | 12/2001 | Carrott | |
| 6,336,133 B1 * | 1/2002 | Morris | G06F 21/31 709/204 |
| 6,337,712 B1 | 1/2002 | Shiota et al. | |
| 6,343,317 B1 | 1/2002 | Glorikian | |
| 6,347,332 B1 | 2/2002 | Malet | |
| 6,349,299 B1 | 2/2002 | Spencer et al. | |
| 6,349,327 B1 | 2/2002 | Tang et al. | |
| 6,351,698 B1 | 2/2002 | Kubota et al. | |
| 6,351,764 B1 | 2/2002 | Voticky et al. | |
| 6,351,777 B1 | 2/2002 | Simonoff | |
| 6,360,251 B1 | 3/2002 | Fujita et al. | |
| 6,363,248 B1 | 3/2002 | Silverman | |
| 6,363,392 B1 | 3/2002 | Halstead et al. | |
| 6,366,907 B1 | 4/2002 | Fanning | |
| 6,366,962 B1 | 4/2002 | Teibel | |
| 6,374,246 B1 | 4/2002 | Matsuo | |
| 6,374,260 B1 | 4/2002 | Hoffert et al. | |
| 6,374,290 B1 | 4/2002 | Scharber | |
| 6,389,127 B1 | 5/2002 | Vardi et al. | |
| 6,389,372 B1 | 5/2002 | Glance et al. | |
| 6,392,669 B1 | 5/2002 | Matoba et al. | |
| 6,393,464 B1 | 5/2002 | Dieterman | |
| 6,393,465 B2 | 5/2002 | Leeds | |
| 6,396,512 B1 | 5/2002 | Nickerson | |
| 6,396,513 B1 | 5/2002 | Helfman et al. | |
| 6,400,381 B1 | 6/2002 | Barrett et al. | |
| 6,404,438 B1 | 6/2002 | Hatlelid | |
| 6,405,035 B1 | 6/2002 | Singh | |
| 6,405,249 B1 | 6/2002 | Matsuda et al. | |
| 6,415,318 B1 | 7/2002 | Aggarwal et al. | |
| 6,421,439 B1 | 7/2002 | Liffick | |
| 6,421,675 B1 | 7/2002 | Ryan | |
| 6,421,709 B1 | 7/2002 | McCormick et al. | |
| 6,423,012 B1 | 7/2002 | Kato et al. | |
| 6,425,012 B1 | 7/2002 | Trovato et al. | |
| 6,430,344 B1 | 8/2002 | Dixon et al. | |
| 6,430,602 B1 | 8/2002 | Kay et al. | |
| 6,430,604 B1 | 8/2002 | Ogle et al. | |
| 6,434,599 B1 | 8/2002 | Porter | |
| 6,442,589 B1 | 8/2002 | Takahashi et al. | |
| 6,442,591 B1 | 8/2002 | Haynes et al. | |
| 6,446,112 B1 | 9/2002 | Bunney et al. | |
| 6,446,119 B1 | 9/2002 | Olah et al. | |
| 6,449,344 B1 | 9/2002 | Goldfinger et al. | |
| 6,449,634 B1 | 9/2002 | Capiel | |
| 6,457,044 B1 | 9/2002 | Iwazaki | |
| 6,457,062 B1 | 9/2002 | Pivowar | |
| 6,460,073 B1 | 10/2002 | Asakura | |
| 6,463,464 B1 | 10/2002 | Lazaridis et al. | |
| 6,463,471 B1 | 10/2002 | Dreke et al. | |
| 6,466,918 B1 | 10/2002 | Spiegel et al. | |
| 6,480,885 B1 | 11/2002 | Olivier | |
| 6,483,913 B1 | 11/2002 | Smith | |
| 6,484,196 B1 | 11/2002 | Maurille | |
| 6,487,583 B1 | 11/2002 | Harvey et al. | |
| 6,487,584 B1 | 11/2002 | Bunney | |
| 6,487,600 B1 | 11/2002 | Lynch | |
| 6,493,703 B1 | 12/2002 | Knight et al. | |
| 6,499,021 B1 | 12/2002 | Abu-Hakima | |
| 6,499,053 B1 | 12/2002 | Marquette | |
| 6,501,834 B1 | 12/2002 | Milewski et al. | |
| 6,505,167 B1 | 1/2003 | Horvitz et al. | |
| 6,507,866 B1 | 1/2003 | Barchi | |

(56) References Cited

U.S. PATENT DOCUMENTS

| | | | |
|---|---|---|---|
| 6,512,570 B2 | 1/2003 | Garfinkle et al. |
| 6,512,930 B2 | 1/2003 | Sandegren |
| 6,519,629 B2 | 2/2003 | Harvey et al. |
| 6,519,639 B1 | 2/2003 | Glasser et al. |
| 6,519,648 B1 | 2/2003 | Eyal |
| 6,525,747 B1 | 2/2003 | Bezos |
| 6,529,475 B1 | 3/2003 | Wan et al. |
| 6,529,903 B2 | 3/2003 | Smith et al. |
| 6,535,228 B1 | 3/2003 | Bandaru et al. |
| 6,535,586 B1 | 3/2003 | Cloutier et al. |
| 6,539,421 B1 | 3/2003 | Appelman et al. |
| 6,542,500 B1 | 4/2003 | Gerszberg et al. |
| 6,542,750 B2 | 4/2003 | Hendrey et al. |
| 6,546,417 B1 | 4/2003 | Baker |
| 6,549,933 B1 | 4/2003 | Barrett et al. |
| 6,549,937 B1 | 4/2003 | Auerbach et al. |
| 6,557,027 B1 | 4/2003 | Cragun |
| 6,559,863 B1 | 5/2003 | Megiddo |
| 6,564,213 B1 | 5/2003 | Ortega et al. |
| 6,564,248 B1 | 5/2003 | Budge et al. |
| 6,564,261 B1 | 5/2003 | Gudjonsson et al. |
| 6,564,264 B1 | 5/2003 | Creswell et al. |
| 6,567,796 B1 | 5/2003 | Yost et al. |
| 6,567,807 B1 | 5/2003 | Robles |
| 6,571,234 B1 | 5/2003 | Knight et al. |
| 6,574,599 B1 | 6/2003 | Lim et al. |
| 6,580,790 B1 | 6/2003 | Henry et al. |
| 6,583,799 B1 | 6/2003 | Manolis et al. |
| 6,584,471 B1 | 6/2003 | Maclin et al. |
| 6,584,494 B1 | 6/2003 | Manabe et al. |
| 6,587,549 B1 | 7/2003 | Weik |
| 6,594,673 B1 | 7/2003 | Smith et al. |
| 6,604,133 B2 | 8/2003 | Aggarwal et al. |
| 6,606,647 B2 | 8/2003 | Shah et al. |
| 6,606,657 B1 | 8/2003 | Zilberstein et al. |
| 6,611,822 B1 | 8/2003 | Beams |
| 6,615,237 B1 | 9/2003 | Kyne et al. |
| 6,615,241 B1 | 9/2003 | Miller et al. |
| 6,618,747 B1 | 9/2003 | Flynn et al. |
| 6,622,160 B1 | 9/2003 | Horvitz |
| 6,625,258 B1 | 9/2003 | Ram et al. |
| 6,625,423 B1 | 9/2003 | Wang |
| 6,628,194 B1 | 9/2003 | Hellebust et al. |
| 6,630,944 B1 * | 10/2003 | Kakuta | H04L 12/1827 715/758 |
| 6,633,630 B1 | 10/2003 | Owens et al. |
| 6,636,733 B1 | 10/2003 | Helferich |
| 6,636,850 B2 * | 10/2003 | Lepien | 707/780 |
| 6,636,888 B1 | 10/2003 | Bookspan et al. |
| 6,640,218 B1 | 10/2003 | Golding |
| 6,640,223 B1 | 10/2003 | Jones et al. |
| 6,640,230 B1 | 10/2003 | Alexander et al. |
| 6,643,641 B1 | 11/2003 | Snyder |
| 6,643,669 B1 | 11/2003 | Novak et al. |
| 6,647,259 B1 | 11/2003 | Boyle et al. |
| 6,647,383 B1 | 11/2003 | August et al. |
| 6,654,683 B2 | 11/2003 | Jin et al. |
| 6,654,787 B1 | 11/2003 | Aronson et al. |
| 6,654,791 B1 | 11/2003 | Bates et al. |
| 6,654,800 B1 | 11/2003 | Rieger, III |
| 6,658,095 B1 | 12/2003 | Yoakum et al. |
| 6,658,260 B2 | 12/2003 | Knotts |
| 6,665,676 B2 | 12/2003 | Twig et al. |
| 6,665,715 B1 | 12/2003 | Houri |
| 6,677,968 B1 | 1/2004 | Appelman |
| 6,677,976 B2 | 1/2004 | Parker et al. |
| 6,678,719 B1 | 1/2004 | Stimmel |
| 6,681,108 B1 | 1/2004 | Terry et al. |
| 6,684,240 B1 | 1/2004 | Goddard |
| 6,687,362 B1 | 2/2004 | Lindquist et al. |
| 6,687,739 B2 | 2/2004 | Anupam |
| 6,687,745 B1 | 2/2004 | Franco et al. |
| 6,691,162 B1 | 2/2004 | Wick |
| 6,694,353 B2 | 2/2004 | Sommerer |
| 6,697,807 B2 | 2/2004 | McGeachie |
| 6,697,824 B1 | 2/2004 | Bowman-Amuah |
| 6,697,840 B1 | 2/2004 | Godefroid |
| 6,699,125 B2 | 3/2004 | Kirmse et al. |
| 6,701,343 B1 | 3/2004 | Kenyon |
| 6,701,348 B2 | 3/2004 | Sommerer |
| 6,701,351 B1 | 3/2004 | Gann |
| 6,704,727 B1 | 3/2004 | Kravets |
| 6,708,205 B2 | 3/2004 | Sheldon et al. |
| 6,711,565 B1 | 3/2004 | Subramaniam et al. |
| 6,714,519 B2 | 3/2004 | Luzzatti et al. |
| 6,714,791 B2 | 3/2004 | Friedman |
| 6,714,793 B1 | 3/2004 | Carey et al. |
| 6,714,916 B1 | 3/2004 | Robertson et al. |
| 6,721,784 B1 | 4/2004 | Leonard et al. |
| 6,728,357 B2 | 4/2004 | O'Neal et al. |
| 6,731,308 B1 | 5/2004 | Tang et al. |
| 6,732,103 B1 | 5/2004 | Strick et al. |
| 6,732,155 B2 | 5/2004 | Meek |
| 6,732,185 B1 | 5/2004 | Reistad |
| 6,738,822 B2 | 5/2004 | Fukasawa et al. |
| 6,745,230 B1 | 6/2004 | Cao et al. |
| 6,747,970 B1 | 6/2004 | Lamb et al. |
| 6,748,421 B1 | 6/2004 | Ozkan et al. |
| 6,750,881 B1 | 6/2004 | Appelman |
| 6,751,603 B1 | 6/2004 | Bauer et al. |
| 6,754,904 B1 | 6/2004 | Cooper et al. |
| 6,757,365 B1 | 6/2004 | Bogard |
| 6,757,531 B1 | 6/2004 | Haaramo |
| 6,757,732 B1 | 6/2004 | Sollee et al. |
| 6,760,412 B1 | 7/2004 | Loucks |
| 6,760,580 B2 | 7/2004 | Robinson et al. |
| 6,760,753 B1 | 7/2004 | Ohgushi et al. |
| 6,760,754 B1 | 7/2004 | Isaacs et al. |
| 6,772,188 B1 | 8/2004 | Cloutier |
| 6,772,195 B1 | 8/2004 | Hatlelid et al. |
| 6,779,022 B1 | 8/2004 | Horstmann et al. |
| 6,781,608 B1 | 8/2004 | Crawford |
| 6,782,414 B1 | 8/2004 | Xue et al. |
| 6,785,554 B1 | 8/2004 | Amerga |
| 6,785,681 B2 | 8/2004 | Keskar et al. |
| 6,788,769 B1 | 9/2004 | Waites |
| 6,795,863 B1 | 9/2004 | Doty |
| 6,799,039 B2 | 9/2004 | Wu et al. |
| 6,800,031 B2 | 10/2004 | Di Cesare |
| 6,801,659 B1 | 10/2004 | O'Dell |
| 6,807,562 B1 | 10/2004 | Pennock et al. |
| 6,807,574 B1 | 10/2004 | Partovi et al. |
| 6,816,578 B1 | 11/2004 | Kredo et al. |
| 6,816,884 B1 | 11/2004 | Summers |
| 6,821,851 B2 | 11/2004 | Hergenrother et al. |
| 6,829,607 B1 | 12/2004 | Tafoya et al. |
| 6,832,245 B1 | 12/2004 | Isaacs et al. |
| 6,839,554 B2 | 1/2005 | McDowell |
| 6,839,735 B2 | 1/2005 | Wong et al. |
| 6,839,737 B1 | 1/2005 | Friskel |
| 6,848,008 B1 | 1/2005 | Sevanto et al. |
| 6,848,542 B2 | 2/2005 | Gailey et al. |
| 6,853,982 B2 | 2/2005 | Smith et al. |
| 6,854,007 B1 | 2/2005 | Hammond |
| 6,856,999 B2 | 2/2005 | Flanagin et al. |
| 6,857,006 B1 | 2/2005 | Nishizawa |
| 6,868,436 B1 * | 3/2005 | Fleming, III | G06Q 10/107 707/999.1 |
| 6,868,498 B1 * | 3/2005 | Katsikas | 726/14 |
| 6,879,665 B1 | 4/2005 | Cook et al. |
| 6,895,426 B1 | 5/2005 | Cortright et al. |
| 6,898,626 B2 | 5/2005 | Ohashi |
| 6,901,398 B1 | 5/2005 | Horvitz et al. |
| 6,901,559 B1 | 5/2005 | Blum |
| 6,904,026 B1 | 6/2005 | Tarnanen et al. |
| 6,907,243 B1 | 6/2005 | Patel |
| 6,912,505 B2 | 6/2005 | Linden et al. |
| 6,912,563 B1 | 6/2005 | Parker et al. |
| 6,912,564 B1 | 6/2005 | Appelman et al. |
| 6,917,610 B1 | 7/2005 | Kung et al. |
| 6,917,813 B2 | 7/2005 | Elizondo |
| 6,917,965 B2 | 7/2005 | Gupta et al. |
| 6,920,478 B2 | 7/2005 | Mendiola et al. |
| 6,925,469 B2 | 8/2005 | Headings et al. |

(56) References Cited

U.S. PATENT DOCUMENTS

| | | |
|---|---|---|
| 6,931,419 B1 | 8/2005 | Lindquist |
| 6,934,367 B1 | 8/2005 | LaPierre et al. |
| 6,940,955 B1 | 9/2005 | Jones et al. |
| 6,941,354 B2 | 9/2005 | Odamura |
| 6,952,805 B1 | 10/2005 | Tafoya et al. |
| 6,957,077 B2 | 10/2005 | Dehlin |
| 6,968,179 B1 | 11/2005 | De Vries |
| 6,980,870 B1 | 12/2005 | Mok et al. |
| 6,985,943 B2 | 1/2006 | Deryugin et al. |
| 6,990,513 B2 | 1/2006 | Belfiore et al. |
| 6,990,628 B1 | 1/2006 | Palmer et al. |
| 6,993,325 B1 | 1/2006 | Wasterlid |
| 6,993,327 B2 | 1/2006 | Mathis |
| 6,993,564 B2 | 1/2006 | Whitten, II |
| 6,996,520 B2 | 2/2006 | Levin |
| 6,999,566 B1 | 2/2006 | Eason et al. |
| 6,999,959 B1 | 2/2006 | Lawrence et al. |
| 7,003,551 B2 | 2/2006 | Malik |
| 7,003,794 B2 | 2/2006 | Arye |
| 7,007,008 B2 | 2/2006 | Goel et al. |
| 7,007,067 B1 | 2/2006 | Azvine et al. |
| 7,007,228 B1 | 2/2006 | Carro |
| 7,010,312 B1 | 3/2006 | Zechlin |
| 7,016,978 B2 | 3/2006 | Malik et al. |
| 7,020,849 B1 | 3/2006 | Chen |
| 7,031,961 B2 | 4/2006 | Pitkow et al. |
| 7,032,007 B2 | 4/2006 | Fellenstein et al. |
| 7,035,865 B2 | 4/2006 | Doss et al. |
| 7,035,926 B1 | 4/2006 | Cohen et al. |
| 7,039,639 B2 | 5/2006 | Brezin et al. |
| 7,039,676 B1 | 5/2006 | Day et al. |
| 7,043,530 B2 | 5/2006 | Isaacs et al. |
| 7,054,918 B2 | 5/2006 | Polcyn |
| 7,058,036 B1 | 6/2006 | Yu et al. |
| 7,058,690 B2 | 6/2006 | Maehiro |
| 7,058,892 B1 | 6/2006 | MacNaughton et al. |
| 7,062,533 B2 | 6/2006 | Brown et al. |
| 7,065,186 B1 | 6/2006 | Myers et al. |
| 7,068,769 B1 | 6/2006 | Weaver et al. |
| 7,076,504 B1 | 7/2006 | Handel |
| 7,076,545 B2 | 7/2006 | DiMambro |
| 7,076,546 B1 | 7/2006 | Bates et al. |
| 7,080,139 B1 | 7/2006 | Briggs et al. |
| 7,082,047 B2 | 7/2006 | Chow |
| 7,082,407 B1 | 7/2006 | Bezos et al. |
| 7,085,834 B2 | 8/2006 | Delany et al. |
| 7,089,237 B2 | 8/2006 | Turnbull et al. |
| 7,089,287 B2 | 8/2006 | Bellotti et al. |
| 7,092,952 B1 | 8/2006 | Wilens |
| 7,092,998 B2 | 8/2006 | Frietas |
| 7,096,009 B2 | 8/2006 | Mousseau et al. |
| 7,096,030 B2 | 8/2006 | Huomo |
| 7,096,214 B1 | 8/2006 | Bharat et al. |
| 7,113,803 B2 | 9/2006 | Dehlin |
| 7,117,254 B2 | 10/2006 | Lunt et al. |
| 7,120,687 B1 | 10/2006 | Tessman, Jr. et al. |
| 7,124,123 B1 | 10/2006 | Roskind et al. |
| 7,127,232 B2 | 10/2006 | O'Neil et al. |
| 7,130,956 B2 | 10/2006 | Rao |
| 7,133,506 B1 | 11/2006 | Smith |
| 7,133,898 B1 | 11/2006 | Malik |
| 7,136,903 B1 | 11/2006 | Phillips |
| 7,139,806 B2 | 11/2006 | Hayes et al. |
| 7,142,642 B2 | 11/2006 | McClelland et al. |
| 7,143,091 B2 | 11/2006 | Charnok et al. |
| 7,146,404 B2 | 12/2006 | Kay et al. |
| 7,146,416 B1 | 12/2006 | Yoo et al. |
| 7,162,202 B2 | 1/2007 | Westman |
| 7,162,528 B1 | 1/2007 | Simonoff |
| 7,167,910 B2 | 1/2007 | Farnham et al. |
| 7,171,473 B1 | 1/2007 | Eftis et al. |
| 7,177,880 B2 | 2/2007 | Ruvolo |
| 7,181,498 B2 | 2/2007 | Zhu et al. |
| 7,185,059 B2 | 2/2007 | Daniell et al. |
| 7,188,143 B2 | 3/2007 | Szeto |
| 7,188,153 B2 | 3/2007 | Lunt et al. |
| 7,190,956 B2 | 3/2007 | Dorenbosch et al. |
| 7,194,516 B2 | 3/2007 | Giacobbe et al. |
| 7,200,634 B2 | 4/2007 | Mendiola et al. |
| 7,202,814 B2 | 4/2007 | Caspi et al. |
| 7,203,507 B2 | 4/2007 | Smith et al. |
| 7,206,814 B2 | 4/2007 | Kirsch |
| 7,212,617 B2 | 5/2007 | Owens et al. |
| 7,218,921 B2 | 5/2007 | Mendiola et al. |
| 7,222,156 B2 | 5/2007 | Gupta et al. |
| 7,222,309 B2 | 5/2007 | Chupin et al. |
| 7,231,428 B2 | 6/2007 | Teague |
| 7,231,478 B2 | 6/2007 | Leijten |
| 7,233,992 B1 | 6/2007 | Muldoon et al. |
| 7,237,002 B1 | 6/2007 | Estrada |
| 7,237,011 B1 | 6/2007 | St. Pierre |
| 7,240,093 B1 | 7/2007 | Danieli et al. |
| 7,246,371 B2 | 7/2007 | Diacakis et al. |
| 7,257,639 B1 | 8/2007 | Li et al. |
| 7,263,614 B2 | 8/2007 | Roskind |
| 7,269,590 B2 | 9/2007 | Hull et al. |
| 7,269,627 B2 | 9/2007 | Knauerhase |
| 7,275,215 B2 | 9/2007 | Werndorfer et al. |
| 7,283,805 B2 | 10/2007 | Agrawal |
| 7,297,110 B2 | 11/2007 | Goyal et al. |
| 7,299,257 B2 | 11/2007 | Boyer et al. |
| 7,305,624 B1 | 12/2007 | Siegel |
| 7,313,760 B2 | 12/2007 | Grossman |
| 7,316,028 B2 | 1/2008 | Donatelli et al. |
| 7,319,882 B2 | 1/2008 | Mendiola et al. |
| 7,324,826 B2 | 1/2008 | Carey et al. |
| 7,337,219 B1 | 2/2008 | Meenan et al. |
| 7,370,035 B2 | 5/2008 | Gross et al. |
| 7,383,339 B1 | 6/2008 | Meenan et al. |
| 7,401,098 B2 | 7/2008 | Baker |
| 7,403,942 B1 * | 7/2008 | Bayliss .................. 707/748 |
| 7,406,715 B2 | 7/2008 | Clapper |
| 7,411,939 B1 | 8/2008 | Lamb et al. |
| 7,424,510 B2 | 9/2008 | Gross et al. |
| 7,428,580 B2 | 9/2008 | Hullfish et al. |
| 7,428,585 B1 | 9/2008 | Owens et al. |
| 7,436,780 B2 | 10/2008 | Stephens et al. |
| 7,437,413 B2 | 10/2008 | Okuyama et al. |
| 7,454,470 B1 | 11/2008 | Isaacs et al. |
| 7,475,113 B2 * | 1/2009 | Stolze .................. 709/206 |
| 7,478,414 B1 | 1/2009 | Glusker et al. |
| 7,490,238 B2 | 2/2009 | Roskind |
| 7,499,973 B2 | 3/2009 | Couts et al. |
| 7,512,407 B2 | 3/2009 | Wu et al. |
| 7,519,717 B2 | 4/2009 | Stanford-Clark et al. |
| 7,543,243 B2 | 6/2009 | Schwartz et al. |
| 7,552,460 B2 | 6/2009 | Goldman |
| 7,561,682 B2 | 7/2009 | Doherty et al. |
| 7,590,696 B1 | 9/2009 | Odell |
| 7,596,386 B2 | 9/2009 | Yach et al. |
| 7,603,417 B2 | 10/2009 | Ben-Yoseph |
| 7,610,627 B1 | 10/2009 | McKenna |
| 7,613,776 B1 | 11/2009 | Ben-Yoseph |
| 7,636,752 B2 | 12/2009 | Madsen et al. |
| 7,640,306 B2 | 12/2009 | Appelman et al. |
| 7,653,693 B2 | 1/2010 | Heikes |
| 7,675,903 B2 | 3/2010 | Ozugur et al. |
| 7,680,796 B2 | 3/2010 | Yeh et al. |
| 7,680,886 B1 | 3/2010 | Cooley |
| 7,686,693 B2 | 3/2010 | Danieli et al. |
| 7,711,106 B2 | 5/2010 | Likwornik |
| 7,716,287 B2 | 5/2010 | Appelman et al. |
| 7,725,541 B2 | 5/2010 | Daniell et al. |
| 7,725,542 B2 | 5/2010 | Daniell et al. |
| 7,752,273 B2 | 7/2010 | Ito et al. |
| 7,774,410 B2 | 8/2010 | Gang |
| 7,774,711 B2 | 8/2010 | Valeski |
| 7,899,862 B2 | 3/2011 | Appelman et al. |
| 7,904,511 B2 | 3/2011 | Ryan et al. |
| 7,908,327 B2 | 3/2011 | Kucharewski |
| 7,941,491 B2 | 5/2011 | Sood |
| 7,945,674 B2 | 5/2011 | Appelman |
| 7,949,759 B2 | 5/2011 | Appelman |
| 7,954,146 B2 | 5/2011 | Roskind |

(56) References Cited

U.S. PATENT DOCUMENTS

| | | |
|---|---|---|
| 7,992,210 B2 | 8/2011 | McKenna |
| 8,001,199 B2 | 8/2011 | Appelman |
| 8,005,919 B2 | 8/2011 | Mehanna |
| 8,055,675 B2 | 11/2011 | Higgins et al. |
| 8,060,566 B2 | 11/2011 | Appleman |
| 8,117,265 B2 | 2/2012 | Ben-Yoseph |
| 8,122,137 B2 | 2/2012 | Appelman et al. |
| 8,150,922 B2 | 4/2012 | Griffin et al. |
| 8,156,193 B1 | 4/2012 | Odell |
| 8,167,712 B2 | 5/2012 | Sarkar et al. |
| 8,180,807 B2 | 5/2012 | Gorti et al. |
| 8,185,638 B2 | 5/2012 | Appelman |
| 8,224,916 B2 | 7/2012 | Kucharewski |
| 8,365,083 B2 | 1/2013 | Martin et al. |
| 8,429,119 B2 | 4/2013 | Gorti |
| 8,452,849 B2 | 5/2013 | Mehanna |
| 8,560,706 B2 | 10/2013 | Appelman |
| 8,577,972 B1 | 11/2013 | Heikes |
| 8,751,440 B2 | 6/2014 | Gorti |
| 8,775,950 B2 | 7/2014 | Valeski |
| 8,861,694 B1 | 10/2014 | Kirchhoff et al. |
| RE45,254 E | 11/2014 | Roskind |
| 9,177,293 B1 | 11/2015 | Gagnon et al. |
| 2001/0002469 A1 | 5/2001 | Bates et al. |
| 2001/0003202 A1 | 6/2001 | Mache et al. |
| 2001/0003203 A1 | 6/2001 | Mache |
| 2001/0005861 A1 | 6/2001 | Mousseau et al. |
| 2001/0013050 A1 | 8/2001 | Shah |
| 2001/0013069 A1 | 8/2001 | Shah |
| 2001/0016823 A1 | 8/2001 | Richards et al. |
| 2001/0018858 A1 | 9/2001 | Dwek |
| 2001/0025280 A1 | 9/2001 | Mandato et al. |
| 2001/0032246 A1 | 10/2001 | Fardella et al. |
| 2001/0034224 A1 | 10/2001 | McDowell et al. |
| 2001/0034244 A1 | 10/2001 | Calder et al. |
| 2001/0048735 A1 | 12/2001 | O'Neal |
| 2001/0052019 A1 | 12/2001 | Walters et al. |
| 2001/0056363 A1 | 12/2001 | Gantz et al. |
| 2002/0002586 A1 | 1/2002 | Rafal et al. |
| 2002/0006803 A1 | 1/2002 | Mendiola et al. |
| 2002/0007398 A1 | 1/2002 | Mendiola et al. |
| 2002/0015061 A1 | 2/2002 | Maguire |
| 2002/0016818 A1 | 2/2002 | Kirani et al. |
| 2002/0021307 A1 * | 2/2002 | Glenn et al. ............... 345/753 |
| 2002/0023132 A1 | 2/2002 | Tornabene et al. |
| 2002/0023134 A1 | 2/2002 | Roskowski et al. |
| 2002/0023147 A1 | 2/2002 | Kovacs et al. |
| 2002/0028595 A1 | 3/2002 | Higashi et al. |
| 2002/0029224 A1 | 3/2002 | Carlsson |
| 2002/0032729 A1 | 3/2002 | Erickson et al. |
| 2002/0032742 A1 | 3/2002 | Anderson |
| 2002/0035605 A1 | 3/2002 | McDowell et al. |
| 2002/0042816 A1 | 4/2002 | Bae |
| 2002/0042830 A1 | 4/2002 | Bose et al. |
| 2002/0046243 A1 | 4/2002 | Morris |
| 2002/0049610 A1 | 4/2002 | Gropper |
| 2002/0049704 A1 | 4/2002 | Vanderveldt et al. |
| 2002/0049717 A1 | 4/2002 | Routtenberg et al. |
| 2002/0049751 A1 | 4/2002 | Chen et al. |
| 2002/0049806 A1 | 4/2002 | Gatz et al. |
| 2002/0049847 A1 | 4/2002 | McArdle et al. |
| 2002/0049852 A1 | 4/2002 | Lee et al. |
| 2002/0052921 A1 | 5/2002 | Morkel |
| 2002/0054092 A1 | 5/2002 | Hedloy |
| 2002/0055975 A1 | 5/2002 | Petrovykh |
| 2002/0056123 A1 | 5/2002 | Liwerant et al. |
| 2002/0059201 A1 | 5/2002 | Work |
| 2002/0059379 A1 | 5/2002 | Harvey et al. |
| 2002/0059401 A1 | 5/2002 | Austin |
| 2002/0059425 A1 | 5/2002 | Belfore et al. |
| 2002/0059526 A1 | 5/2002 | Dillon et al. |
| 2002/0065828 A1 | 5/2002 | Goodspeed |
| 2002/0065856 A1 | 5/2002 | Kisiel |
| 2002/0065894 A1 | 5/2002 | Dalal et al. |
| 2002/0066036 A1 | 5/2002 | Makineni et al. |
| 2002/0071539 A1 | 6/2002 | Diament et al. |
| 2002/0077080 A1 | 6/2002 | Greene |
| 2002/0078077 A1 | 6/2002 | Baumann et al. |
| 2002/0083127 A1 | 6/2002 | Agrawal |
| 2002/0083136 A1 | 6/2002 | Whitten, II |
| 2002/0084888 A1 | 7/2002 | Jin |
| 2002/0086732 A1 | 7/2002 | Kirmse et al. |
| 2002/0087630 A1 | 7/2002 | Wu |
| 2002/0087649 A1 | 7/2002 | Horvitz |
| 2002/0087704 A1 | 7/2002 | Chesnais et al. |
| 2002/0091667 A1 | 7/2002 | Jaipuria et al. |
| 2002/0091936 A1 | 7/2002 | Tema |
| 2002/0095464 A1 * | 7/2002 | Meek ............................ 709/206 |
| 2002/0095663 A1 | 7/2002 | Joory |
| 2002/0097856 A1 | 7/2002 | Wullert, II |
| 2002/0103801 A1 | 8/2002 | Lyons |
| 2002/0107928 A1 | 8/2002 | Chalon |
| 2002/0112181 A1 | 8/2002 | Smith |
| 2002/0112239 A1 | 8/2002 | Goldman |
| 2002/0116461 A1 | 8/2002 | Diacakis et al. |
| 2002/0116463 A1 | 8/2002 | Hart |
| 2002/0116528 A1 | 8/2002 | Vale |
| 2002/0116641 A1 | 8/2002 | Mastrianni |
| 2002/0118809 A1 | 8/2002 | Eisenberg |
| 2002/0119789 A1 | 8/2002 | Friedman |
| 2002/0120687 A1 | 8/2002 | Diacakis et al. |
| 2002/0120697 A1 | 8/2002 | Generous et al. |
| 2002/0120779 A1 | 8/2002 | Teeple et al. |
| 2002/0123328 A1 | 9/2002 | Snip et al. |
| 2002/0123988 A1 | 9/2002 | Dean et al. |
| 2002/0124053 A1 * | 9/2002 | Adams ................... G06F 9/468 709/216 |
| 2002/0128033 A1 | 9/2002 | Burgess |
| 2002/0128047 A1 | 9/2002 | Gates |
| 2002/0130904 A1 | 9/2002 | Becker et al. |
| 2002/0133292 A1 | 9/2002 | Miyaki |
| 2002/0133369 A1 | 9/2002 | Johnson |
| 2002/0136390 A1 | 9/2002 | Lang et al. |
| 2002/0137530 A1 | 9/2002 | Karve |
| 2002/0138650 A1 | 9/2002 | Yamamoto et al. |
| 2002/0143565 A1 | 10/2002 | Headings et al. |
| 2002/0144283 A1 | 10/2002 | Headings et al. |
| 2002/0147777 A1 | 10/2002 | Hackbarth et al. |
| 2002/0151294 A1 | 10/2002 | Kirby et al. |
| 2002/0154149 A1 | 10/2002 | Hebbar et al. |
| 2002/0154178 A1 | 10/2002 | Barnett |
| 2002/0155826 A1 | 10/2002 | Robinson et al. |
| 2002/0160757 A1 | 10/2002 | Shavit et al. |
| 2002/0160805 A1 | 10/2002 | Laitinen et al. |
| 2002/0165000 A1 | 11/2002 | Fok |
| 2002/0165729 A1 | 11/2002 | Kuebert et al. |
| 2002/0169748 A1 | 11/2002 | Macholda |
| 2002/0174010 A1 | 11/2002 | Rice, III |
| 2002/0174050 A1 | 11/2002 | Eynard |
| 2002/0174260 A1 | 11/2002 | Huang |
| 2002/0175953 A1 | 11/2002 | Lin |
| 2002/0178072 A1 | 11/2002 | Gusler et al. |
| 2002/0178161 A1 | 11/2002 | Brezin et al. |
| 2002/0181703 A1 | 12/2002 | Logan et al. |
| 2002/0184089 A1 | 12/2002 | Tsou et al. |
| 2002/0184128 A1 | 12/2002 | Holtsinger |
| 2002/0184309 A1 | 12/2002 | Danker et al. |
| 2002/0187794 A1 | 12/2002 | Fostick et al. |
| 2002/0188620 A1 | 12/2002 | Doss et al. |
| 2002/0193942 A1 | 12/2002 | Odakura et al. |
| 2002/0194378 A1 | 12/2002 | Foti |
| 2002/0199095 A1 | 12/2002 | Bandini et al. |
| 2003/0004855 A1 | 1/2003 | Dutta |
| 2003/0004872 A1 | 1/2003 | Gardi et al. |
| 2003/0006912 A1 | 1/2003 | Brescia |
| 2003/0009385 A1 | 1/2003 | Tucciarone et al. |
| 2003/0009523 A1 | 1/2003 | Lindskog et al. |
| 2003/0009698 A1 | 1/2003 | Lindeman et al. |
| 2003/0014485 A1 | 1/2003 | Banatwala |
| 2003/0018704 A1 | 1/2003 | Polychronidis et al. |
| 2003/0018726 A1 | 1/2003 | Low et al. |
| 2003/0018747 A1 | 1/2003 | Herland et al. |
| 2003/0023681 A1 | 1/2003 | Brown et al. |
| 2003/0023684 A1 | 1/2003 | Brown et al. |

(56) References Cited

U.S. PATENT DOCUMENTS

| | | |
|---|---|---|
| 2003/0023692 A1 | 1/2003 | Moroo |
| 2003/0023875 A1 | 1/2003 | Hursey |
| 2003/0025824 A1 | 2/2003 | Ishikawa |
| 2003/0028524 A1 | 2/2003 | Keskar |
| 2003/0028595 A1 | 2/2003 | Vogt et al. |
| 2003/0028597 A1 | 2/2003 | Salmi |
| 2003/0028884 A1 | 2/2003 | Swart et al. |
| 2003/0037112 A1 | 2/2003 | Fitzpatrick et al. |
| 2003/0037114 A1 | 2/2003 | Nishio et al. |
| 2003/0042306 A1 | 3/2003 | Irwin |
| 2003/0043201 A1 | 3/2003 | Abdelhadi et al. |
| 2003/0045272 A1 | 3/2003 | Burr |
| 2003/0046097 A1 | 3/2003 | LaSalle et al. |
| 2003/0046198 A1 | 3/2003 | Knapp et al. |
| 2003/0050916 A1 | 3/2003 | Ortega |
| 2003/0050976 A1 | 3/2003 | Block |
| 2003/0051161 A1 | 3/2003 | Smith et al. |
| 2003/0052915 A1 | 3/2003 | Brown et al. |
| 2003/0054830 A1 | 3/2003 | Williams et al. |
| 2003/0055831 A1 | 3/2003 | Ryan |
| 2003/0055897 A1 | 3/2003 | Brown et al. |
| 2003/0058478 A1 | 3/2003 | Aoki |
| 2003/0060211 A1 | 3/2003 | Chern |
| 2003/0064422 A1 | 4/2003 | McDevitt |
| 2003/0065721 A1 | 4/2003 | Roskind |
| 2003/0074454 A1* | 4/2003 | Peck .............................. 709/228 |
| 2003/0078981 A1 | 4/2003 | Harms et al. |
| 2003/0078987 A1 | 4/2003 | Serebrennikov et al. |
| 2003/0079024 A1 | 4/2003 | Hough et al. |
| 2003/0081001 A1 | 5/2003 | Munro |
| 2003/0083046 A1 | 5/2003 | Mathis |
| 2003/0084103 A1 | 5/2003 | Weiner et al. |
| 2003/0087632 A1 | 5/2003 | Sagi et al. |
| 2003/0088554 A1 | 5/2003 | Ryan |
| 2003/0093483 A1 | 5/2003 | Allen et al. |
| 2003/0093580 A1 | 5/2003 | Thomas et al. |
| 2003/0101226 A1 | 5/2003 | Quine |
| 2003/0101343 A1 | 5/2003 | Eaton et al. |
| 2003/0105682 A1 | 6/2003 | Dicker et al. |
| 2003/0105820 A1 | 6/2003 | Haims et al. |
| 2003/0105822 A1 | 6/2003 | Gusler et al. |
| 2003/0106054 A1 | 6/2003 | Billmaier et al. |
| 2003/0110056 A1 | 6/2003 | Berghofer |
| 2003/0110212 A1 | 6/2003 | Lewis |
| 2003/0112945 A1 | 6/2003 | Brown et al. |
| 2003/0115585 A1 | 6/2003 | Barsness et al. |
| 2003/0119532 A1 | 6/2003 | Hatch |
| 2003/0119561 A1 | 6/2003 | Hatch et al. |
| 2003/0120732 A1 | 6/2003 | Couts et al. |
| 2003/0126267 A1 | 7/2003 | Gutta et al. |
| 2003/0129969 A1 | 7/2003 | Rucinski |
| 2003/0130014 A1 | 7/2003 | Rucinski |
| 2003/0131061 A1 | 7/2003 | Newton |
| 2003/0131143 A1 | 7/2003 | Myers |
| 2003/0135659 A1 | 7/2003 | Bellotti et al. |
| 2003/0140103 A1 | 7/2003 | Szeto et al. |
| 2003/0154254 A1 | 8/2003 | Awasthi |
| 2003/0154257 A1 | 8/2003 | Hantsch et al. |
| 2003/0154373 A1 | 8/2003 | Shimada et al. |
| 2003/0154398 A1 | 8/2003 | Eaton et al. |
| 2003/0156138 A1 | 8/2003 | Vronay et al. |
| 2003/0156707 A1 | 8/2003 | Brown et al. |
| 2003/0158855 A1 | 8/2003 | Farnham et al. |
| 2003/0158860 A1 | 8/2003 | Caughey |
| 2003/0158864 A1 | 8/2003 | Samn |
| 2003/0158902 A1 | 8/2003 | Volach |
| 2003/0167310 A1 | 9/2003 | Moody et al. |
| 2003/0167324 A1 | 9/2003 | Farnham et al. |
| 2003/0172349 A1 | 9/2003 | Katayama |
| 2003/0174164 A1 | 9/2003 | Capps |
| 2003/0177175 A1 | 9/2003 | Worley et al. |
| 2003/0177190 A1 | 9/2003 | Moody et al. |
| 2003/0179930 A1 | 9/2003 | O'Dell et al. |
| 2003/0182394 A1 | 9/2003 | Ryngler et al. |
| 2003/0185232 A1 | 10/2003 | Moore et al. |
| 2003/0187813 A1 | 10/2003 | Goldman |
| 2003/0188263 A1 | 10/2003 | Bates et al. |
| 2003/0191673 A1 | 10/2003 | Cohen |
| 2003/0191753 A1 | 10/2003 | Hoch |
| 2003/0191969 A1 | 10/2003 | Katsikas |
| 2003/0196967 A1 | 10/2003 | Robinson et al. |
| 2003/0197729 A1 | 10/2003 | Denoue et al. |
| 2003/0200272 A1 | 10/2003 | Campise et al. |
| 2003/0204568 A1 | 10/2003 | Bhargava et al. |
| 2003/0204741 A1 | 10/2003 | Schoen et al. |
| 2003/0206195 A1 | 11/2003 | Matsa et al. |
| 2003/0206619 A1 | 11/2003 | Curbow et al. |
| 2003/0208545 A1 | 11/2003 | Eaton et al. |
| 2003/0208547 A1 | 11/2003 | Branimir |
| 2003/0210265 A1 | 11/2003 | Haimberg |
| 2003/0212745 A1 | 11/2003 | Caughey |
| 2003/0212804 A1 | 11/2003 | Hashemi |
| 2003/0217109 A1 | 11/2003 | Ordille et al. |
| 2003/0220946 A1 | 11/2003 | Malik |
| 2003/0220976 A1 | 11/2003 | Malik |
| 2003/0222902 A1 | 12/2003 | Chupin et al. |
| 2003/0225834 A1 | 12/2003 | Lee et al. |
| 2003/0225836 A1 | 12/2003 | Lee et al. |
| 2003/0225847 A1 | 12/2003 | Heikes et al. |
| 2003/0225850 A1 | 12/2003 | Teague |
| 2003/0227487 A1 | 12/2003 | Hugh |
| 2003/0227894 A1 | 12/2003 | Wang et al. |
| 2003/0228908 A1 | 12/2003 | Caiafa et al. |
| 2003/0229668 A1 | 12/2003 | Malik |
| 2003/0229717 A1 | 12/2003 | Teague |
| 2003/0229722 A1 | 12/2003 | Beyda |
| 2003/0233265 A1 | 12/2003 | Lee et al. |
| 2003/0233413 A1 | 12/2003 | Becker |
| 2003/0233416 A1 | 12/2003 | Beyda |
| 2003/0233417 A1 | 12/2003 | Beyda et al. |
| 2003/0233418 A1 | 12/2003 | Goldman |
| 2003/0233650 A1 | 12/2003 | Zaner et al. |
| 2003/0236835 A1 | 12/2003 | Levi et al. |
| 2004/0001480 A1 | 1/2004 | Tanigawa et al. |
| 2004/0003041 A1 | 1/2004 | Moore et al. |
| 2004/0003046 A1 | 1/2004 | Grabelsky et al. |
| 2004/0003071 A1 | 1/2004 | Mathew et al. |
| 2004/0005881 A1 | 1/2004 | Ala-Luukko |
| 2004/0010808 A1 | 1/2004 | deCarmo |
| 2004/0015548 A1 | 1/2004 | Lee |
| 2004/0015553 A1 | 1/2004 | Griffin et al. |
| 2004/0017396 A1 | 1/2004 | Werndorfer et al. |
| 2004/0019637 A1 | 1/2004 | Goodman et al. |
| 2004/0019645 A1 | 1/2004 | Goodman et al. |
| 2004/0019650 A1 | 1/2004 | Auvenshine |
| 2004/0019671 A1 | 1/2004 | Metz |
| 2004/0019695 A1 | 1/2004 | Fellenstein et al. |
| 2004/0024478 A1 | 2/2004 | Hans et al. |
| 2004/0024822 A1 | 2/2004 | Werndorfer et al. |
| 2004/0024892 A1 | 2/2004 | Creswell et al. |
| 2004/0029567 A1 | 2/2004 | Timmins et al. |
| 2004/0029572 A1 | 2/2004 | Nerot |
| 2004/0030741 A1 | 2/2004 | Wolton et al. |
| 2004/0030750 A1 | 2/2004 | Moore et al. |
| 2004/0030787 A1 | 2/2004 | Jandel |
| 2004/0031058 A1 | 2/2004 | Reisman |
| 2004/0044536 A1 | 3/2004 | Fitzpatrick et al. |
| 2004/0044723 A1 | 3/2004 | Bell et al. |
| 2004/0044736 A1 | 3/2004 | Austin-Lane et al. |
| 2004/0052356 A1 | 3/2004 | McKinzie et al. |
| 2004/0054646 A1 | 3/2004 | Daniell et al. |
| 2004/0054729 A1 | 3/2004 | Fukuizumi et al. |
| 2004/0054733 A1 | 3/2004 | Weeks |
| 2004/0054735 A1 | 3/2004 | Daniell et al. |
| 2004/0054736 A1 | 3/2004 | Daniell et al. |
| 2004/0056901 A1 | 3/2004 | March et al. |
| 2004/0059708 A1 | 3/2004 | Dean et al. |
| 2004/0059781 A1 | 3/2004 | Yoakum et al. |
| 2004/0059942 A1 | 3/2004 | Xie |
| 2004/0064586 A1 | 4/2004 | Weigand |
| 2004/0073643 A1 | 4/2004 | Hayes et al. |
| 2004/0078440 A1 | 4/2004 | Potter et al. |
| 2004/0078445 A1 | 4/2004 | Malik |
| 2004/0092250 A1 | 5/2004 | Valloppillil |

(56) References Cited

U.S. PATENT DOCUMENTS

| | | |
|---|---|---|
| 2004/0092272 A1 | 5/2004 | Valloppillil |
| 2004/0092273 A1 | 5/2004 | Valloppillil |
| 2004/0098491 A1 | 5/2004 | Costa-Requena et al. |
| 2004/0103156 A1 | 5/2004 | Quillen et al. |
| 2004/0107119 A1 | 6/2004 | Ohishi |
| 2004/0111261 A1* | 6/2004 | Chaudhari et al. ........... 704/236 |
| 2004/0117443 A1 | 6/2004 | Barsness |
| 2004/0117451 A1 | 6/2004 | Chung |
| 2004/0117831 A1 | 6/2004 | Ellis et al. |
| 2004/0122681 A1 | 6/2004 | Ruvolo |
| 2004/0122730 A1 | 6/2004 | Tucciarone et al. |
| 2004/0122810 A1 | 6/2004 | Mayer |
| 2004/0122822 A1 | 6/2004 | Thompson et al. |
| 2004/0122855 A1 | 6/2004 | Ruvolo |
| 2004/0122901 A1 | 6/2004 | Sylvain |
| 2004/0128322 A1 | 7/2004 | Nagy |
| 2004/0128356 A1 | 7/2004 | Bernstein et al. |
| 2004/0133564 A1 | 7/2004 | Gross et al. |
| 2004/0137882 A1 | 7/2004 | Forsyth |
| 2004/0141599 A1 | 7/2004 | Tang et al. |
| 2004/0143564 A1 | 7/2004 | Gross et al. |
| 2004/0148275 A1 | 7/2004 | Achlioptas |
| 2004/0148347 A1 | 7/2004 | Appelman et al. |
| 2004/0152477 A1 | 8/2004 | Wu et al. |
| 2004/0152517 A1 | 8/2004 | Hardisty et al. |
| 2004/0153506 A1 | 8/2004 | Ito et al. |
| 2004/0153519 A1* | 8/2004 | Stolze ........................... 709/206 |
| 2004/0154022 A1 | 8/2004 | Boss et al. |
| 2004/0157586 A1 | 8/2004 | Robinson et al. |
| 2004/0162830 A1 | 8/2004 | Shirwadkar et al. |
| 2004/0171396 A1 | 9/2004 | Carey et al. |
| 2004/0172396 A1 | 9/2004 | Vanska |
| 2004/0176076 A1 | 9/2004 | Uppuluri |
| 2004/0176081 A1 | 9/2004 | Bryham et al. |
| 2004/0177119 A1 | 9/2004 | Mason et al. |
| 2004/0179039 A1 | 9/2004 | Blattner et al. |
| 2004/0186738 A1 | 9/2004 | Reisman |
| 2004/0186887 A1 | 9/2004 | Galli et al. |
| 2004/0186989 A1 | 9/2004 | Clapper |
| 2004/0193684 A1 | 9/2004 | Ben-Yoseph |
| 2004/0193722 A1 | 9/2004 | Donovan |
| 2004/0196315 A1 | 10/2004 | Swearingen et al. |
| 2004/0198351 A1 | 10/2004 | Knotts |
| 2004/0199581 A1 | 10/2004 | Kucharewski et al. |
| 2004/0199582 A1 | 10/2004 | Kucharewski et al. |
| 2004/0201624 A1 | 10/2004 | Crawford |
| 2004/0203695 A1* | 10/2004 | Mikan ............... H04M 3/42382 455/419 |
| 2004/0203766 A1 | 10/2004 | Jenniges et al. |
| 2004/0204068 A1 | 10/2004 | Komaki |
| 2004/0204140 A1 | 10/2004 | Nagata |
| 2004/0205126 A1 | 10/2004 | Ben-Yoseph |
| 2004/0205127 A1 | 10/2004 | Ben-Yoseph |
| 2004/0210639 A1 | 10/2004 | Ben-Yoseph et al. |
| 2004/0210844 A1 | 10/2004 | Pettinati |
| 2004/0215648 A1 | 10/2004 | Marshall |
| 2004/0215721 A1 | 10/2004 | Szeto et al. |
| 2004/0215793 A1 | 10/2004 | Ryan et al. |
| 2004/0219936 A1 | 11/2004 | Kontiainen |
| 2004/0220897 A1 | 11/2004 | Bernhart et al. |
| 2004/0221309 A1 | 11/2004 | Zaner |
| 2004/0231003 A1 | 11/2004 | Cooper et al. |
| 2004/0243844 A1 | 12/2004 | Adkins |
| 2004/0255122 A1 | 12/2004 | Ingerman et al. |
| 2004/0260762 A1 | 12/2004 | Fish |
| 2004/0267604 A1 | 12/2004 | Gross et al. |
| 2005/0004978 A1 | 1/2005 | Reed et al. |
| 2005/0004984 A1 | 1/2005 | Simpson |
| 2005/0004989 A1 | 1/2005 | Satterfield et al. |
| 2005/0004995 A1 | 1/2005 | Stochosky |
| 2005/0009541 A1 | 1/2005 | Ye et al. |
| 2005/0015432 A1 | 1/2005 | Cohen |
| 2005/0021750 A1 | 1/2005 | Abrams |
| 2005/0021854 A1 | 1/2005 | Bjorkner |
| 2005/0027382 A1 | 2/2005 | Kirmse et al. |
| 2005/0038688 A1 | 2/2005 | Collins et al. |
| 2005/0038856 A1 | 2/2005 | Krishnasamy |
| 2005/0043989 A1 | 2/2005 | Shifrin |
| 2005/0044152 A1 | 2/2005 | Hardy et al. |
| 2005/0050143 A1 | 3/2005 | Guster et al. |
| 2005/0055306 A1 | 3/2005 | Miller et al. |
| 2005/0055340 A1 | 3/2005 | Dresden |
| 2005/0055416 A1 | 3/2005 | Heikes |
| 2005/0055450 A1 | 3/2005 | Gang |
| 2005/0060377 A1 | 3/2005 | Lo et al. |
| 2005/0066362 A1 | 3/2005 | Rambo |
| 2005/0071251 A1 | 3/2005 | Linden et al. |
| 2005/0076240 A1 | 4/2005 | Appleman |
| 2005/0076241 A1 | 4/2005 | Appelman |
| 2005/0080859 A1 | 4/2005 | Lake |
| 2005/0080863 A1 | 4/2005 | Daniell |
| 2005/0086211 A1 | 4/2005 | Mayer |
| 2005/0086305 A1 | 4/2005 | Koch et al. |
| 2005/0091311 A1 | 4/2005 | Lund et al. |
| 2005/0091314 A1 | 4/2005 | Blagsvedt et al. |
| 2005/0096084 A1 | 5/2005 | Pohja et al. |
| 2005/0097170 A1 | 5/2005 | Zhu et al. |
| 2005/0102202 A1 | 5/2005 | Linden et al. |
| 2005/0102257 A1 | 5/2005 | Onyon et al. |
| 2005/0108329 A1 | 5/2005 | Weaver et al. |
| 2005/0108341 A1 | 5/2005 | Matthew et al. |
| 2005/0108344 A1 | 5/2005 | Tafoya et al. |
| 2005/0114229 A1 | 5/2005 | Ackley |
| 2005/0114783 A1 | 5/2005 | Szeto |
| 2005/0117729 A1 | 6/2005 | Reding et al. |
| 2005/0124320 A1 | 6/2005 | Ernst et al. |
| 2005/0125559 A1 | 6/2005 | Mutha |
| 2005/0149606 A1 | 7/2005 | Lyle et al. |
| 2005/0153681 A1 | 7/2005 | Hanson |
| 2005/0154913 A1 | 7/2005 | Barriga et al. |
| 2005/0159970 A1 | 7/2005 | Buyukkokten et al. |
| 2005/0159998 A1 | 7/2005 | Buyukkokten et al. |
| 2005/0160144 A1 | 7/2005 | Bhatia |
| 2005/0171799 A1 | 8/2005 | Hull et al. |
| 2005/0171955 A1 | 8/2005 | Hull et al. |
| 2005/0172001 A1 | 8/2005 | Zaner et al. |
| 2005/0177385 A1 | 8/2005 | Hull et al. |
| 2005/0177486 A1 | 8/2005 | Yeager |
| 2005/0181878 A1 | 8/2005 | Danieli et al. |
| 2005/0188044 A1 | 8/2005 | Fleming, III |
| 2005/0195802 A1 | 9/2005 | Klein et al. |
| 2005/0197846 A1 | 9/2005 | Pezaris |
| 2005/0198131 A1 | 9/2005 | Appelman et al. |
| 2005/0198164 A1 | 9/2005 | Moore et al. |
| 2005/0198171 A1 | 9/2005 | Landsman et al. |
| 2005/0198172 A1 | 9/2005 | Appelman et al. |
| 2005/0198173 A1 | 9/2005 | Evans |
| 2005/0198268 A1 | 9/2005 | Chandra |
| 2005/0204063 A1 | 9/2005 | O'Brien |
| 2005/0208957 A1 | 9/2005 | Knotts |
| 2005/0216300 A1 | 9/2005 | Appelman et al. |
| 2005/0223075 A1 | 10/2005 | Swearingen et al. |
| 2005/0239550 A1 | 10/2005 | Hardisty et al. |
| 2005/0246420 A1 | 11/2005 | Little |
| 2005/0251515 A1 | 11/2005 | Reed |
| 2005/0289469 A1 | 12/2005 | Chandler et al. |
| 2006/0009243 A1 | 1/2006 | Dahan et al. |
| 2006/0026237 A1 | 2/2006 | Wang et al. |
| 2006/0031080 A1 | 2/2006 | Mallya et al. |
| 2006/0031366 A1 | 2/2006 | Dolph |
| 2006/0031772 A1 | 2/2006 | Valeski |
| 2006/0036701 A1 | 2/2006 | Bulfer et al. |
| 2006/0047187 A1 | 3/2006 | Goyal et al. |
| 2006/0047747 A1 | 3/2006 | Erickson et al. |
| 2006/0053384 A1 | 3/2006 | La Fetra et al. |
| 2006/0075044 A1 | 4/2006 | Fox et al. |
| 2006/0116139 A1 | 6/2006 | Appelman |
| 2006/0117380 A1 | 6/2006 | Tachizawa et al. |
| 2006/0129678 A1 | 6/2006 | Morita |
| 2006/0136584 A1 | 6/2006 | Decker et al. |
| 2006/0149644 A1 | 7/2006 | Sulmar et al. |
| 2006/0154650 A1 | 7/2006 | Sherman et al. |
| 2006/0167991 A1 | 7/2006 | Heikes et al. |
| 2006/0168054 A1 | 7/2006 | Burkhart et al. |

(56) References Cited

U.S. PATENT DOCUMENTS

| | | |
|---|---|---|
| 2006/0168204 A1 | 7/2006 | Appelman et al. |
| 2006/0173824 A1 | 8/2006 | Bensky et al. |
| 2006/0173963 A1 | 8/2006 | Roseway et al. |
| 2006/0182248 A1 | 8/2006 | Smith et al. |
| 2006/0190536 A1 | 8/2006 | Strong et al. |
| 2006/0212561 A1 | 9/2006 | Feng |
| 2006/0242583 A1 | 10/2006 | MacNaughton et al. |
| 2006/0248573 A1 | 11/2006 | Pannu et al. |
| 2006/0256959 A1 | 11/2006 | Hymes |
| 2006/0259344 A1 | 11/2006 | Patel et al. |
| 2006/0259476 A1 | 11/2006 | Kadayam et al. |
| 2006/0271687 A1 | 11/2006 | Alston et al. |
| 2006/0277187 A1 | 12/2006 | Roese et al. |
| 2006/0288077 A1 | 12/2006 | Chen et al. |
| 2007/0005654 A1 | 1/2007 | Schachar et al. |
| 2007/0038664 A1* | 2/2007 | Jonas .............. G06F 17/30592 |
| 2007/0047522 A1 | 3/2007 | Jefferson et al. |
| 2007/0050456 A1 | 3/2007 | Vuong et al. |
| 2007/0092072 A1 | 4/2007 | Jacobs |
| 2007/0112966 A1 | 5/2007 | Eftis et al. |
| 2007/0156664 A1 | 7/2007 | Norton et al. |
| 2007/0157098 A1 | 7/2007 | Chupin et al. |
| 2007/0185957 A1 | 8/2007 | Mandalia et al. |
| 2007/0208727 A1 | 9/2007 | Saklikar et al. |
| 2007/0208747 A1 | 9/2007 | Puckrin |
| 2007/0239869 A1 | 10/2007 | Raghav et al. |
| 2007/0250566 A1 | 10/2007 | Appelman |
| 2008/0008106 A1 | 1/2008 | Boberg et al. |
| 2008/0082620 A1 | 4/2008 | Barsness |
| 2008/0115087 A1 | 5/2008 | Rollin et al. |
| 2008/0133417 A1 | 6/2008 | Robinson |
| 2008/0186164 A1 | 8/2008 | Emigh et al. |
| 2008/0208812 A1 | 8/2008 | Quoc et al. |
| 2008/0228598 A1 | 9/2008 | Leff et al. |
| 2008/0255989 A1 | 10/2008 | Altberg et al. |
| 2008/0288604 A1 | 11/2008 | Major et al. |
| 2009/0016499 A1 | 1/2009 | Hullfish |
| 2009/0030940 A1 | 1/2009 | Brezina et al. |
| 2009/0043844 A1 | 2/2009 | Zimmet et al. |
| 2009/0070306 A1 | 3/2009 | Stroe |
| 2009/0070433 A1 | 3/2009 | Karstens |
| 2009/0089316 A1 | 4/2009 | Kogan et al. |
| 2009/0100321 A1 | 4/2009 | Singh et al. |
| 2009/0141046 A1 | 6/2009 | Rathnam et al. |
| 2009/0299934 A1 | 12/2009 | Horvitz et al. |
| 2010/0205546 A1 | 8/2010 | Appelman et al. |
| 2010/0325113 A1 | 12/2010 | Valeski |
| 2011/0167116 A1 | 7/2011 | Kucharewski |
| 2011/0179117 A1 | 7/2011 | Appelman |
| 2011/0282955 A1 | 11/2011 | Appelman |
| 2012/0005078 A1 | 1/2012 | Pitroda et al. |
| 2012/0011110 A1 | 1/2012 | Mehanna |
| 2012/0198012 A1 | 8/2012 | Odell |
| 2012/0233269 A1 | 9/2012 | Ben-Yoseph |
| 2012/0262462 A1 | 10/2012 | Montan et al. |
| 2013/0013686 A1 | 1/2013 | Kucharewski |
| 2013/0031638 A1 | 1/2013 | Appelman |
| 2013/0066990 A1 | 3/2013 | Ben-Yoseph |
| 2013/0066992 A1 | 3/2013 | Ben-Yoseph |
| 2013/0067002 A1 | 3/2013 | Heikes |
| 2013/0067003 A1 | 3/2013 | Heikes |
| 2013/0072239 A1 | 3/2013 | Hullfish |
| 2013/0073580 A1 | 3/2013 | Mehanna |
| 2013/0073627 A1 | 3/2013 | Mehanna |
| 2013/0073653 A1 | 3/2013 | Heikes |
| 2013/0073656 A1 | 3/2013 | Hullfish |
| 2013/0073657 A1 | 3/2013 | Hullfish |
| 2013/0073966 A1 | 3/2013 | Appelman |
| 2013/0073967 A1 | 3/2013 | Appelman |
| 2013/0073968 A1 | 3/2013 | Appelman |
| 2013/0080528 A1 | 3/2013 | Mehanna |
| 2013/0080529 A1 | 3/2013 | Appelman |
| 2013/0097254 A1 | 4/2013 | Appelman |
| 2013/0097255 A1 | 4/2013 | Appelman |
| 2013/0097256 A1 | 4/2013 | Appelman |
| 2013/0117399 A1 | 5/2013 | Appelman |
| 2013/0124506 A1 | 5/2013 | Mehanna |
| 2013/0124629 A1 | 5/2013 | Appelman |
| 2013/0125138 A1 | 5/2013 | Appelman |
| 2013/0132376 A1 | 5/2013 | Mehanna |
| 2013/0138634 A1 | 5/2013 | Mehanna |
| 2013/0138680 A1 | 5/2013 | Mehanna |
| 2013/0144876 A1 | 6/2013 | Mehanna |
| 2013/0144898 A1 | 6/2013 | Mehanna |
| 2013/0145040 A1 | 6/2013 | Mehanna |
| 2013/0151546 A1 | 6/2013 | Mehanna |
| 2013/0159290 A1 | 6/2013 | Mehanna |
| 2013/0159420 A1 | 6/2013 | Appelman |
| 2013/0159439 A1 | 6/2013 | Appelman |
| 2013/0159440 A1 | 6/2013 | Appelman |
| 2013/0159441 A1 | 6/2013 | Appelman |
| 2013/0159442 A1 | 6/2013 | Appelman |
| 2013/0173722 A1 | 7/2013 | Kucharewski |
| 2013/0174060 A1 | 7/2013 | Odell |
| 2014/0108571 A1 | 4/2014 | Appelman |
| 2014/0317122 A1 | 10/2014 | Valeski |
| 2014/0317215 A1 | 10/2014 | Isaacs et al. |
| 2014/0324886 A1 | 10/2014 | Valeski |
| 2015/0081828 A1 | 3/2015 | Appelman |
| 2016/0012141 A1 | 1/2016 | Isaacs |

FOREIGN PATENT DOCUMENTS

| | | |
|---|---|---|
| CN | 1348296 | 5/2002 |
| CN | 100476805 | 4/2009 |
| DE | 10048653 | 4/2002 |
| EP | 0862304 | 9/1998 |
| EP | 0889660 | 1/1999 |
| EP | 1011243 | 6/2000 |
| EP | 1054329 | 11/2000 |
| EP | 1071295 | 1/2001 |
| EP | 1091532 | 4/2001 |
| EP | 1102443 | 5/2001 |
| EP | 1104961 | 6/2001 |
| EP | 1104964 | 6/2001 |
| EP | 1104965 | 6/2001 |
| EP | 1113619 | 7/2001 |
| EP | 1113620 | 7/2001 |
| EP | 1113631 | 7/2001 |
| EP | 1113640 | 7/2001 |
| EP | 1113659 | 7/2001 |
| EP | 1113677 | 7/2001 |
| EP | 1176840 | 1/2002 |
| EP | 1207655 | 5/2002 |
| EP | 1213874 | 6/2002 |
| EP | 1237384 | 9/2002 |
| EP | 1248484 | 10/2002 |
| EP | 1248486 | 10/2002 |
| EP | 1255414 | 11/2002 |
| EP | 1274222 | 1/2003 |
| EP | 1565845 | 8/2008 |
| GB | 2319137 | 5/1998 |
| GB | 2328835 | 3/1999 |
| GB | 2357932 | 7/2001 |
| GB | 2368747 | 5/2002 |
| JP | 2004-86950 | 3/1992 |
| JP | 2008-123821 | 5/1996 |
| JP | 2008-314826 | 11/1996 |
| JP | 2009-247334 | 9/1997 |
| JP | 2011-161682 | 6/1999 |
| JP | 2011-328194 | 11/1999 |
| JP | 2000-499001 | 2/2000 |
| JP | 2000-148795 | 5/2000 |
| JP | 2000-222424 | 8/2000 |
| JP | 2000-259514 | 9/2000 |
| JP | 2000-284999 | 10/2000 |
| JP | 2001-084320 | 3/2001 |
| JP | 2002-7479 | 1/2002 |
| JP | 2001-109752 | 4/2002 |
| JP | 2002-132832 | 5/2002 |
| JP | 2002-175301 | 6/2002 |
| KR | 20011048800 | 6/2001 |
| KR | 1020010012984 | 9/2002 |
| WO | WO 97/10558 | 3/1997 |

(56) References Cited

FOREIGN PATENT DOCUMENTS

| | | |
|---|---|---|
| WO | WO 97/14234 | 4/1997 |
| WO | WO 97/34244 | 9/1997 |
| WO | WO 97/37303 | 10/1997 |
| WO | WO 97/46955 | 12/1997 |
| WO | WO 98/16045 | 4/1998 |
| WO | WO 98/20410 | 5/1998 |
| WO | WO 98/47270 | 10/1998 |
| WO | WO 99/08434 | 2/1999 |
| WO | WO 99/34628 | 7/1999 |
| WO | WO 99/48011 | 9/1999 |
| WO | WO 00/10099 | 2/2000 |
| WO | WO 00/16201 | 3/2000 |
| WO | WO 00/24154 | 4/2000 |
| WO | WO 00/42791 | 7/2000 |
| WO | WO 00/43892 | 7/2000 |
| WO | WO 00/47270 | 8/2000 |
| WO | WO 00/60809 | 10/2000 |
| WO | WO 00/79396 | 12/2000 |
| WO | WO 01/06748 | 1/2001 |
| WO | WO 01/22258 | 3/2001 |
| WO | WO 01/24036 | 4/2001 |
| WO | WO 01/40957 | 6/2001 |
| WO | WO 01/41477 | 6/2001 |
| WO | WO 01/43357 | 6/2001 |
| WO | WO 01/63423 | 8/2001 |
| WO | WO 01/67622 | 9/2001 |
| WO | WO 01/67787 | 9/2001 |
| WO | WO 01/69406 | 9/2001 |
| WO | WO 01/72020 | 9/2001 |
| WO | WO 01/80079 | 10/2001 |
| WO | WO 02/03216 | 1/2002 |
| WO | WO 02/09437 | 1/2002 |
| WO | WO 02/19643 | 3/2002 |
| WO | WO 02/28046 | 4/2002 |
| WO | WO 02/35781 | 5/2002 |
| WO | WO 02/062039 | 8/2002 |
| WO | WO 02/073886 | 9/2002 |
| WO | WO 02/077840 | 10/2002 |
| WO | WO 02/093400 | 11/2002 |
| WO | WO 02/093875 | 11/2002 |
| WO | WO 03/021929 | 3/2003 |
| WO | WO 2004/028178 | 4/2004 |
| WO | WO 2004/046875 | 6/2004 |
| WO | WO 2004/046949 | 6/2004 |
| WO | WO 2004/046970 | 6/2004 |
| WO | WO 2004/088943 | 10/2004 |
| WO | WO 2004/111812 | 12/2004 |
| WO | WO 2004/111871 | 12/2004 |
| WO | WO 2005/010709 | 2/2005 |
| WO | WO 2005/054991 | 6/2005 |
| WO | WO 2005/057329 | 6/2005 |
| WO | WO 2005/086723 | 9/2005 |
| WO | WO 2005/089286 | 9/2005 |
| WO | WO 2006/026908 | 3/2006 |
| WO | WO 2006/066092 | 6/2006 |
| WO | WO 2006/068955 | 6/2006 |

OTHER PUBLICATIONS

U.S. Appl. No. 13/189,972, Apr. 21, 2014, Office Action.
U.S. Appl. No. 13/442,226, Apr. 14, 2014, Office Action.
U.S. Appl. No. 13/614,640, Jun. 11, 2014, Notice of Allowance.
U.S. Appl. No. 13/614,781, Apr. 2, 2014, Office Action.
U.S. Appl. No. 13/617,270, Apr. 10, 2014, Office Action.
U.S. Appl. No. 13/617,330, Apr. 8, 2014, Office Action.
U.S. Appl. No. 13/619,009, Apr. 11, 2014, Notice of Allowance.
U.S. Appl. No. 13/619,054, Apr. 7, 2014, Office Action.
U.S. Appl. No. 13/620,851, Apr. 8, 2014, Office Action.
U.S. Appl. No. 13/755,990, May 16, 2014, Notice of Allowance.
U.S. Appl. No. 13/766,781, May 6, 2014, Office Action.
U.S. Appl. No. 13/766,785, May 14, 2014, Office Action.
U.S. Appl. No. 13/766,786, May 8, 2014, Office Action.
U.S. Appl. No. 13/766,779, Apr. 11, 2014, Office Action.
U.S. Appl. No. 12/290,827, filed Nov. 4, 2008, Isaacs.
U.S. Appl. No. 13/619,312, filed Sep. 14, 2012, Appelman.
U.S. Appl. No. 13/619,364, filed Sep. 14, 2012, Appelman.
U.S. Appl. No. 13/619,397, filed Sep. 14, 2014, Appelman.
U.S. Appl. No. 14/326,407, filed Jul. 8, 2014, Roskind.
U.S. Appl. No. 14/327,164, filed Jul. 9, 2014, Isaacs.
U.S. Appl. No. 14/327,183, filed Jul. 9, 2014, Isaacs.
U.S. Appl. No. 14/327,202, filed Jul. 9, 2014, Isaacs.
U.S. Appl. No. 14/327,216, filed Jul. 9, 2014, Isaacs.
U.S. Appl. No. 14/327,226, filed Jul. 9, 2014, Isaacs.
U.S. Appl. No. 14/328,525, filed Jul. 10, 2014, Isaacs.
"About File Transfers", AOL Instant Messenger, version 4.3, Help Documentation, available on Jul. 21, 2001, 5 pages.
"About Internet directory services," Outlook 2000 SR-I (9.0.0. 4527) Help File, on or before Aug. 10, 2001, p. 1.
"Active Directory Features," [online], Jun. 15, 1999 [retrieved on May 13, 2003]. Retrieved from the Internet http://www.microsoft.com/windows2000/server/evaluation/features/adlist.asp, pp. 1-4.
"Active Directory Service Overview," [online], Nov. 30, 2001 [retrieved on May 13, 2003]. Retrieved from the Internet <http://www.microsoft.com/windows2000/server/evaluation/business/addatasheet.asp>, pp. 1-5.
"Active Directory," [online], [retrieved on May 13, 2003]. Retrieved from the Internet http://www.microsoft.com/windows2000/technologies/directory/AD/default.asp, pp. 1-13.
"AOL Instant Messenger Windows Beta Features", Jun. 24, 1999, 2 pages, AOL Instant Messenger All New Version 2.0, 2 pages, Jun. 24, 1999, What is AOL Instant Messenger, 3 pages, Jun. 24, 1999, Quick Tips for Getting Started, 5 pages, Jun. 24, 1999, Frequently Asked Questions About AOL Instant Messenger, 6 pages, Jun. 24, 1999.
"AOL Instant Messenger", reprinted from http://web.archive.org/web/20010721193059/http://aim.com/ (Way Back Machine—Available on Jul. 21, 2001) on Aug. 26, 2005, 7 pages.
"AOL Instant Messenger All New Version 2.0 Quick Tips for Getting Started," Jun. 24, 1999, 5 pages.
"AOL technology: turning complicated things into engaging services," 1996 Annual Report, 22 pages.
"Benefits of Active Directory in a Windows 2000 Environment," [online], Sep. 20, 2001 [retrieved on May 13, 2003]. Retrieved from the Internet. <http://www.microsoft.com/windows2000/server/evaluation/business/adwin2k.asp>, pp. 1-9.
"Directory Integration Can Lower Total Cost of Ownership and Increase Application Functionality," [online], Jul. 27, 1998, [retrieved on May 13, 2003]. Retrieved from the Internet http://www.microsoft.com/presspas/press/1998/July98/ActivDPR.asp, pp. 1-4.
"Enterprise Identity Management with Windows 2000 and Active Directory," [online], 1999 [retrieved on May 13, 2003]. Retrieved from the Internet http://www.microsoft.com/technet/prodtechnol/ad/windows2000/evaluate/w2keims.asp?fra . . . ,pp. 1-16.
"File Transfer Preferences", AOL Instant Messenger, version 5.1, Help Documentation, apparently available as of Nov. 21, 2002, 2 pages.
"GLWebMail 2.0 is released!" http://www.gordano.com; available on Apr. 18, 2001, reprinted from http://web.archive.org/web/20010418153714//http://www.gordano.com, 2 pages.
"Frequently Asked Questions About AOL Instant Messenger," Jun. 24, 1999, 6 pages.
"Integrating Applications with Windows 2000 and Active Directory,"[online], Oct. 2000 [retrieved on May 8, 2003]. Retrieved from the Internet <http:/www.microsoft.com/technet/prodtechnol/ad/windows2000/evaluate/adappstr.asp?fra . . . >, pp. 1-12.
"Integrating Microsoft Metadirectory Services and Active Directory," [online], Aug. 31, 2000 [retrieved on May 13, 2003]. Retrieved from the Internet <http://www.microsoft.com/windows2000/server/evaluation/news/bulletins/mmsma.asp>, p. 1.
"Look up contact information from an item," Outlook 2000 SR-I (9.0.04527) Help File, on or before Aug. 10, 2001, p. 1.
"New Features in AOL Instant Messenger for Windows v. 2.01 Beta," Apr. 28, 1999, 2 pages.

(56) References Cited

OTHER PUBLICATIONS

"Part II: Tasks and Procedures," Active Directory Operations Guide, Microsoft Corporation, Microsoft Windows 2000, Version 1.5, Published Dec. 5, 2002, pp. 1-131.
"Set up LDAP directory services," Outlook 2000 SR-I (9.0.04527) Help File, on or before Aug. 10, 2001, p. 1.
"The Gordano Messaging Server," http://www.gordano.com, Copyright 1994-2003, Gordano, 3 pages.
"Introducing the Gordano Messaging Suite"; http://www.gordano.com; copyright 1994-2003, 2 pages.
"The LP Wireless Messenger," Messenger Documentation, [online]. LP Wireless, Inc., 2002, retrieved on Nov. 2, 2002 from http://www.lpwireless.com/messengerhelp.htm, pp. 1-7.
"Using Active Directory Service," from Chapter 5, Microsoft Windows 2000 Administrator's Pocket Consultant, by William R. Stank (1999). pp. 1-6.
"What is AOL Instant Messenger," Jun. 24, 1999, 3 pages.
"What's new about exchanging information over the Internet," Outlook 2000 SR-I (9.0.0.4527), 1 page,on or before Aug. 10, 2001.
"Windows 2000 Directory Services," [online] http://www.microsoft.com/windows2000/technologies/directory/default.asp, Nov. 25, 2001, 1 page.
"Windows NetMeeting—Features", [Online], Jun. 17, 1999, X002245623, Retrieved from the Internet: URL:http://www.microsoft.com/windows/NetMeeting/Features/default.ASP>, 8 pages.
"Yahoo! Messenger Makes the World a Little Smaller, More Informed," Jun. 21, 1999, pp. 1-2.
A. Kolcz and J. Alspector, "SVM-based Filtering of E-mail Spam with Content-specific Misclassification Costs," *TextDM'2001* (*IEEE ICDM-2001 Workshop on Text Mining*), San Jose, CA, 2001, pp. 1-14.
Alan Cohen, "Instant Messaging," PC Magazine, PC Labs, Apr. 13, 1999, 2 pages.
Anand Ranganathan et al., "ConChat: A Context-Aware Chat Program", Jul.- Sep. 2002, Pervasive Computing, pp. 51-57.
Anonymous: "Push to Talk Services", Internet Document, [Online], p. 1, Retrieved from the internet: URL:http://www.nextel.com/services/directconnect/ptt_overview.shtml, 1 page.
Anonymous: "The Internet—the Advent of New Forms of Communication", Internet Document, [Online], pp. 1-4, Retrieved from the internet URL:http://www.journal.fujitsu.com/248e/e48now.htm, 3 pages.
Archive.org Archived the Morpheus 1.9.1 download page on c-net Download.com [online]Jun. 20, 2002, Retrieved from the internet, URL:http://web.archive.org/web/20020803071751/download.com.com/3000-2166-10057840.html>, 2 pages.
Australian Office Action of Apr. 7, 2006, App. No. 2002340039 (2 pages).
BuddyGopher ˜We Love Away Messages!, "BuddyGopher simultaneously checks the away messages of your favorite AIM® buddies.", available on Sep. 24, 2004, reprinted from http://web.archive.org/web/200400924104001/http://www.buddygopher.com/ on Sep. 28, 2005 (2 pgs).
BuddyGopher˜About, available on Jul. 13, 2004, reprinted from http://web.archive.org/web/20040713002836/www.buddygopher.com/about.html on Sep. 28, 2005 (3 pgs).
Canadian Office Action from Application Serial No. 2403520 dated Feb. 21, 2005, 2 pages.
Chinese Office Action of Jul. 7, 2006, App. No. 02821420X (5 pages).
AOL Instant Messenger, available on Nov. 21, 2002, reprinted from http://web.archive.org/web/20021121031257/http:// aim.com on Aug. 31, 2005 (2 pages).
Bart Massey et al.; "Learning Spam: Simple Techniques for Freely Available Software", Computer Science Dept., Portland, OR USA, 2003, pp. 1-14.
Courter et al., "Mastering Microsoft Outlook 2000 Premium Edition", Sybex Inc., Alameda, California, Feb. 2000, pp. 167-169, ISBN 0/7821-2676-6.
Dodgeball.com:: mobile social software, "help: text messaging", available on Oct. 13, 2004, reprinted from http://web.archive.org/web/20041013034241/www.dodgeball.com/social/help-text.php on Sep. 28, 2005 (3 pgs).
Dodgeball.com:: mobile social software, "help: the basics", available on Oct. 9, 2004, reprinted from http://web.archive.org/web/20041009200739/www.dodgeball.com/social/help-basics.php on Sep. 28, 2005 (2 pgs).
Dodgeball.com:: mobile social software, "help: use it", available on Oct. 9, 2004, reprinted from http://web.archive.org/web/20041009201853/www.dodgeball.com/social/help-useit.php on Sep. 28, 2005 (2 pgs).
Dodgeball.com:: mobile social software, "Hook up with friends. Discover what's around you", available on Nov. 30, 2003, reprinted from http://web.archive.org/web/20041130034344/www.dodgeball.com/social/index.php on Sep. 28, 2005 (2 pgs).
Dutta-Roy Amitava, "Virtual Meetings with Desktop Conferencing", IEEE Spectrum, vol. 35, No. 7, Jul. 1, 1998, pp. 47-56 and p. 66.
Eschenburg, WO laufen sie denn?, Oct. 26, 1998, pp. 92-95.
H. Drucker et al., "Support Vector Machines for Spam Categorization", IEEE Transactions on Neural Networks, vol. 10, No. 5, Sep. 1999, pp. 1048-1054.
Hudson, Greg; Security in the Internet Message and Presence Protocols, http://mirrors.isc.org/pub/www.watersprings.org/pub/id/draft-hudson-impp-security-00.txt; p. 6, section 7.2.2, first paragraph, p. 6 section 7.2.1, lines 1-2, Nov. 21, 2000.
IBM "Configuring Sametime servers in your Domino environment" May 1, 2000 (14 pages).
Isaacs, Ellen: "Example UI Spec: Sound Instant Messages", Internet Document, [online], pp. 1-2. Retrieved from the internet: URL:http://www.uidesigns.com/spec/d-sims.html [retrieved on Jun. 26, 2003].
J.C. Cannon, "Design Guide for Directory-Enabled Applications,"[online], Apr. 2001 [retrieved on May 13, 2003]. Retrieved from the Internet <http://msdn.microsoft.com/library/en-us/dnactdir/html/ deal.asp?frame=true>, pp. 1-18.
Japanese Office Action of May 12, 2008, App. No. 2003-533140 (7 pages).
Joan Morris DiMicco and David R. Millen, "Identity Management: Multiple Presentations of Self in Facebook", Proceeding Group '07 Proceedings of the 2007 International ACM Conference on Supporting GROUP Work, pp. 383-386, ACM.
Kenrick Mock, Dynamic Email Organization via Relevance Catergories, Intel Corp., Tools with Artificial Intelligence, 1999. Proceedings. 11th IEEE International Conference, pp. 399-405.
Klaus Hartenstein et al., "xhtalk 2.9", Nov. 1992, 6 pages.
Kohda et al., "IMPP: A New Instant Messaging Standard and Its Impact on Internet Business," Dec. 2000, Fujitsu Sci. Tech. J., 36, 2, pp. 147-153.
Lotus Sametime 1.5 Jul. 27, 1999 (4 pages).
Mariano, Gwendolyn. ZDNetNews, "Morpheus 1.9 to be unleashed", [online] Jun. 10, 2002 Retrieved from internet URL: http://news.zdnetcom/2100-3513_22-934615.htm, 6 pages.
Mary Beth Marklein, "Student have 'away' with words", Mar. 28, 2004, USA Roday, http://www.usatoday.com/tech/news/2004-03-28-aways-messages-usat-x.htm, all pages.
Matsumoto, Tatsuro et al.: "Chocoa Communicator—A New Communication System based on Awareness and Text Communications —", FUJITSU Sci. Tech. J., 36, 2, pp. 154-161, Dec. 2000.
McKendrick, Joseph, "Internet Call Centers: New Era in Customer Service," Feb. 2002, vol. 10, n2, 5 pages.
Microsoft Corporation, "Active Directory Services Interface in the Microsoft Exchange 5.5 Environment," [online], Nov. 1997 [retrieved on May 12, 2003]. Retrieved from the Internet <http://msdn.microsoft.com/library/en-us/dnactdir/html/msdn_adsiexch.asp?frame=-true>, pp. 1-12.
Microsoft Corporation, "Comparing Microsoft Active Directory to Novell's NDS," [online], Sep. 1998 [retrieved on May 13, 2003]. Retrieved from the Internet <http://msdn.microsoft.com/library/enus/dnactdir/html/msdn_activedirvsnds.asp?frame=true>, pp. 1-17.

(56) References Cited

OTHER PUBLICATIONS

Microsoft Corporation, "Introduction to Active Directory Application Mode," Microsoft Windows Server 2003, Aug. 2002, pp. 1-13.
Microsoft Corporation, "Using ADSI, LDAP, and Network Management Functions With Active Directory," [online], Feb. 2002 [retrieved on May 13, 2003]. Retrieved from the Internet <http://msdn.microsoft.com/library/en-us/dnactdir/html/BuildingADApps.asp?frame-truc>, pp. 1-9.
Mike Snider, "America goes online for New Year's bash", USA Today, Jan. 3, 2000, 1 page.
Muller, Nathan, "Dial 1-800-Internet": Feb. 1996, pp. 83-84, 86, 88.
Part I: Active Directory Operations, Active Directory Operations Guide, Microsoft Corporation, Microsoft Windows 2000, Version 1.5, Published Dec. 5, 2002, pp. 1-187.
Paul Graham, "Better Bayesian Filtering", Jan. 2003, pp. 1-11, http://www.paulgraham.com/better.html.
PowWow (Mar. 1, 2000), Introduction, Retrieved Apr. 3, 2006 from website http://web.archive.org/web/20000301125635/ww2.tribal.com/help/online_docs/h205voic.html.
Pruitt, Scarlet. IDG News Service. "Morpheus Updates Peer-to-Peer Client" [online] Jun. 10, 2002, Retrieved from the internet URL:http://www.pcworld.conn/article/id.101736/article.html, 3 pages.
S. Hird, "Technical Solutions for Controlling Spam", Proceedings of AUUG2002, Melbourne, Sep. 4-6, 2002, 17 pages.
Satter, Michael, excerpts from the Internet TV with CU-SeeMe, First Edition, including inside Title Page and Copyright Page; "Overview"; "Contents," through pages xii; Chapter 1, "Introduction to the Internet Videoconferencing and CU-SeeMe," pp. 1-12; Chapter 4, "Hardware," pp. 47-64; Chapter 5, "Software," pp. 65-92: Chapter 6, "CU-SeeMe User's Guide," pp. 93-121; Chapter 9, "Other Videoconferencing Technologies," pp. 201-226; Chapter 10, "What the Future Holds," pp. 227-233; Appendix A, "Troubleshooting Q&A," pp. 235-249; published by Sams.net Publishing, 201 W. 103rd St., Indianapolis, IN 46290, International Standard Book No. 1-57521-006-1, Library of Congress Catalog Card Number: 95-70178, copyright 1995.
Stanek, William R., "Working with Active Directory Domains," from Chapter 5, Microsoft Windows 2000 Administrator's Pocket Consultant, (1999). pp. 1-10.
T. Joachims, "Text Categorization with Support Vector Machines: Learning with Many Relevant Features", University of Dortmund, Computer Science Dept., LS-8 Report 23, 1998, 18 pages.
Takashi Yoshino et al., "Namba: Location-Aware Collaboration System for Shopping and Meeting", Aug. 2002, IEEE Transactions on Consumer Electronics, pp. 470-477.
Tribal Voice, PowWow Guided Tour—Step 6, PowWow personal communication Http://web.archive.org/web/20008170945l6/www.tribal.com/powwow/tour/step6.cfm (Oct. 22, 1999), 2 pages.
Wayner, Peter, "Hey Baby, Call Me at My IP Address", Apr. 1996, 3 pages.
WBWE (1998), PowWow 3.6 Brings the Power of Internet Community to the People, Business Wire, 2 pages.
Yubing Wang, Mark Claypool, Zheng Zuo. Video: An empirical study of realvideo performance across the internet. Proceedings of the 1st ACM SIGCOMM Workshop on the internet measurement IMW'01. Nov. 2001. ACM Press. 15 pages.
International Search Report for International Application No. PCT/US03/15715, mailed Aug. 14, 2003, 6 pages.
International Search Report from International Application No. PCT/US03/41499, dated Oct. 27, 2004.
International Search Report and Written Opinion dated Feb. 15, 2006 for International Application No. PCT/US05/07204, (10 pages).
International Search Report and Written Opinion issued for PCT Application No. PCT/US2005/042992, Mar. 6, 2007 914 pages).
International Search Report and Written Opinion issued in International Application No. PCT/US05/45663, dated Apr. 11, 2008.
International Search Report issued in Application Serial No. PCT/US05/08476, dated Oct. 16, 2006, (9 pages).
International Search Report issued in International Application No. EP03731244, dated Aug. 30, 2005, (4 pages).
International Search Report of Apr. 11, 2003, App. No. PCT/US00/35160 (3 pages).
International Search Report of Jan. 9, 2003, App. No. PCT/US02/30730 (4 pages).
International Search Report, Application Serial No. PCT/US2006/018286, dated Oct. 19, 2006, 12 pages.
Supplementary European Search Report issued in European Application No. 05857099.5-1238/1836596 PCT/US2005045663, dated Nov. 7, 2008, (5 pages).
Supplementary European Search Report issued in European Application No. EP 05728303, dated Jan. 9, 2009, (4 pages).
European Office Action in Application No. 01954931.0-2414, mailed Jul. 14, 2008, 3 pages.
European Patent Office, Communication of Aug. 30, 2005, App. No. 03731244.1-2416 (PCT/US0315715) 4 pages.
European Patent Office, Communication of Aug. 31, 2009, App. No. 02778374.5-1238, 8 pages.
European Patent Office, Communication of Sep. 5, 2006, App. No. 02778374.5-1238, 4 pages.
Office Action mailed approximately Feb. 29, 2006 for Japanese Patent Application No. 2002-515026 (6 pages).
Office Action of Canadian Application No. 2,462,037, dated Feb. 12, 2009, 8 pages.
U.S. Appl. No. 09/726,912, Mar. 15, 2004, Office Action.
U.S. Appl. No. 09/726,912, Sep. 24, 2004, Notice of Allowance.
U.S. Appl. No. 09/810,159, Jul. 6, 2004, Office Action.
U.S. Appl. No. 09/810,159, Feb. 11, 2005, Office Action.
U.S. Appl. No. 09/810,159, Jun. 15, 2005, Office Action.
U.S. Appl. No. 09/810,159, Dec. 2, 2005, Office Action.
U.S. Appl. No. 09/810,159, Apr. 19, 2006, Office Action.
U.S. Appl. No. 09/810,159, Jan. 10, 2008, Examiner's Answer.
U.S. Appl. No. 09/810,159, Jan. 11, 2008, Office Action.
U.S. Appl. No. 09/810,159, Jan. 29, 2010, Office Action.
U.S. Appl. No. 09/843,788, Mar. 30, 2004, Office Action.
U.S. Appl. No. 09/843,788, Dec. 12, 2004, Office Action.
U.S. Appl. No. 09/843,788, Jul. 27, 2005, Office Action.
U.S. Appl. No. 09/843,788, Mar. 28, 2006, Office Action.
U.S. Appl. No. 09/843,788, Jun. 12, 2006, Office Action.
U.S. Appl. No. 09/843,788, Apr. 19, 2007, Office Action.
U.S. Appl. No. 09/843,788, Oct. 31, 2007, Office Action.
U.S. Appl. No. 09/843,788, Sep. 15, 2008, Office Action.
U.S. Appl. No. 09/843,788, May 5, 2010, Office Action.
U.S. Appl. No. 09/911,799, Oct. 5, 2004, Office Action.
U.S. Appl. No. 09/911,799, Apr. 29, 2005, Office Action.
U.S. Appl. No. 09/911,799, Nov. 17, 2005, Office Action.
U.S. Appl. No. 09/911,799, Aug. 11, 2006, Office Action.
U.S. Appl. No. 09/911,799, Jul. 3, 2007, Office Action.
U.S. Appl. No. 09/911,799, Dec. 1, 2008, Office Action.
U.S. Appl. No. 09/911,799, Mar. 18, 2009, Office Action.
U.S. Appl. No. 09/911,799, Mar. 18, 2010, Office Action.
U.S. Appl. No. 10/134,437, Nov. 1, 2005, Office Action.
U.S. Appl. No. 10/134,437, May 18, 2006, Office Action.
U.S. Appl. No. 10/134,437, Aug. 21, 2006, Advisory Action.
U.S. Appl. No. 10/134,437, Sep. 6, 2007, Miscellaneous Action.
U.S. Appl. No. 10/134,437, Feb. 11, 2008, Office Action.
U.S. Appl. No. 10/134,437, Sep. 18, 2008, Office Action.
U.S. Appl. No. 10/134,437, Mar. 10, 2009, Office Action.
U.S. Appl. No. 10/134,437, Oct. 2, 2009, Notice of Allowance.
U.S. Appl. No. 10/134,437, Nov. 17, 2009, Supplemental Notice of Allowability.
U.S. Appl. No. 10/146,814, May 17, 2002, Examiner's Answer.
U.S. Appl. No. 10/146,814, Sep. 20, 2005, Office Action.
U.S. Appl. No. 10/146,814, May 22, 2006, Office Action.
U.S. Appl. No. 10/146,814, Apr. 15, 2008, Office Action.
U.S. Appl. No. 10/146,814, Jan. 12, 2009, Office Action.
U.S. Appl. No. 10/146,814, Mar. 22, 2010, Office Action.
U.S. Appl. No. 10/184,002, Aug. 25, 2005, Office Action.
U.S. Appl. No. 10/184,002, Apr. 20, 2006, Office Action.
U.S. Appl. No. 10/184,002, Jan. 8, 2008, Office Action.
U.S. Appl. No. 10/184,002, Jul. 24, 2008, Office Action.
U.S. Appl. No. 10/334,142, Sep. 7, 2004, Office Action.

(56) References Cited

OTHER PUBLICATIONS

U.S. Appl. No. 10/334,142, May 4, 2005, Office Action.
U.S. Appl. No. 10/334,142, Dec. 6, 2005, Office Action.
U.S. Appl. No. 10/334,142, Jul. 14, 2006, Office Action.
U.S. Appl. No. 10/334,142, Dec. 29, 2006, Office Action.
U.S. Appl. No. 10/334,142, Apr. 18, 2007, Notice of Allowance.
U.S. Appl. No. 10/633,636, Oct. 11, 2006, Office Action.
U.S. Appl. No. 10/746,230, Oct. 5, 2009, Office Action.
U.S. Appl. No. 10/746,230, Apr. 9, 2010, Notice of Allowance.
U.S. Appl. No. 10/746,230, Jan. 6, 2011, Notice of Allowance.
U.S. Appl. No. 10/746,232, Oct. 30, 2009, Office Action.
U.S. Appl. No. 10/746,232, Jun. 10, 2010, Notice of Allowance.
U.S. Appl. No. 10/746,232, Jan. 18, 2011, Notice of Allowance.
U.S. Appl. No. 10/747,623, Mar. 13, 2007, Office Action.
U.S. Appl. No. 10/747,623, Aug. 21, 2007, Office Action.
U.S. Appl. No. 10/747,623, Nov. 14, 2007, Office Action.
U.S. Appl. No. 10/747,623, Jun. 23, 2008, Office Action.
U.S. Appl. No. 10/747,624, Feb. 26, 2007, Office Action.
U.S. Appl. No. 10/747,624, Jul. 16, 2007, Office Action.
U.S. Appl. No. 10/747,624, Nov. 1, 2007, Office Action.
U.S. Appl. No. 10/747,679, Oct. 2, 2007, Office Action.
U.S. Appl. No. 10/747,679, Apr. 29, 2008, Office Action.
U.S. Appl. No. 10/979,960, Jan. 31, 2008, Office Action.
U.S. Appl. No. 10/979,960, Sep. 25, 2008, Notice of Allowance.
U.S. Appl. No. 11/015,424, Nov. 3, 2008, Office Action.
U.S. Appl. No. 11/015,424, Oct. 19, 2009, Office Action.
U.S. Appl. No. 11/015,424, Feb. 17, 2010, Notice of Allowance.
U.S. Appl. No. 11/150,180, Oct. 2, 2007, Office Action.
U.S. Appl. No. 11/150,180, Apr. 7, 2008, Office Action.
U.S. Appl. No. 11/150,180, Aug. 19, 2009, Office Action.
U.S. Appl. No. 11/237,718, Oct. 30, 2009, Office Action.
U.S. Appl. No. 11/237,718, Apr. 2, 2010, Notice of Allowance.
U.S. Appl. No. 11/238,110, Nov. 29, 2007, Office Action.
U.S. Appl. No. 11/238,110, Jul. 29, 2007, Office Action.
U.S. Appl. No. 11/238,110, Oct. 9, 2008, Office Action.
U.S. Appl. No. 11/238,129, Nov. 14, 2007, Office Action.
U.S. Appl. No. 11/238,129, May 28, 2008, Office Action.
U.S. Appl. No. 11/238,130, Apr. 14, 2009, Office Action.
U.S. Appl. No. 11/238,130, Nov. 13, 2008, Office Action.
U.S. Appl. No. 11/238,130, Jul. 3, 2008, Office Action.
U.S. Appl. No. 11/238,130, Nov. 24, 2009, Office Action.
U.S. Appl. No. 11/782,461, Jan. 22, 2008, Office Action.
U.S. Appl. No. 11/782,461, Jul. 17, 2008, Office Action.
U.S. Appl. No. 11/782,461, Oct. 7, 2008, Notice of Allowance.
U.S. Appl. No. 11/945,792, Jun. 21, 2010, Office Action.
U.S. Appl. No. 11/945,792, Dec. 7, 2010, Office Action.
U.S. Appl. No. 11/945,792, Aug. 22, 2011, Office Action.
U.S. Appl. No. 11/945,792, Jan. 31, 2012, Notice of Allowance.
U.S. Appl. No. 12/336,880, Aug. 4, 2010, Office Action.
U.S. Appl. No. 12/349,161, Jun. 4, 2010, Office Action.
U.S. Appl. No. 12/349,161, Oct. 1, 2010, Office Action.
U.S. Appl. No. 12/349,161, Jan. 24, 2011, Notice of Allowance.
U.S. Appl. No. 12/765,045, Dec. 12, 2011, Office Action.
U.S. Appl. No. 12/765,045, Jul. 19, 2012, Office Action.
U.S. Appl. No. 12/765,045, Dec. 31, 2012, Office Action.
U.S. Appl. No. 12/765,045, Apr. 15, 2013, Office Action.
U.S. Appl. No. 12/765,045, Mar. 7, 2014, Office Action.
U.S. Appl. No. 12/765,045, Aug. 5, 2014, Notice of Allowance.
U.S. Appl. No. 12/852,769, Nov. 14, 2012, Office Action.
U.S. Appl. No. 12/852,769, Jul. 3, 2013, Office Action.
U.S. Appl. No. 12/852,769, Sep. 20, 2013, Notice of Allowance.
U.S. Appl. No. 12/852,769, Aug. 5, 2014, Notice of Allowance.
U.S. Appl. No. 12/290,827, Jun. 30, 2010, Office Action.
U.S. Appl. No. 12/290,827, Jan. 5, 2011, Office Action.
U.S. Appl. No. 12/290,827, Sep. 27, 2011, Office Action.
U.S. Appl. No. 13/093,147, Jul. 19, 2011, Office Action.
U.S. Appl. No. 13/093,147, Jan. 27, 2012, Notice of Allowance.
U.S. Appl. No. 13/372,371, Jul. 1, 2014, Notice of Allowance.
U.S. Appl. No. 13/443,080, Dec. 31, 2012, Notice of Allowance.
U.S. Appl. No. 13/472,583, Dec. 6, 2012, Office Action.
U.S. Appl. No. 13/472,583, Jul. 1, 2013, Notice of Allowance.
U.S. Appl. No. 13/620,921, Feb. 15, 2013, Office Action.
U.S. Appl. No. 13/620,921, Aug. 7, 2013, Office Action.
U.S. Appl. No. 13/620,921, Dec. 20, 2013, Office Action.
U.S. Appl. No. 13/620,921, Apr. 25, 2014, Notice of Allowance.
U.S. Appl. No. 13/850,352, Jul. 18, 2013, Office Action.
U.S. Appl. No. 13/850,352, Nov. 27, 2013, Notice of Allowance.
U.S. Appl. No. 13/907,761, Jun. 10, 2014, Office Action.
U.S. Appl. No. 13/907,761, Jul. 16, 2014, Notice of Allowance.
U.S. Appl. No. 14/049,069, May 23, 2014, Office Action.
U.S. Appl. No. 10/715,213, filed Nov. 18, 2003, Schlegel.
U.S. Appl. No. 10/974,969, filed Oct. 28, 2004, Wick.
U.S. Appl. No. 11/023,652, filed Dec. 29, 2004, Odell.
U.S. Appl. No. 13/361,141, filed Jan. 30, 2012, Appelman et al.
U.S. Appl. No. 13/617,270, filed Sep. 14, 2012, Appelman.
U.S. Appl. No. 13/617,330, filed Sep. 14, 2012, Appelman.
U.S. Appl. No. 13/617,350, filed Sep. 14, 2012, Appelman.
U.S. Appl. No. 13/619,036, filed Sep. 14, 2012, Heikes.
U.S. Appl. No. 13/619,054, filed Sep. 14, 2012, Heikes.
U.S. Appl. No. 13/620,862, filed Sep. 15, 2012, Appelman et al.
U.S. Appl. No. 13/620,863, filed Sep. 15, 2012, Appelman et al.
U.S. Appl. No. 13/620,865, filed Sep. 15, 2012, Appelman et al.
Automated feature of Internet Explorer, www.geocities.com/technofundo/tech/web/ie_autocomplete.html, pp. 1-6, Feb. 18, 2004.
"Approved Database for KnockKnock," http://www.knockmail.com/support/appdatabase.html, pp. 1, as accessed on Dec. 4, 2003.
A. Dornan, "Instant Gratification [instant messaging]", Network Magazine, Aug. 2000, INSPEC p. 9.
A.C.M. Fong et al., "Towards an Open Protocol for Secure Online Presence Notification", Computer Standards & Interfaces, Sep. 2001, INSPEC p. 2.
AE. Milewski et al., "Providing Presence Cues to Telephone Users", Proceedings of CSCW 2000, ACM Conference on Computer Supported Cooperative Work, Jan. 2000, INSPEC p. 3.
America Online Growing Pains, Newsbytes, Mar. 7, 1995.
Armstrong, R., et al., "Web Watcher: a learning apprentice for the world wide web," Feb. 1, 1995,7 pages.
ATMobile Develops Networking-Sensing Instant Messaging, Dec. 8, 1999, Newsbytes, pp. 1-2.
"A Countermeasure to Duplicate-detecting Anti-spam Techniques," Robert J. Hall, AT&T Labs Technical Report 99.9.1, May 1999, Abst. and pp. 1-26.
Adeptra Services Overview; Nov. 7, 2002; adeptra.com ; pp. 1-7.
Adeptra, Features; Nov. 27, 2002; adeptra.com ; pp. 1-2.
America Online Inc., "AOL Instant Messenger", Aug. 29, 2000, Internet: www.aol.com/aim/ (18 pages).
America Online Inc., New AIM 4.7, Sep. 27, 2001, Internet: http://aim.aol.com (7 pages).
"Announce: Implementation of E-mail Spam Proposal," Maurice L. Marvin, news.admin.net-abuse.misc, Aug. 3, 1996, 2 pages.
"A Reputation System for Peer-to-Peer Networks," Gupta et al., Jun. 1-3, 2003, NOSSDAV'03, Monterey, California, pp. 144-152.
"BestCalls.com Announces the BestCalls Technology Index," Business Wire, Jun. 30, 1999, Business Wire, (2 pages).
"Business at Cyberspeed; Brainstorm Becomes Quick Internet Hit," Walker, Jan. 24, 1999, The Washington Post, p. A.01 (4 total pages).
"Better Bayesian Filtering," Paul Graham, Jan. 2003, pp. 1-11, http:// www.paulgraham.com/better.html.
B. Raman et al., "Universal Inbox-Providing Extensible Personal Mobility and Service Mobility in an Integrated Communication Network", Proceedings Third IEEE Workshop on Mobile Computing Systems and Applications, Oct. 2000, INSPEC p. 7.
Brown et al., "WWW Plug-Ins Companion," Que Corporation, Oct. 1996, pp. 351-362.
Business Information Corporation, Sep. 1, 1999, Atmobile.com Enters 'IM' World.
Business Wire Atmobile Corporation, AtMobile awarded U.S. Patent Covering Key Elements of its Wireless Instant Messaging System, Sep. 13, 1999.
Boyce, Jim, "Microsoft Office Outlook 2003 Inside Out," Microsoft Press (published Nov. 12, 2003), pp. 252.

(56) References Cited

OTHER PUBLICATIONS

Brugali, David, "Mediating the Internet," Annals of Software Engineering, vol. 13, pp. 285-308, Jun. 2002, Kluwer Academic Publishers, The Netherlands.
Bryan Pfaffenberger, Netscape Navigator Gold, AP Professional, Jan. 1997, 4 pages.
Cerulean Studios, "Trillian Pro: No Boundaries," (Overview, New Features, Tech Specs, Corporate, Product, Tour—16 pages) 1999-2004; first release Jul. 2000.
Cerulean Studios, "Trillian Pro: Your Freedom to Chat," (Overview, Features, Screenshots, Tech Specs—8 total pages) 1999-2004; first release Jul. 2000.
Chen, Hao et al. "Bringing Order to the Web: Automatically Categorizing Search Results." Proceedings of the SIGCHI conference on human factors in computing systems. ACM Press. pp. 145-152, New York, Jan. 2000.
Chung-Hwa Herman Rao et al.; iMobile: A Proxy-Based Platform for Mobile Services; Network Services Research Center AT&T Labs-Rsearch, Aug. 2001.
Chung-Hwa- Rao, H. Di-Fa Chang, Yi-Bing Lin, "iSMS: an integration platform for short meassage service and IP networks," Network, IEEE, vol. 15, No. 2, pp. 48-55, Mar./Apr. 2001.
"Creating a Single List of Contacts—Google Scholar" available at http://scholar.google.com/scholar?h1=en&1r= &q=creating+a+single+list+list+of+contacts&as . . . (Mar. 27, 2007), 10 pages.
CommWorks 8250 Personal Communications Management System; Dec. 11, 2002; commworks.com; pp. 1-2.
CommWorks IP Messaging; Dec. 11, 2002; commworks.com; pp. 1-2.
ConNexus to awareness: extending awareness to mobile users, Tang, J.C. and Yankelovich, N. and Begole, J. and Van Kleek M. and Li, F. and Bhalodia J., Proceedings of the SIGCHI conference on Human factors in computing systems, pp. 221-228, Dec. 2001, ACM Press, New York, NY, USA.
"CrushParty.com: Help," retrieved Jun. 12, 2002 from the World Wide Web: http://www.crushparty.com/help.jsp, 3 pages.
CNET Networks Inc., "PopUp Killer", Sep. 13, 2001, Internet: download. cnet.com/downloads/O-10059-100-6932612 shtml, (3 pages).
Convergys Interactive Alerts Reduce Customer Care Costs and Improve Customer Satisfaction; convergys.com ; pp. 1-2, Jan. 22, 2002.
"Digital Artifacts for Remembering and Storytelling: Post History and Social Network Fragments," Viegas et al., retrieved from the World Wide Web; http://we.media.mit.edu/-fviegas/papers/posthistory.snfpdf, (10 pages), Jan. 2004.
Danny Sullivan, "What People Search for," Search Engine Watch, pp. 1-4, http://searchenginewatch.com/facts/searches/html (visited Feb. 13, 2003)
"Degrees of Separation Email Spam Protection", Halfbakery: Degrees of Separation Email Spam Protection, reprinted from http://halfbakery.com/idea/Degrees-20 of -20Separation-20Email-20Spam-20Protecti . . . printed on Mar. 1, 2004 (3 pages).
"Denied Database for KnockKnock," http://www.knockmail coml support/denydatabase.html, pp. 1, as accessed on Dec. 4, 2003.
"Email Server Control for KnockKnock," http://www.knockmail. com/supporUemailservcont,html, pp. 1-2, as accessed on Dec. 4, 2003.
Ed Bott and Ron Person, UsingWindows 95 with Internet Explorer 4.0, Feb. 17, 1998, Que, Special Edition, (21 pages).
"Finding Others Online: Reputation Systems for Social Online Spaces," Jensen et al., Apr. 20-25, 2002, CHI, Minneapolis, Minnesota, vol. 4, Issue 1, pp. 447-454.
Global Solutions Directory; Nov. 7, 2002; softwaresibm.com ; pp. 1-5.
Google Zeitgeist—Search patterns, trends, and surprises according to Google, Jan. 2003, pp. 1-2, http://www.google.com/press/zeitgeist.html (visited Feb. 13, 2003).

G. Held, "Instant Messaging Finds its Voice", Network Magazine, May 2001, INSPEC p. 5.
G. Reif et al.; A Web-based Peer-to-Peer Architecture for Collaborative Nomadic Working; Technical Univesrity of Vienna, Distributed Systems Group, Jun. 20, 2000.
Gross et al., "Computer-Supported Cooperative Work and the Internet," IEEE, Sep. 1996, 00. pp. 425-430.
H. Schulzrinne et al., "The IETF Internet Telephony Architecture and Protocols", IEEE Network, May-Jun. 1999, INSPEC p. 11.
Haim Schneider, Lotus Developer Domain, "Adding a popup menu to your Sametime links", pp. 1-8, Jul. 1, 2003.
Hubbub: a sound enhanced mobile instant messenger that supports awareness and opportunistic interactions, Isaacs, E. and Walendowski A.m and Ranganathan, D., Proceedings of the SIGCHI conference on Human Factors in computing systems: Changing our world, changing ourselves, pp. 179-186, Apr. 2002, ACM Press New York, NY, USA.
Hottie or Nottie? Web Site Voters Let You Know WhetherYou Sizzle or Fizzle, Marino, Jul. 11, 2001, Florida Times Union, p. C.1. (2 total pages).
Home-tribe.net, http://washingtondc stribe meUmessage/24434dlb-817b-4580 -aa42 -3bffal5f26a?page=1 , (4 pages), printed from Internet Dec. 13, 2004, message dated Oct. 19, 2003.
http://www.friendster.com , (17 pages), Dec. 2004.
http://www.knockrnail.com/support/newsettings.jpg, as accessed on Dec. 4. 2003.
"Icq.anywhere, Email Features—Email Center—ICQ.com," retrieved Apr. 29, 2004 from the World Wide Web: http://www.icq.com/email/popular-features.html, pp. 1-5.
Ion Adroutsopoulos et al., "Learning to Filter Spam E-Mail: A Comparison of a Naive Bayesian and a Memory-Based Approach", University of Athens, Jun. 2000, pp. 1-12.
Ipipi Frequently Asked Questions; Nov. 6, 2002; ipipi.com ; pp. 1-2.
Ignite Software: Parent Tools Feature Set, "Parent Tools Features," http://www.parent-tools.com/features.htm, Ignite Software, pp. 1-3, as accessed on Dec. 10, 2003.
ICQ 99a, "Welcome to ICQ version 99a", XP-002163918, ICQ Inc., Nov. 1998.
"Instant Messaging is Everyone's Business," Yahoo Business Messenger, Yahoo!, Mar. 2003.
IBM Lotus Software, Sametime Everyplace FAQ Overview Information, pp. 1-3, http://www.lotus.com/products/wireless.nsf/allpublic . . . , (visted Jul. 28, 2003).
IBM Lotus Software, Sametime Everyplace Wireless Collaboration that's Fit for e-Business, pp. 1-6, http://www.lotus.com/products.wireless.nsf/allpublic . . . , (visited Jul. 28, 2003).
IM Means Business IEEE Spectrum, Nov. 2002.
imForwards.com—FAQ's; Oct. 21, 2003.
Index of /tarvizo/oldfiles/elips/tnt-2.4, Jul. 2nd, 2001, TNT, http://web.mit.edu/tarvizo/oldfiles/elips/tnt-2.4/.
Instant messaging in teen life, Grinter, R.E. and Palen, L., Proceedings of the 2002 ACM conference on Computer supported cooperative work, pp. 21-30, Nov. 2002, ACM Press, New York, NY, USA.
Instant Messaging with Mobile Phones to Support Awareness, Mitsuoka, M. and Watanabe, S. and Kakuta, J. and Okuyama, S., pp. 223-230, Jan. 2001, IEEE.
"Idea for Online Networking Brings Two Entrepreneurs Together," Patents: Idea for Online Networking Brings Two Entrepreneurs Together, reprinted from http://www.nytimes.com/2003/12/01/technology/technology-media-patents-idea-for-online-networkings-brings-two-entrepreneurs.htmlOlpatt.html?acbmn1+0 &adxnnlx=107029 . . . , printed on Nov. 5, 2004 (2 pages).
"Instant Messaging for Gamers," PC Gamer, May 2004, vol. 11, No. 5, (2 pages).
J. Felix Hampe et al., Mobile Electronic Commerce: Reintermediation in the Payment System, Electronic Commerce: The End of the Beginning 13th International Bled Electronic Commerce Conference Bled, Slovenia, Jun. 19-21, 2000.
J. Dudley, "Telstra targets Net spammers", news.com.au , Dec. 2, 2003.
Jabber, Inc., Jabber Wireless Gateway Overview, May 2001.

(56) References Cited

OTHER PUBLICATIONS

"Jabber" http://www.jabber.com/index.cgi?CONTENTID=9, as accessed on Dec. 4, 2003.
Jennifer B. Lee, "From 100 countries, a Google snapshot of what's going on," International Herald Tribune, Nov. 29, 2002, pp. 1-3, http://www.iht.com.
Joanna Glasner, "Social Nets Find Friends in VCs", Nov. 17, 2003, available at http://www.wired.com/culture/lifestyle/news/2003/11/61227?currentPage=al.
Jonathan B Postel, "Simple Mail Transfer Protocol", RFC788, Information Science Institute, Nov. 1981.
Julian Byrne, "My Spamblock was thrwarting UCE address culling programs", news.admin.net-abuse.e-mail, Jan. 19, 1997.
"Knock Settings ServersTab," http://www.knockmail.com/support/advserverset.html, pp. 1-2, as accessed on Dec. 4, 2003.
Komatsu et al., "Text Input with Dynamic Abbreviation Expansion," IPSJ SIG Notes, vol. 2001, No. 87, Sep. 14, 2008, pp. 133-138, in Japanese with partial English Translation.
Kirk Scott, "Ubique's Virtual Places: Communication and interaction on the World Wide Web", 1 page, http://www.w3.org/collaboration/workshop/proceedings/p2.html, (visted Jul. 28, 2003).
Kyungkoo Jun, et al., "Agent-Based Resource Discovery", IEEE (Feb. 2000), 10 pages.
Laliberte et al., "A Protocol for Scalable Group and Public Annotations," Elsevier, Apr. 1995, pp. 911-918.
Leander Kahney, "Will You Buy a Car From This Man?", Oct. 6, 2003, pp. 1-3, available at http://www.wired.com/techbizlmedia/news/2003/10/60703.
"Learning Spam: Simple Techniques for Freely-Available Software," Bart Massey et ai, Computer Science Dept., Portland, OR USA, Apr. 2003, pp. 1-14.
"Lotus Instant Messaging Everyplace FAQ," retrieved Apr. 29, 2004 from the World Wide Web: http://www.lotus.com/products/products4nsf/wdocs/249c6f083166cd3e85256d7300714407, (3 pages).
Lieberman, H., "Letizia: An Agent that Assists Web Browsing", Aug 20, 1995, pp. 924-929.
"Listsery Control for KnockKnock," http://www.knockmail com/supporUlistservcont.html, pp. 1, as accessed on Dec. 4, 2003.
Luis Felipe Cabrera et al., "Herald: Achieving a Global Event NotificationService", Microsoft Research, May 2001.
M. Castelluccio, "E-mail in Real Time", Strategic Finance, Sep. 1999, INSPEC p. 10.
M. Day, S Aggarwal, G Mohr, J. Vincent, RFC 2279 Instant Messaging/Presence Protocol Requirements, Feb. 2000.
M. Meola et al., "Real-Time Reference Service for the Remote User: From the Telephone and Electronic Mail to Internet Chat, Instant Messaging and Collaborative Software", Reference Librarian, Dec. 1999, INSPEC p. 89.
M. Smith et al.; Conversation Trees and Threaded Chats; Collaboration & Multimedia Group, Microsoft Research, Redmond, WA, Feb. 2000.
"Managing your Addresses in Knockmail," http://www.knockmail.com/supporUmanaddresses.html, pp. 1-2, as accessed on Dec. 4, 2003.
McMurray, Susan, "Shield your children from unsuitable Internet content," http://www.microsoft.com/canada/home/internet&security/2.4.8protectwithparentalcontrolshowtosafeguardyourcomputer.asp#, Microsoft Home Magazine, pp. 1-3, as accessed on Dec. 10, 2003.
Mark Handel et al., "TeamPortal: Providing Team Awareness on the Web", Dec. 2000.
McKendrick, Joseph; "Internet Call Centers: New Era in Customer Service", Feb. 2002; VIO, n2, (4 pages).
Microservices: CommWorks Find Me-Follow Me Application; Dec. 11, 2002; commworks.com; pp. 1-2.
Microservices: CommWorks Message Alert System; Dec. 11, 2002; commworks.com; pp. 1-3.
Microservices: CommWorks Message Delivery System; Dec. 11, 2002; commworks.com; pp. 1-2.

Microsoft Press Pass; Nov. 7, 2002; microsoft.com ; pp. 1-9.
Mobile instant messaging through Hubbub, Issacs, E. and Walendowski, A. and Ranganathan, D., Communications fo the ACM, vol. 45, No. 9, pp. 68-72, Sep. 2002, ACM Press New York, NY USA.
Midorikawa, et al., "Part 2 Build up a Comfortable Search Environment via Customization by Rules," PC Japan, vol. 7, No. 10, pp. 172-176, in Japanese with a partial English Translation of p. 172, Nov. 2002.
Mozilla, www.mozilla.org/projects/ml/autocomplete, Mar. 13, 2003.
Moore, J. "AOL's Grand Goal; America Online seeks to transform itself into a major Internet player,"Information Week, Jul. 31, 1995, lines 7-23, pp. 38-42.
N. Liew Kwek Sing; AOL ICQ vs. MSN Messenger; Department of Electronic and Computer Science, University of Southampton, Mar. 2003.
Nardi, BA, Whittaker, S. and Bradner, E., Feb. 2000. Interaction and Outeraction: instant messaging in Action. In Proceedings of the 2000 ACM Conference on Computer Supported Cooperative Work (Philadelphia, Pennsylvania, USA.) CSCW '00. ACM New York, NY, 79-88.
Nextel Announces On-Line Paging Service Provided by Wireless Services—First Wireless Telephone Messaging Service to Offer Delivery Confirmation, Aug. 12, 1998, NY.
Net Alerts Overview; Nov. 7, 2002; microsoft.com ; pp. 1-3.
Neo Mai, Ken Neo. "Buying and selling on the internet; [Computimes, 2* Edition]." New Straits Times. Kuala Lumpur: Jun. 28, 2001. p. 53.
Online! Feb. 1, 2003, pp. 1-2, XP002297111, Webpage of Slipstick Systems: To add addresses automatically to Microsoft Outlook Contacts, http://web.archive.org/web/20030202082058/http://www.slipstick.com/contacts/addauto.htm>, retrieved on Sep. 17, 2004 the whole document.
Olsen, Stefanie, "Will instant messaging become instant spamming?,". http://news.com.com/2100-1023 -252765.html?legacy=cnet, Feb. 16, 2001, pp. 1-4.
Ozmosys Enterprise; Nov. 7, 2002; ozmosys.com ; pp. 1-3.
"Pending Database for KnockKnock," http://www.knockmail coml support/penddatabase.html, pp. 1, as accessed on Dec. 4, 2003.
"Preview Pending Emails in KnockMail," http://www.knockmail.com/supporUpreviewemail.html, pp. 1-2, as accessed on Dec. 4, 2003.
"Protect Your Privacy," MSN Features, http://messenger.msn.com/Feature/Privacy.aspx, as accessed on Dec. 2, 2003.
Parviainen et al., "Mobile Instant Messaging", Jul. 3, 2003 IEEE.
Patrice Godefroid et al., "Ensuring Privacy in Presence Awareness Systems: An Automated Verification Approach". Feb. 2000.
Paul Mutton, "PieSpy Social Network Bot-Inferring and Visualizing Social Networks on IRC", jibble.org, http://lister.linux-srv.anlx.net/piespy, © 2001-2004, pp. 1-18, Mar. 18, 2004.
Per E. Pedersen et al.; Using the Theory of Planned Behavior to Explain Teenager's Adoption of Text Messagin Services; Agder University College, Jun. 2002.
Per E. Pedersen; The Adoption of Text Messaging services among Norwegian Teens: Development and test of an Extended Adoption Model; SNF-Report No. 23/02; Samfunns-Og Naeringslivesforskning as Bergen, Jun. 2002.
Phillips Business Information corporation—Aug. 23, 1999—Instant messaging has emerged as one of the most popular communication mediums in the world.
Prodigy Launches 100 Interest Groups on the World Wide Web; All Sites Have Deep Links to Chat and Newsgroups; topics Range from "Adventure Travel" and "Astrology" to "Virtual Reality" and "Wrestling", Business Wire, Sep. 27, 1995, 4 Pages.
"Plaxo-Update Your Address Book," Plaxo Contact Networks, reprinted from http://web.archive.org/web/20030218233638/http://www.plaxo.com printed on Nov. 5, 2004 (available on Feb. 18, 2003), (1 page).
"Plaxo", Plaxo, reprinted from http://web.archive.org/web/20041105072256/http://www.plaxo.com/, printed on Nov. 5, 2004 (available on Feb. 14, 2002) (2 pages).

(56) References Cited

OTHER PUBLICATIONS

Parent Tools TheUltimate in Monitoring and Controlling AIM "Parent Tools for AIM," http://www.parent-tools.com/screenshots.htm, pp. 1-4, as accessed on Dec. 10, 2003.
"Reputation Systems," Resnick et al., Dec. 2000, Communications of the ACM, vol. 43, No. 12, pp. 45-48.
"RIM Road: Software: Internet & Network: Webmessenger RIM J2ME/Instant Messaging," retrieved Apr. 29, 2004 from the World Wide Web: http://www.rimrod.com/software/rim//Webmessenger-RIM-J2ME-Instant-Messenging-20 . . . , pp. 1-4.
"Reflections on Friendster, Trust and Intimacy," Danah Boyd, Ubicomp 2003, Workshop Application for the Intimate Ubiquitous Computing Workshop. Seattle, WA, Oct. 12-15, 2003, (4 pages).
R. Movva & W. Lai, "MSN Messenger Service 1.0 Protocol", Aug. 1999, Internet Draft, http://toolsietf.org/id/draft-movva-msn-messenger-protocol-oo.bct, 28 pages.
Reichard, K., "AOL, ICO to Interoperate—But in a Limited Fashion," Oct. 30, 2002, InstantMessagingPlanet, available at www.instantmessagingplanet.com/public/article.php/1490771.
Ryze home page, www.ryze.com , Dec. 21, 2003, available at http://web.archivesorg/web/20031221010006/http://ryze .com, printed Mar. 16, 2005, 13 pages.
R. Droms, "Dynamic Host Configuration Protocol", Network Working Group, Oct. 1993.
Richard S. Hall, "The Event Desktop: Supporting Event-Enabled Clients on the Web", Freie University, Berlin.
Roscheisen et al., "Beyond Browsing: Shared Comments, SOAPs, Trails, and On-line Communities," Elsevier, Apr. 1995, pp. 739-749.
S. Okuyana et al., "New Mobile Service Based on Instant Messaging Technology", Fujitsu, Apr. 2001, INSPEC p. 1.
S. Ortiz, Jr., "Instant Messaging: No Longer Just Chat", Computer, Mar. 2001, INSPEC p. 6.
Schulzrinne, H.; Rosenberg J., "The Session Initiation Protocol: Internet-centric signaling," Communications Magazine, IEEE, vol. 38, No 10, pp. 134-141, Oct. 2000.
SproWuest Wireless Instant messaging (Nov. 22, 1999) InfoSpace.com, pp. 1-2.
"Six Degrees—New Programs Help Companies 'Mine Workers' Relationships for Key Business Prospects," William M. Bulkeley et al., Marketplace, The Wall Street Journal, Aug. 4, 2003, (3 pages).
SM Cherry "Talk is Cheap, Text is Cheaper" (IEEE Spectrum May 2003).
"Social Network Fragments: An Interactive Tool for Exploring Digital Social Connections." Danah Boyd, Jeff Potter. Sketch at SIGGRAPH 2003. San Diego, California: ACM, Jul. 27-31, 2003, (1 page).
"Social Networking for Business: Release 0.5," Esther Dyson, Esther Dyson's Monthly Report, vol. 21, No. 10, Nov. 25, 2003, www.edventure.com , (36 pages).
"Support Vector Machines for Spam, Categorization," Harris Drucker et al., IEEE Transactions on Neural Networks, vol. 10, No. 5, Sep. 1999, pp. 1048-1054, (7 pages).
"Support Vector Machines," Marti Hearst, IEEE Intelligent Systems, Jul./Aug. 1998, pp. 18-28.
"Social Sites Clicking With Investors," Washingtonpost.com: Social Sites Clicking With Investors, reprinted from http://www.washingtonpost.com/ac2/wp-dyn/A32066-2003Nov12?language=printer printed on Nov. 5, 2004, (2 pages).
"Social Social Networks: Deodorant for the Soul?," Esther Dyson, Esther Dyson's Monthly Report, vol. 21, No. 11, Dec. 12, 2003, www.edventure.com, (36 pages).
"Socialware: Multiagent Systems for Supporting Network Communities," Hattori et al., Mar. 1999, Association for Computing Machinery, Communications of the ACM, vol. 42, Issue 3, (6 pages).
"Spoke Builds on Social Networking Patent Portfolio," Spoke Builds on Social Networking Patent Portfolio, reprinted from http://www.internetnews.com/ent-news/print.php/3073621 printed on Nov. 5, 2004(3 pages).
Solutions Smartdelivery; Nov. 6, 2002; centerpost.com ; pp. 1-2.
"SurfControl Instant Message Filter," Instant Message Filter, SurfControl pic. Apr. 2003.
"Spammers Target Instant Message Users," http://www.bizreport.com/article.php?art id=5507 Nov. 13, 2003, pp. 1-4.
"SWF Seeks Attractive Head Shot; To Stand Out, Online Daters Pay for Professional Photos; Cropping out the Ex-Wife," Leiber, Nov. 19, 2003, The Wall Street Journal, p. D.1.
"SVM-based Filtering of E-mail Spam with Content-specific Misclassification Costs," Aleksander Kolcz et al., TextDM '2001 (IEEE ICDM-2001 Workshop on Text Mining); San Jose, CA, 2001, pp. 1-14, Nov. 2001.
The Wall Street Journal article "Esniff Ferrets Out Misbehavior by 'Reading' E-Mail, Web Visits," Katherine Lange, interactive.wsj.com, Apr. 27, 2001, Tech Q&A.
The Early Report—The Early Show segment, "Big Brother in the Corner Office," Julie Chen, cbsnews.com/earlyshow/caught/techage/20001228esniff.shtml, Dec. 28, 2000: Tech Age.
"The first Social Software . . . a true Social Adventure," Huminity-Social Networking, Chat Software, Create Personal Free Blogs and My Group . . . , reprinted from http://www.huminity.com/ printed on Nov. 5, 2004 (2 pages).
"The eSniff Product Overview," eSniff: Define Your e-Boundaries, www.esniff.com/product overview.html, May 15, 2001.
"Text Categorization with Support Vector Machines: Learning with Many Relevant Features," Thorsten Joachims, University of Dortmund, Computer Science Dept., LS-8 Report 23, 19998, (18 paqes), Nov. 27, 1997, revised Apr. 19, 1998.
"Technology Journal—Are You Satisfied? EBay's Battle Against Fraud Rests Primarily on a Simple Concept: Customer Feedback," Wingfield, Sep. 23, 2002, Asian Wall Street Journal, p. T.8, (4 total pages).
"Technology Journal: Changing Chat-Instant Messaging is Taking Off, and for Some Users It's Nuzzling Out the Phone," Nick Wingfield, Asian WSJ, Sep. 2000, (5 pages).
"Trillian Discussion Forums—HOWTO: Import ICQ 2003a Contact List," retrieved Apr. 29, 2004 from the World Wide Web: http://trillian.cc/forums/showthread.php?s+&threadid=36475, pp. 1-2.
"Technical Solutions for Controlling Spam," Shane Hird, Proceedings of AUUG2002, Melbourne, Sep. 4-6, 2002, (17 pages).
Tara Hall, Lotus Developer Domain, "Same Place, Sametime with Chris Price", pp. 1-8, http://www.10.lotus.com/ldd/today.nsf/DisplayForm/ . . . , (Visisted Jul. 28, 2003), Sep. 2002.
Teraitech; Nov. 7, 2002; teraitech.com ; 1 page.
Uhara7, "Re. being invisible to all but one person on your list", alt.chat-programs.icq, Feb. 29, 2000.
Upoc Quick Tour; Nov. 6, 2002; upoc.com; pp. 1-9.
Upoc General Help; Nov. 6, 2002; upoc.com; pp. 1-2.
Upoc NYSale; Nov. 6, 2002; upoc.com; pp. 1-2.
Upoc Entertainment Picks; Nov. 6, 2002; upoc.com; pp. 1-3.
Upoc Frequently Asked Questions; Nov. 6, 2002; upoc.com; pp. 1-6.
Upside, About Our Product; upsideweb.com ; pp. 1-5, Nov. 2002.
V, Vittore, "The Next Dial Tone? [instant messaging]", Telephony, Oct. 16, 2000, INSPEC p. 8.
VisiblePath webpages, www.visiblepath.org , Dec. 3, 2003, available at http://web. archive.org.web.20031203132211/http://www.visiblepath.com, printed Mar. 16, 2005, 5 pages.
Walther, M., "Supporting Development of Synchronous Collaboration Tools on the Web with GroCo," Feb. 2-9, 1996, pp. 1-6.
Way-bac machine, handspring treo 270, Jun. 1, 2002.
"Wireless Instant Messaging Solution . . . " Newswire, NY Dec. 8, 1999 Atmobile corp, pp. 1-2.
WebleySystems; CommuniKate Unified Communications Features List; Dec. 11, 2002; webley.com; pp. 1-3.
"Welcome to Huminity World of Connections," Huminity-Home, reprinted from http://web.archive.org/web/20030228131435/www.huminity.com/default.php?internationa . . . printed on Nov. 5, 2004 (available on Feb. 2, 2003) (1 page).
WebmasterWorld.com Inc., "HTML and Browsers", Mar. 5, 2001, Internet: www.webmaster.com/forum21/637.htm, (2 pages).
www.yahoo.com, Yahoo! Messenger for Text Messaging, Jul. 2002.

(56) References Cited

OTHER PUBLICATIONS

Yiva Hard of Segerstad et al.; Awareness of Presence, Instant Messaging and WebWho; Department of Linguistics, Goteborg University; Sweden, Dec. 2000.
Yahoo! Buzz Index, Feb. 13, 2003, 1 page, http://buzz.yahoo.com/overall/.
Yahoo! Buzz Index, Nov. 10, 2002, 1 page.
Yahoo! Messenger, "Messenger Help," (4 total pages) Nov. 2002.
ZeroDegrees home page, www.zerodegrees.com , Jan. 24, 2004, available at http://web.archive.org/web/20040204153037/www.zerodegrees.com/home.htm, printed Mar. 16, 2005, 2 pages.
Zephyr on Athena (AC-34), http://web.mit.edu/olh//Zephyr/Revision.html, 11 pages, Retrieved on May 17, 2013.
European Search Report, European Application No. 03781972.9-2201, dated Feb. 8, 2008, 5 pages.
Notification of Transmittal of the International Search Report and the Written Opinion of the International Searching Authority fo International Application No. PCT/US2004/029291; Dec. 27, 2005; 9 pages.
English translation of an Office Action issued in corresponding Japanese Application No. 2004-570418 on Aug. 7, 2008.
English translation of an Office Action issued in corresponding Japanese Application No. 2004-570418 on Feb. 5, 2009.
International Search Report issued in Application Serial No. PCT/US05/08476, dated Oct. 16, 2006, (3 pages).
Supplementary European Search Report issued in European Application No. EP05728303, dated Jan. 9, 2009, (4 pages).
Supplementary European Search Report issued in European Application No. 05857099.5-1238/1836596, PCT/US2005045663, dated Nov. 7, 2008, (5 pages).
International Search Report, PCT/US03/36656, dated Apr. 22, 2004.
Supplementary European Search Report dated Jun. 7, 2006 for Application No. Ep 03811631, 3 pages.
Notification of Transmittal of the International Search Report or the Declaration dated Jun. 23, 2004 for International Application Serial No. PCT/US03/36795.
Office Action issued in Chinese Application No. 200480013443.9, mailed Mar. 6, 2009, 20 pages, including English Translation.
Office Action mailed Apr. 21, 2005 for European Application No.97946924.4-1238, 6 pages.
Office Action mailed May 21, 2008 for European Application No. 97946924.4-1238, 10 pages.
International Search Report and Written Opinion for International Application No. PCT/US05/45630, Dated Oct. 23, 2006.
International Search Report dated Jan. 27, 2005 for International Application No. PCT US2004/009422, International Filing Date Mar. 26, 2004.
International Search Report issued in International Application No. PCT/US03/36795 mailed Jun. 23, 2004, 9 Pages.
International Search Report mailed Dec. 27, 2005 for International Application No. PCT/US2004/29291, filed Sep. 8, 2004.
International Search Report, Application Serial No. PCT/US04/23382, dated Feb. 1, 2007, 12 pages.
International Search Report of PCT/US03/36654 dated Aug. 17, 2004.
International Standard, Information technology—telecommunications and information exchange between systems—private integrated services network-specifications, functional model and information flows—Short message service, ISO/IEC21989, Jul. 1, 2002.
European Office Communication issued in Application No. EP 97946924.4-1238 mailed Apr. 5, 2007, 7 pages.
European Oral Proceedings issued in Application No. EP 97946924.4-1238 mailed Feb. 6, 2007, 9 pages.
European Oral Proceedings issued in Application No. EP 97946924.4-1238 mailed Oct. 7, 2007, 8 pages.
European Office Action, Application Serial No. 03 811 631.5-2201, dated Oct. 4, 2006, 4 pages.
European Search Report, Application No. EP 03811631, dated Jun. 23, 2006, 5 pages.
Office Action from the Canadian Intellectual Property Office in corresponding Canadian Application No. 2,506,417, dated Aug. 14, 2007, 3 pages.
Written Opinion dated Jan. 27, 2005 for International Application No. PCT/US2004/009422, International Filing Date Mar. 26, 2004.
Written Opinion mailed Dec. 27, 2005 for International Application No. PCT/US2004/29291, filed Sep. 8, 2004.
U.S. Appl. No. 10/146,814, Dec. 11, 2006, Office Action.
U.S. Appl. No. 10/146,814, Jul. 2, 2007, Office Action.
U.S. Appl. No. 10/184,002, Jan. 9, 2007, Office Action.
U.S. Appl. No. 10/334,056, Nov. 29, 2004, Office Action.
U.S. Appl. No. 10/334,056, Jul. 6, 2005, Office Action.
U.S. Appl. No. 10/334,056, Oct. 31, 2005, Office Action.
U.S. Appl. No. 10/334,056, May 10, 2006, Office Action.
U.S. Appl. No. 10/334,056, May 21, 2007, Office Action.
U.S. Appl. No. 10/334,056, Nov. 5, 2007, Office Action.
U.S. Appl. No. 10/334,056, May 12, 2008, Office Action.
U.S. Appl. No. 10/334,056, Oct. 30, 2008, Office Action.
U.S. Appl. No. 10/651,303, Feb. 9, 2007, Office Action.
U.S. Appl. No. 10/651,303, Apr. 28, 2008, Office Action.
U.S. Appl. No. 10/651,303, Oct. 8, 2008, Office Action.
U.S. Appl. No. 10/651,303, May 1, 2009, Office Action.
U.S. Appl. No. 10/651,303, Nov. 27, 2009, Office Action.
U.S. Appl. No. 10/651,303, Mar. 11, 2011, Notice of Allowance.
U.S. Appl. No. 10/715,206, Sep. 27, 2007, Office Action.
U.S. Appl. No. 10/715,206, Jul. 25, 2008, Notice of Allowance.
U.S. Appl. No. 10/715,206, Jan. 27, 2007, Office Action.
U.S. Appl. No. 10/715,206, Aug. 13, 2009, Notice of Allowance.
U.S. Appl. No. 10/715,210, Sep. 27, 2007, Office Action.
U.S. Appl. No. 10/715,210, Apr. 14, 2008, Office Action.
U.S. Appl. No. 10/715,210, May 13, 2009, Office Action.
U.S. Appl. No. 10/715,210, Mar. 29, 2010, Notice of Allowance.
U.S. Appl. No. 10/715,211, Jan. 8, 2008, Office Action.
U.S. Appl. No. 10/715,211, Jul. 11, 2008, Office Action.
U.S. Appl. No. 10/715,211, Nov. 28, 2008, Office Action.
U.S. Appl. No. 10/715,211, Jun. 24, 2009, Office Action.
U.S. Appl. No. 10/715,211, Oct. 2, 2009, Notice of Allowance.
U.S. Appl. No. 10/715,211, Feb. 3, 2010, Office Action.
U.S. Appl. No. 10/715,211, Jul. 14, 2010, Office Action.
U.S. Appl. No. 10/715,211, Oct. 25, 2010, Notice of Allowance.
U.S. Appl. No. 10/715,213, Apr. 26, 2007, Office Action.
U.S. Appl. No. 10/715,213, Oct. 22, 2007, Office Action.
U.S. Appl. No. 10/715,213, Aug. 7, 2008, Office Action.
U.S. Appl. No. 10/715,213, Feb. 5, 2009, Office Action.
U.S. Appl. No. 10/715,213, Aug. 6, 2009, Office Action.
U.S. Appl. No. 10/715,213, Jul. 18, 2013, Office Action.
U.S. Appl. No. 10/715,214, Apr. 20, 2007, Office Action.
U.S. Appl. No. 10/715,214, Oct. 9, 2007, Office Action.
U.S. Appl. No. 10/715,215, Mar. 23, 2007, Office Action.
U.S. Appl. No. 10/715,215, Aug. 20, 2010, Office Action.
U.S. Appl. No. 10/715,215, Nov. 20, 2010, Notice of Allowance.
U.S. Appl. No. 10/715,216, Feb. 12, 2007, Office Action.
U.S. Appl. No. 10/715,216, Jan. 11, 2008, Office Action.
U.S. Appl. No. 10/715,216, Aug. 18, 2009, Office Action.
U.S. Appl. No. 10/723,040, Mar. 14, 2006, Office Action.
U.S. Appl. No. 10/723,040, Jun. 26, 2006, Office Action.
U.S. Appl. No. 10/723,040, Jan. 4, 2007, Office Action.
U.S. Appl. No. 10/723,040, Jun. 4, 2007, Office Action.
U.S. Appl. No. 10/723,040, Oct. 25, 2007, Office Action.
U.S. Appl. No. 10/723,040, May 21, 2008, Notice of Allowance.
U.S. Appl. No. 10/746,230, Mar. 17, 2009, Office Action.
U.S. Appl. No. 10/746,232, Mar. 18, 2009, Office Action.
U.S. Appl. No. 10/747,263, Mar. 5, 2008, Office Action.
U.S. Appl. No. 10/747,263, Sep. 5, 2008, Office Action.
U.S. Appl. No. 10/747,263, Feb. 11, 2009, Notice of Allowance.
U.S. Appl. No. 10/747,263, Jun. 2, 2009, Notice of Allowance.
U.S. Appl. No. 10/747,651, Mar. 5, 2008, Office Action.
U.S. Appl. No. 10/747,651, Feb. 20, 2009, Office Action.
U.S. Appl. No. 10/747,676, Sep. 21, 2007, Office Action.
U.S. Appl. No. 10/747,676, Mar. 31, 2008, Office Action.
U.S. Appl. No. 10/747,678, Sep. 14, 2007, Office Action.
U.S. Appl. No. 10/747,678, Mar. 27, 2008, Office Action.
U.S. Appl. No. 10/747,678, Jun. 12, 2008, Office Action.

(56) References Cited

OTHER PUBLICATIONS

U.S. Appl. No. 10/747,678, Dec. 15, 2008, Office Action.
U.S. Appl. No. 10/747,678, Jun. 5, 2009, Notice of Allowance.
U.S. Appl. No. 10/747,678, Jun. 19, 2009, Notice of Allowance.
U.S. Appl. No. 10/747,682, Oct. 11, 2007, Office Action.
U.S. Appl. No. 10/747,682, Apr. 7, 2008, Office Action.
U.S. Appl. No. 10/747,682, Aug. 19, 2008, Office Action.
U.S. Appl. No. 10/747,682, Mar. 18, 2009, Office Action.
U.S. Appl. No. 10/747,682, Nov. 2, 2009, Office Action.
U.S. Appl. No. 10/747,682, Jun. 11, 2010, Office Action.
U.S. Appl. No. 10/747,682, Dec. 2, 2010, Office Action.
U.S. Appl. No. 10/747,682, Oct. 5, 2011, Notice of Allowance.
U.S. Appl. No. 10/825,617, Jun. 24, 2008, Office Action.
U.S. Appl. No. 10/825,617, Mar. 9, 2009, Notice of Allowance.
U.S. Appl. No. 10/825,617, Sep. 10, 2009, Notice of Allowance.
U.S. Appl. No. 10/895,421, Jan. 9, 2007, Office Action.
U.S. Appl. No. 10/895,421, Jun. 27, 2007, Office Action.
U.S. Appl. No. 10/895,421, Apr. 16, 2008, Office Action.
U.S. Appl. No. 10/895,421, Nov. 19, 2008, Notice of Allowance.
U.S. Appl. No. 10/895,421, Apr. 17, 2009, Notice of Allowance.
U.S. Appl. No. 10/974,969, Mar. 17, 2008, Office Action.
U.S. Appl. No. 10/974,969, Mar. 6, 2009, Office Action.
U.S. Appl. No. 10/974,969, Sep. 8, 2009, Notice of Allowance.
U.S. Appl. No. 10/981,460, Aug. 20, 2008, Office Action.
U.S. Appl. No. 11/015,423, Mar. 2, 2009, Office Action.
U.S. Appl. No. 11/015,424, Mar. 19, 2008, Office Action.
U.S. Appl. No. 11/015,424, May 1, 2009, Office Action.
U.S. Appl. No. 11/015,476, Mar. 2, 2009, Office Action.
U.S. Appl. No. 11/017,204, Dec. 12, 2007, Office Action.
U.S. Appl. No. 11/017,204, Jun. 23, 2008, Office Action.
U.S. Appl. No. 11/023,652, Aug. 30, 2010, Office Action.
U.S. Appl. No. 11/023,652, May 12, 2011, Office Action.
U.S. Appl. No. 11/023,652, Dec. 8, 2011, Office Action.
U.S. Appl. No. 11/023,652, Sep. 24, 2012, Office Action.
U.S. Appl. No. 11/023,652, Oct. 25, 2013, Office Action.
U.S. Appl. No. 11/079,522, Oct. 16, 2008, Office Action.
U.S. Appl. No. 11/079,522, Apr. 3, 2009, Office Action.
U.S. Appl. No. 11/237,718, Apr. 2, 2009, Office Action.
U.S. Appl. No. 11/408,166, Mar. 18, 2009, Office Action.
U.S. Appl. No. 11/408,166, Oct. 7, 2009, Office Action.
U.S. Appl. No. 11/408,166, Sep. 2, 2010, Office Action.
U.S. Appl. No. 11/408,166, Apr. 13, 2011, Office Action.
U.S. Appl. No. 11/408,166, Oct. 17, 2011, Office Action.
U.S. Appl. No. 11/464,816, Apr. 21, 2009, Office Action.
U.S. Appl. No. 11/574,831, Sep. 18, 2009, Office Action.
U.S. Appl. No. 11/574,831, May 16, 2010, Office Action.
U.S. Appl. No. 11/574,831, Sep. 9, 2010, Office Action.
U.S. Appl. No. 11/574,831, Apr. 15, 2011, Office Action.
U.S. Appl. No. 11/574,831, Oct. 13, 2011, Notice of Allowance.
U.S. Appl. No. 12/236,255, Apr. 2, 2010, Office Action.
U.S. Appl. No. 12/236,255, Sep. 17, 2010, Office Action.
U.S. Appl. No. 12/236,255, Feb. 3, 2011, Office Action.
U.S. Appl. No. 12/548,338, Nov. 9, 2010, Office Action.
U.S. Appl. No. 12/548,338, May 19, 2011, Office Action.
U.S. Appl. No. 12/548,338, Dec. 9, 2011, Notice of Allowance.
U.S. Appl. No. 12/626,099, Sep. 17, 2010, Office Action.
U.S. Appl. No. 12/626,099, Mar. 20, 2011, Notice of Allowance.
U.S. Appl. No. 12/689,699, Feb. 28, 2011, Office Action.
U.S. Appl. No. 12/689,699, Apr. 23, 2012, Office Action.
U.S. Appl. No. 12/689,699, Oct. 9, 2012, Notice of Allowance.
U.S. Appl. No. 12/689,699, Mar. 11, 2013, Office Action.
U.S. Appl. No. 12/689,699, Jun. 18, 2013, Notice of Allowance.
U.S. Appl. No. 13/023,256, Jun. 21, 2011, Office Action.
U.S. Appl. No. 13/023,256, Nov. 28, 2011, Office Action.
U.S. Appl. No. 13/023,256, Apr. 16, 2012, Office Action.
U.S. Appl. No. 13/023,256, Sep. 28, 2012, Office Action.
U.S. Appl. No. 13/023,256, Jun. 21, 2013, Office Action.
U.S. Appl. No. 13/023,256, Nov. 7, 2013, Office Action.
U.S. Appl. No. 13/048,312, Nov. 22, 2011, Office Action.
U.S. Appl. No. 13/048,312, Mar. 13, 2012, Notice of Allowance.
U.S. Appl. No. 13/184,414, Aug. 17, 2012, Notice of Allowance.
U.S. Appl. No. 13/184,414, Nov. 28, 2012, Notice of Allowance.
U.S. Appl. No. 13/184,414, Jan. 29, 2013, Notice of Allowance.
U.S. Appl. No. 13/189,972, Oct. 29, 2013, Office Action.
U.S. Appl. No. 13/189,972, Jul. 24, 2013, Office Action.
U.S. Appl. No. 13/189,972, Dec. 21, 2012, Office Action.
U.S. Appl. No. 13/189,972, Aug. 22, 2012, Notice of Allowance.
U.S. Appl. No. 13/189,972, May 7, 2012, Office Action.
U.S. Appl. No. 13/189,972, Jan. 5, 2012, Office Action.
U.S. Appl. No. 13/189,972, Sep. 2, 2011, Office Action.
U.S. Appl. No. 13/372,371, May 9, 2013, Office Action.
U.S. Appl. No. 13/507,429, Oct. 25, 2013, Office Action.
U.S. Appl. No. 13/614,640, Oct. 2, 2013, Office Action.
U.S. Appl. No. 13/614,781, Jun. 4, 2013, Office Action.
U.S. Appl. No. 13/614,781, Sep. 12, 2013, Office Action.
U.S. Appl. No. 13/617,270, Sep. 12, 2013, Office Action.
U.S. Appl. No. 13/617,330, Sep. 12, 2013, Office Action.
U.S. Appl. No. 13/619,009, Mar. 7, 2013, Office Action.
U.S. Appl. No. 13/619,009, Sep. 19, 2013, Office Action.
U.S. Appl. No. 13/619,036, Mar. 26, 2013, Office Action.
U.S. Appl. No. 13/619,036, Sep. 16, 2013, Office Action.
U.S. Appl. No. 13/619,054, Mar. 26, 2013, Office Action.
U.S. Appl. No. 13/619,054, Oct. 10, 2013, Office Action.
U.S. Appl. No. 13/620,851, Feb. 8, 2013, Office Action.
U.S. Appl. No. 13/620,853, Feb. 13, 2013, Office Action.
U.S. Appl. No. 13/620,856, Feb. 13, 2013, Office Action.
U.S. Appl. No. 13/361,141, Mar. 19, 2013, Office Action.
U.S. Appl. No. 13/361,141, Aug. 15, 2013, Office Action.
U.S. Appl. No. 13/729,318, Sep. 18, 2013, Office Action.
U.S. Appl. No. 13/755,990, Oct. 2, 2013, Office Action.
U.S. Appl. No. 13/766,775, Sep. 19, 2013, Office Action.
U.S. Appl. No. 13/766,779, Oct. 15, 2013, Office Action.
U.S. Appl. No. 13/372,371, Mar. 26, 2014, Office Action.
U.S. Appl. No. 13/507,429, Mar. 28, 2014, Office Action.
U.S. Appl. No. 13/617,350, Mar. 27, 2014, Office Action.
U.S. Appl. No. 13/619,009, Mar. 12, 2014, Notice of Allowance.
U.S. Appl. No. 13/619,036, Mar. 21, 2014, Office Action.
U.S. Appl. No. 13/729,318, Feb. 5, 2014, Office Action.
U.S. Appl. No. 13/766,775, Mar. 24, 2014, Office Action.
U.S. Appl. No. 10/715,213, Dec. 6, 2013, Notice of Allowance.
U.S. Appl. No. 13/372,371, Nov. 29, 2013, Office Action.
U.S. Appl. No. 13/614,640, Jan. 31, 2014, Office Action.
U.S. Appl. No. 13/614,781, Dec. 26, 2013, Office Action.
U.S. Appl. No. 13/620,851, Nov. 29, 2013, Office Action.
U.S. Appl. No. 13/620,853, Jan. 9, 2014, Office Action.
U.S. Appl. No. 13/620,856, Jan. 9, 2014, Office Action.
U.S. Appl. No. 13/361,141, Jan. 17, 2014, Office Action.
U.S. Appl. No. 13/731,124, Dec. 6, 2013, Office Action.
U.S. Appl. No. 13/755,990, Jan. 29, 2014, Office Action.
U.S. Appl. No. 13/766,781, Nov. 27, 2013, Office Action.
U.S. Appl. No. 13/766,785, Nov. 29, 2013, Office Action.
U.S. Appl. No. 13/766,786, Nov. 27, 2013, Office Action.
U.S. Appl. No. 12/290,827, Jun. 5, 2015, Notice of Allowance.
U.S. Appl. No. 12/290,827, Jul. 8, 2015, Notice of Allowance.
U.S. Appl. No. 13/615,126, Oct. 6, 2014, Office Action.
U.S. Appl. No. 13/615,126, May 8, 2015, Office Action.
U.S. Appl. No. 13/615,142, Oct. 2, 2014, Office Action.
U.S. Appl. No. 13/615,142, May 6, 2015, Office Action.
U.S. Appl. No. 13/618,707, Aug. 5, 2015, Office Action.
U.S. Appl. No. 14/049,069, Aug. 26, 2014, Notice of Allowance.
U.S. Appl. No. 14/323,601, Jul. 31, 2015, Office Action.
U.S. Appl. No. 13/615,126, Jan. 4, 2016, Office Action.
U.S. Appl. No. 13/615,142, Nov. 19, 2015, Office Action.
U.S. Appl. No. 14/327,183, Jan. 20, 2016, Office Action.
U.S. Appl. No. 14/327,216, Feb. 16, 2016, Office Action.
U.S. Appl. No. 60/538,035, filed Jan. 24, 2004, pp. 1-25 "Methods and systems for the display and navigation of a social network".
U.S. Appl. No. 13/618,707, Mar. 4, 2016, Office Action.
U.S. Appl. No. 14/319,898, Feb. 19, 2016, Office Action.
U.S. Appl. No. 14/323,601, Apr. 4, 2016, Notice of Allowance.
U.S. Appl. No. 14/327,164, Feb. 26, 2016, Office Action.
U.S. Appl. No. 14/327,202, Mar. 11, 2016, Office Action.
U.S. Appl. No. 14/328,525, Apr. 11, 2016, Office Action.

(56) References Cited

OTHER PUBLICATIONS

U.S. Appl. No. 14/327,226, Feb. 26, 2016, Office Action.
U.S. Appl. No. 14/554,563, Apr. 5, 2016, Office Action.
U.S. Appl. No. 14/858,166, Mar. 23, 2016, Office Action.
U.S. Appl. No. 14/326,383, Aug. 26, 2016, Office Action.
U.S. Appl. No. 14/327,164, Aug. 18, 2016, Office Action.
U.S. Appl. No. 14/327,183, Jul. 18, 2016, Office Action.
U.S. Appl. No. 14/327,216, Aug. 17, 2016, Office Action.
U.S. Appl. No. 14/327,226, Aug. 25, 2016, Notice of Allowance.
U.S. Appl. No. 14/554,563, Jun. 2, 2016, Notice of Allowance.
U.S. Appl. No. 14/858,166, Aug. 1, 2016, Office Action.
U.S. Appl. No. 13/615,126, Sep. 22, 2016, Office Action.
U.S. Appl. No. 13/615,142, Sep. 16, 2016, Notice of Allowance.
U.S. Appl. No. 13/618,707, Sep. 12, 2016, Office Action.
U.S. Appl. No. 14/327,202, Sep. 6, 2016, Office Action.
U.S. Appl. No. 14/328,525, Oct. 6, 2016, Office Action.

\* cited by examiner

Mail and Spam Controls

1200

Mail and Spam Controls

Select a Screen Name in the dropdown menu below to set controls for:

[InternetAnn ▼] — 1202

☑ Allow this Screen Name to view contents of Spam Folder

Control Who I Get Mail From

- ⦿ Allow mail from all senders — 1204
- ○ Allow mail only from AOL members — 1206
- ○ Allow mail only from People I Know (Who are People I Know?) — 1208
- ○ Block Mail from all senders — 1210
- ○ Use a Custom Sender List — 1212
- ☐ Block mail containing pictures or files — 1214

Block mail should be:

- ⦿ Permanently deleted — 1216
- ○ Delivered to the Spam Folder — 1218

Control What is in the Mail I Get

Deliver the Following to the Spam Folder

Mail from senders in your Address Book and Buddy List will always be delivered to your main mailbox.

- ☑ Mail filtered by AOL's Advanced Spam Filter — 1220

AOL's Advanced Spam Filtering will automatically move junk mail and unwanted mail to your Spam Folder

- ☐ Mail with clickable hyperlinks (URLs) — 1222
- ☐ Mail containing words on my Custom Word List — 1224

[Save & Copy]

[Save] — 1226    [Cancel] — 1228

AOL Keyword: Spam Controls

Figure 12

MANAGING ELECTRONIC MESSAGES BASED ON INFERENCE SCORES

CROSS REFERENCE TO RELATED APPLICATIONS

This application is a continuation of U.S. application Ser. No. 13/372,371, filed on Feb. 13, 2012, which is a continuation of U.S. application Ser. No. 10/747,682, filed on Dec. 12, 2003, now issued as U.S. Pat. No. 8,117,265, which claims priority under 35 USC §119(e) to U.S. Provisional Patent Application Ser. No. 60/457,320, filed on Mar. 26, 2003, and U.S. Provisional Patent Application Ser. No. 60/488,376, filed on Jul. 21, 2003, all of which are hereby incorporated by reference in their entirety.

TECHNICAL FIELD

This description relates to network communications.

BACKGROUND

With the advent of the Internet and a decline in computer prices, many people are communicating with one another through computers interconnected by networks. A number of different communication mediums have been developed to facilitate such communications between computer users.

SUMMARY

Generally, techniques for providing online presence information are described. A list of people known to a user is maintained. Online presence information for the user is accessed and a potential receiver of the online presence information is determined. The potential receiver is compared to the maintained list to determine if the potential receiver is included on the list. Whether to communicate the online presence information to the potential receiver is determined based on whether the potential receiver is included in the list.

Implementations may include one or more of the following features. For example, determining whether to communicate the online presence information to the potential receiver may include determining to not communicate the online presence information to the potential receiver when the potential receiver is not included in the list.

Determining whether to communicate the online presence information to the potential receiver may include determining whether to communicate the online presence information to an instant messaging application of the potential receiver; determining whether to display the online presence information on a web page; determining whether to display the online presence information in member search results; and/or determining whether to display the online presence information in a member profile.

Determining whether to communicate the online presence information to the potential receiver may include determining whether to communicate the online presence information to the potential receiver when a request for online presence information is received from the potential receiver. Alternatively, determining whether to communicate the online presence information to the potential receiver may include determining whether to communicate the online presence information to the potential receiver absent a request from the potential receiver for the online presence information.

An inference that a person is associated with the user may be made based on positive user actions related to e-mail communications from the person and the inferred person may be added to the list. The positive actions may include sending an e-mail to the person; replying to, forwarding, saving, or printing an e-mail received from the person; moving an e-mail from a first folder to a second folder; or leaving an e-mail from the person open for a predetermined period of time. When the actions include moving an e-mail from a first folder to a second folder, the first folder may be an inbox folder and the second folder may be a folder other than a delete folder or a spam folder.

An inference that a person is associated with the user may be made based, at least in part, on detecting a communication between the user and the person and the inferred person may be added to the list. The communication may be an instant messaging communication.

An inference that a person is associated with the user may be made and the inferring that the person is associated with a user may include accessing a contact list of the user to determine a first contact on the user's contact list; and accessing a contact list of the first contact to determine a second contact on the first contact's contact list.

An inference that a person is associated with the user may be made based, at least in part, on detecting user actions that mitigate against factors that otherwise are used to infer a person is known to the user. The user actions may include the user taking steps to report a communication from the person as spam; add a person to a blacklist; and/or move a communication from the person to either of a spam folder or a delete folder.

The user may be enabled to expressly designate a person as associated with the user and the designated person may be added to the list.

Implementations of the described techniques may include hardware, a method or process, or computer software on a computer-accessible medium.

The details of one or more implementations are set forth in the accompanying drawings and the description below. Other features will be apparent from the description and drawings, and from the claims.

DESCRIPTION OF DRAWINGS

FIG. 12 is an illustration showing an interface for setting and modifying mail and spam controls.

DETAILED DESCRIPTION

The people a user is presumed to know or be associated with may be determined using a number of techniques. The user may specify the people known to him manually, for example, by making manual changes to an address book, buddy list, or white list. Alternatively, or additionally, the people known to a user may be inferred by monitoring the actions of the user. For example, people to whom the user sends e-mail may be considered as known to the user. Likewise, saving a message from a person may signal that the user knows that person.

This information about people that the user knows is used in relation to the user's communications. For example, a display of e-mail may only show the user e-mails from known people. The names on the list also may be added to a white list, whereby the list of known people may be used to restrict accepted e-mail to only those people the user knows or otherwise. The list also may be used to restrict instant messages or chat request to only those people who the user knows. In addition, a list of known people may be used to restrict access to a user's presence, such that access to presence may be provided only to those people that the user knows.

Figure 1:
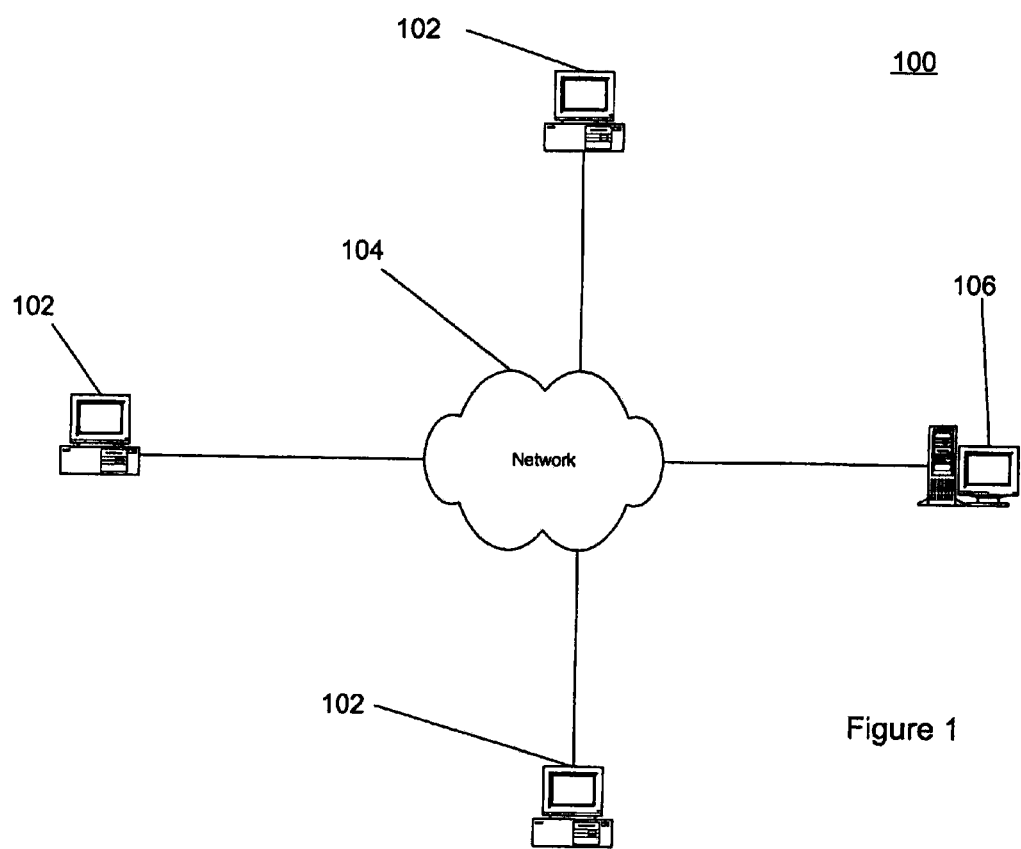
FIG. 1 is a block diagram of an exemplary networked computing environment.

Referring to FIG. 1, an exemplary networked computing environment 100 supports communications between computer users. Computer users are distributed geographically and communicate using client systems 102. A network 104 interconnects client systems 102. Client systems 102 are connected to network 104 through various communication mediums, such as a modem connected to a telephone line (using, for example, serial line internet protocol (SLIP) or point-to-point protocol (PPP)) or a direct internetwork connection (using, for example, transmission control protocol/internet protocol (TCP/IP)).

Each of the client systems 102 may be implemented using, for example, a general-purpose computer capable of responding to and executing instructions in a defined manner, a personal computer, a special-purpose computer, a workstation, a server, a device, a component, or other equipment or some combination thereof capable of responding to and executing instructions. Client systems 102 may receive instructions from, for example, a software application, a program, a piece of code, a device, a computer, a computer system, or a combination thereof, which independently or collectively direct operations, as described herein. These instructions may take the form of one or more communications programs that facilitate communications between the users of client systems 102. For instance, such communications programs may include e-mail programs, instant messaging (IM) programs, file transfer protocol (FTP) programs, and voice over internet protocol (VoIP) programs. The instructions may be embodied permanently or temporarily in any type of machine, component, equipment, storage medium, or propagated signal that is capable of being delivered to the client systems 102.

Client systems 102 include a communications interface (not shown) used by the communications programs to send communications through network 104. The communications may include e-mail, audio data, video data, general binary data, or text data (e.g., encoded in American Standard Code for Information Interchange (ASCII) format). Client systems also include one or more input devices, such as a keyboard, mouse, stylus, or microphone, as well as one or more output devices, such as a monitor, touch screen, speakers, or a printer.

The network 104 typically includes a series of portals interconnected through a coherent system. Examples of the network 104 include the Internet, Wide Area Networks (WANs), Local Area Networks (LANs), analog or digital wired and wireless telephone networks (e.g. a Public Switched Telephone Network (PSTN)), an Integrated Services Digital Network (ISDN), or a Digital Subscriber Line (xDSL)), or any other wired or wireless network. The network 104 may include multiple networks or subnetworks, each of which may include, for example, a wired or wireless data pathway.

A host server 106 also may be connected to network 104 and may be used to facilitate some direct or indirect communications between the client systems 102. As with the client systems 102, host server 106 may be implemented using, for example, a general-purpose computer capable of responding to and executing instructions in a defined manner, a personal computer, a special-purpose computer, a workstation, a server, a device, a component, or other equipment or some combination thereof capable of responding to and executing instructions. Host server 106 may receive instructions from, for example, a software application, a program, a piece of code, a device, a computer, a computer system, or a combination thereof, which independently or collectively direct operations, as described herein. These instructions may take the form of one or more communications programs. For instance, such communications programs may include e-mail programs, IM programs, FTP programs, VoIP programs, etc. The instructions may be embodied permanently or temporarily in any type of machine, component, equipment, storage medium, or propagated signal that is capable of being delivered to the host server 106.

Further, host server 106 includes a communications interface (not shown) used by the communications programs to send communications through network 104. The communications may include e-mail, audio data, video data, general binary data, or text data (e.g., encoded in American Standard Code for Information Interchange (ASCII) format).

Each client system 102 has one or more associated users, and a user of a client system 102 may desire to have aspects of his or her communications with other users controlled based on whether the other users are known. In order to facilitate such control, a list is maintained. The list contains the people the user is presumed to know. The list may be maintained on a client system 102, host server 106, or another device connected to network 104.

The term "people" is used throughout to refer to the entities with which communication occurs. However, communication can occur with entities that are not individual human beings. Communications can occur with a company, an organization, or a system that is not itself a human being. For example, e-mail can be sent to the technical support group at a computer software company. The term "people" is used throughout to more generally refer to all entities with which communications can occur, including entities that are not natural people. In addition, when "people" are described as known, it means that at least one of the various communication identifiers associated with them are known, whether or not the people/entities themselves are actually known.

A communication identifier is an identifier of the "person" used to communicate with the "person." Communication identifiers can be, for example, an address, such as an e-mail address, a screen name, or an internet protocol (IP) address, or it can be a number, such as a telephone number or a VoIP number. In one implementation, these communication identifiers are stored in the list of known people. Storing the communication identifier in the list facilitates easy recognition of communications from a known person, thereby facilitating control over aspects of such communications based on whether the sender is known. Thus, the term "people" or "person" should be understood as having a meaning that includes any identifier of a person or organization.

Figure 2:
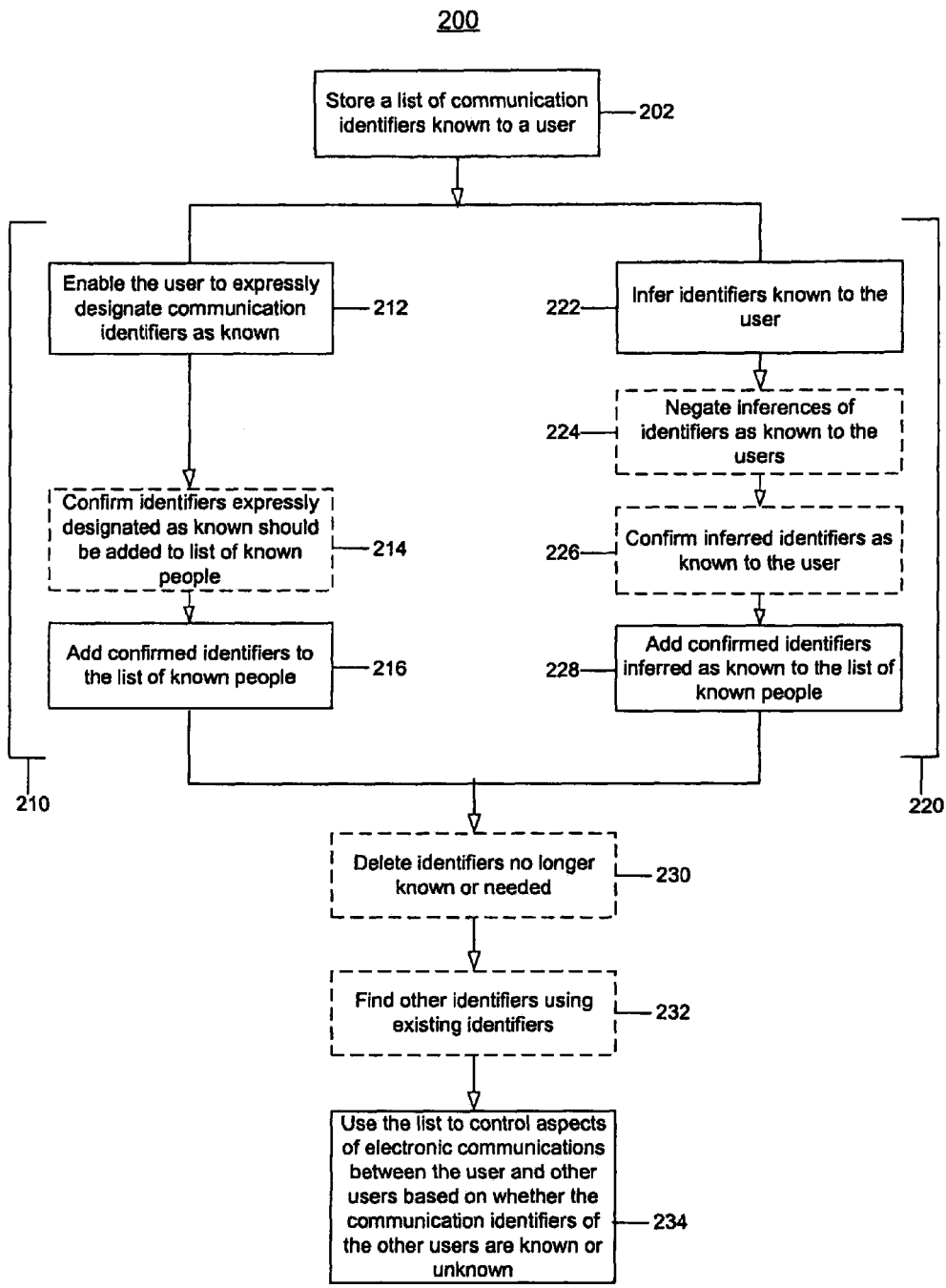
FIG. 2 is a flow chart showing a process for maintaining and using a list of known people.

Referring to FIG. 2, a process 200 is used to maintain and use the list of people known to the user. A list of people known to the user is stored (202). Communication identifiers are stored in the list to indicate the known people.

The user can make manual additions to the list of known people (210). To that end, the user is enabled to expressly designate communication identifiers as known (212). For example, a graphical user interface (GUI) that allows the user to enter communication identifiers may be provided. There may also be a speech-based interface that allows the user to add communications identifiers to the list of known people by saying them. These interfaces may allow the user to augment the list of known people indirectly by allowing them to make additions to a contact list such as, for example, a custom sender list, an address book, or a buddy list.

However, the user may want to manually add a person to a contact list but not to the list of known people. An interface optionally may be presented to enable the user to confirm that the manually entered communication identifiers should be added to the list of known people (214). The confirmation may be enabled by way of a GUI that allows the user to select the entered communication identifiers that the user actually wants to be included in the list of known people. This confirmation may occur after a predetermined number of communication identifiers have been entered, or at login or logoff to seek confirmation of any people entered during the previous online session. Those identifiers that the user confirms then are added to the list (216). When a confirmation interface is not presented, all entered communication identifiers are added to the list of known people. Alternatively, there may be an interface that allows the user to directly enter identifiers into the list of known people.

On the other hand, communication identifiers may be inferred as being known based on the actions of the user (220). First, the communication identifiers known to the user are inferred (222). For example, a communication identifier may be inferred as known if an e-mail message to that communication identifier is sent. When an instant messaging program is used, the communication identifier of the person with whom the user is communicating may be designated as known to the user.

Known communication identifiers may be inferred based on user interactions with a received message. For example, a communication identifier also may be inferred as known if a message from that communication identifier is read, replied to, forwarded, saved, or printed. Likewise, the communication identifier that sent the e-mail message may be designated as known if the message is moved from the "inbox" to a folder that is not marked for deletion or for spam, or if the message is left open for a predetermined amount of time.

Known communication identifiers also may be inferred based on indicia other than user actions. As an example, the people designated as known to the people the user knows may be designated as being "known" to the user. For instance, if a person B is designated as someone user A knows, then the people designated as known to person B also may be designated as "known" to user A. One way this may be implemented is, for example, to designate the people in an address book and/or buddy list of person B as known to user A.

When inferring known people, some actions may be taken into account to negate an inference that the person is known (224). For instance, if an e-mail received from a person is forwarded to an e-mail address that has been designated for reporting spam, then the inference that the user knows the person may be negated. As another example, an inference that a person is known may be negated if the person is included on an explicit black list of people with which communication should not occur, created by the user or the network administrator.

After known communication identifiers are inferred, an interface optionally may be presented to enable the user to confirm that the inferred communication identifiers are in fact known (226). The confirmation may be enabled by way of a GUI that allows the user to select inferred communication identifiers that the user actually knows or wants to be included in the list of known people. This confirmation may occur after a predetermined number of communication identifiers have been inferred as known, or at login or logoff to seek confirmation of any people identified in the previous online session. Those identifiers that the user confirms then are added to the list (228). When a confirmation interface is not presented, the inferred identifiers are added to the list.

Branches 210 and 220 may occur simultaneously or sequentially. After at least one of the branches has occurred, the user optionally may view the list of known people, and he or she may delete those users that are no longer known or needed (230). In addition, communication identifiers in the list of known people can be used optionally to find other communication identifiers for that person (232). For example, a person's e-mail address may be obtained from a profile associated with a screen name. Similarly, if the e-mail address is known, it may be used to obtain the screen name. The screen name, e-mail, or other determined communication identifiers may be used to determine other ways in which the known person may communicate with the user or in which the user may communicate with the known person.

At this point, the list can be used to control aspects of the electronic communications between the user and other users based on whether the communication identifiers of the other users are known or unknown (234). For example, in an e-mail system that performs spam filtering, the e-mail addresses of known people may be added to a white list, which designates e-mail addresses that should not be filtered or otherwise treated as spam.

The e-mail addresses of the known people also may be used to filter or sort a display of e-mail such that e-mails from people on the list are shown more prominently than e-mails from people not on the list. For instance, the user may be able to indicate that only e-mails from known people are shown. In this case, only e-mails from people on the list of known people are shown in the display of e-mail. Alternatively, or additionally, e-mails from known people may be displayed in bold, while e-mails from people not on the list are not displayed in bold. Another manner of displaying known people prominently includes grouping all of the e-mail from known people in one position of the display, for example, at the beginning or at the end of a list of e-mails.

The e-mail addresses of known people may be used to restrict accepted e-mail to only those people the user knows. Similarly, the IM screen names of known people may be used to restrict instant messages or chat requests to only those people who the user knows.

Further, the list of known people may be used to restrict displays of online presence information t those people on the list. For example, the IM screen names of known people may be used to restrict who can view presence information of the user to those people the user knows. That is, other users may be restricted from viewing whether the user is online unless the other users are people the user knows. Also, some services such as ICQ (which is an instant messaging service) and America Online display online presence information through channels other than an IM buddy list. Such displays of online presence information also may be restricted, as described further below.

Additionally, by determining multiple communication identifiers as described above, aspects of the user's communication on multiple different messaging mediums can be controlled. For example, aspects of the user's communication using a combination of, for example, e-mail and instant messaging clients can be controlled using the list of known people.

Figure 3:
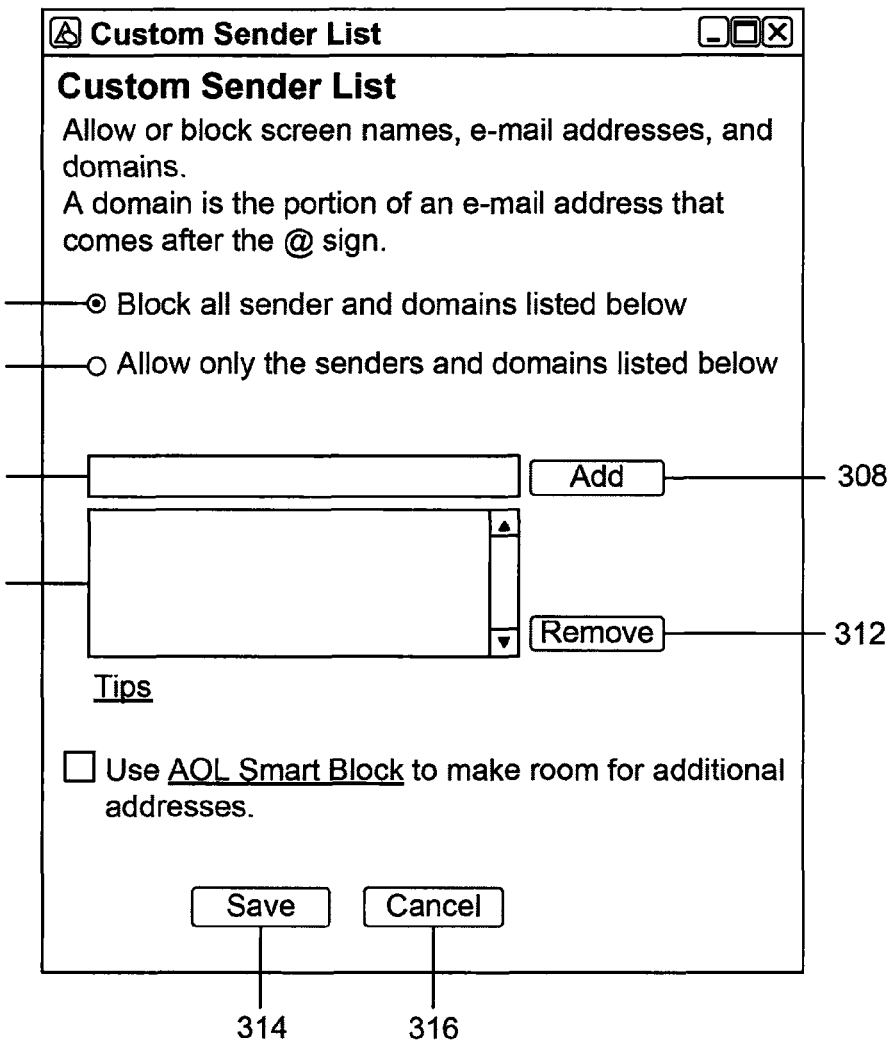
FIG. 3 is an illustration showing an interface for manually specifying white and black lists.
Figure 4:
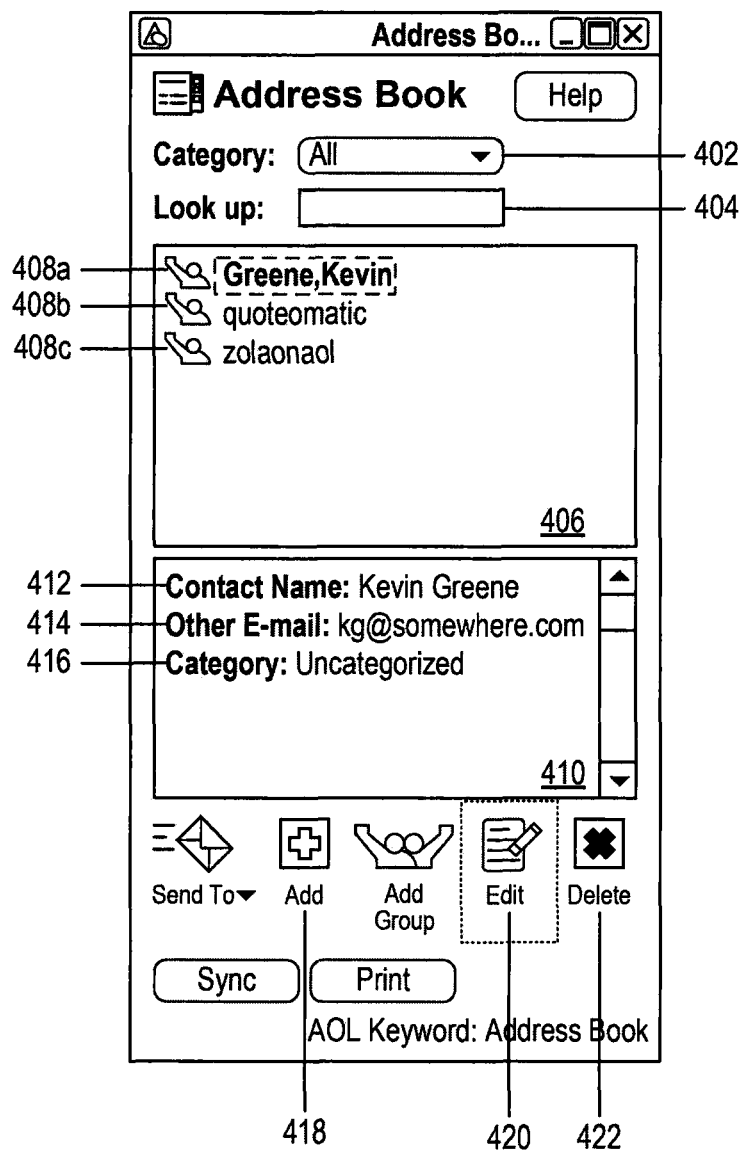
FIG. 4 is an illustration showing an interface for an address book.
Figure 5:
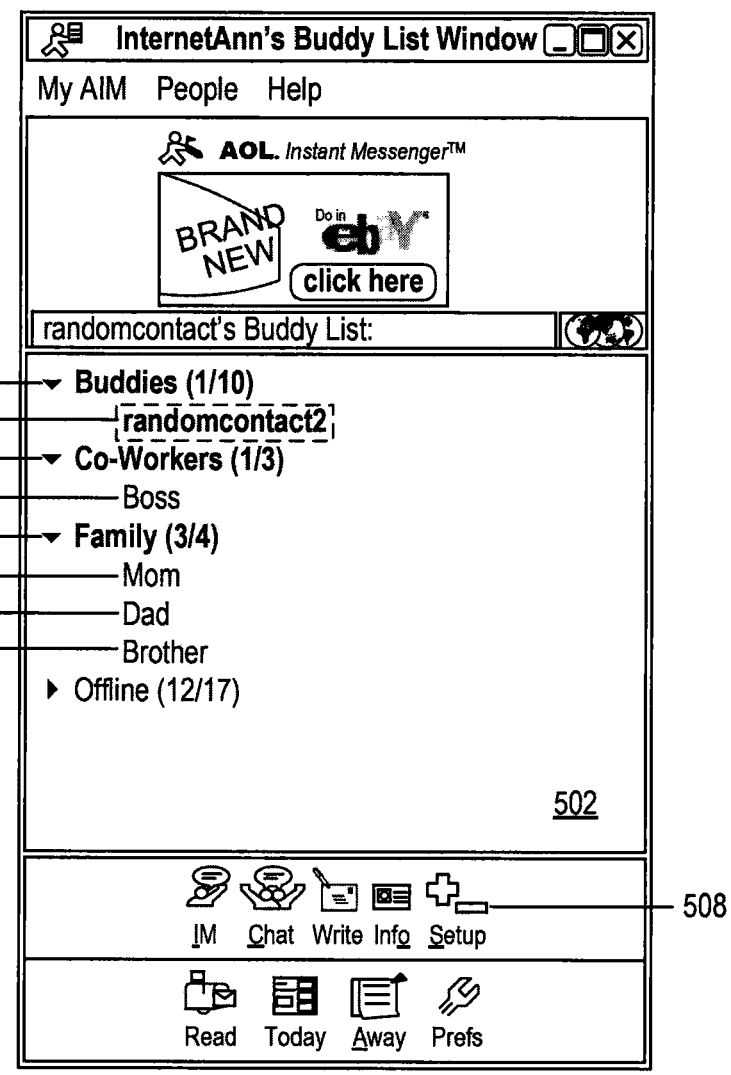
FIG. 5 is an illustration showing an interface for an instant messaging client program.

FIGS. 3-5 show exemplary manners in which known people can be expressly designated by putting them in a contact list. The contact list may be, for example, a white list, an address book, or an instant messaging buddy list. The people added to one or more of the contact lists then are added to the list of known people.

Referring to FIG. 3, a custom sender list interface 300 allows for manual addition of communication identifiers to the list of known people through specification of a white list and a black list. A white list designates the e-mail addresses that should not be filtered such that e-mail messages from those addresses are delivered to the user without, e.g., subjecting the e-mails to spam filtering. On the other hand, a black list designates the e-mail addresses that should be filtered such that e-mail messages from those addresses are treated as spam and are not shown to the user. The custom sender list interface 300 enables the user to expressly designate communication identifiers as known by adding them to the white list. The identifiers placed on the white list then are added to the list of known people.

Selecting radio button 302 signals specification of a black list, while selecting radio button 304 signals specification of a white list. Only one of radio buttons 302 and 304 may be selected at once. A communication identifier can be typed into the text field 306. The communication identifier entered in the text field 306 can be added to the black list or white list, depending on whether radio button 302 or radio button 304 is selected, by clicking on the "Add" button 308. This action will add the entered communication identifier, along with all other previously entered communications identifiers, into the text box 310.

A communication identifier can be selected from the list contained in the text box 310 by clicking on the communication identifier. Subsequently clicking on a "Remove" button 312 will eliminate that communication identifier from the list. Any changes made to the black list or the white list can be saved by clicking on a "Save" button 314, and any changes can be undone and discarded using a "Cancel" button 316.

Referring to FIG. 4, an address book interface 400 allows for manual addition of people to the list of known people through the addition of entries to an address book. Each entry in the address book contains information about a specific person, including the communication identifiers for that person. The address book interface 400 enables the user to expressly designate communication identifiers as known by adding them to entries within the address book. These identifiers are then added to the list of known people. The address book interface 400 may provide the user with an option for preventing the addition of communication identifier to the list of known people when the identifier is added to the address book. The option may prevent the addition for the identifier currently being added, or when the option is selected, may prevent all entered identifiers from being added to the list of known people.

The address book interface 400 contains a contact list 406 in which the contacts in the address book are listed. All entries in a selected category and/or matching a current searching criteria are listed by name in the contact list 406. The contact list 406 illustrated contains three entries, entry 408a for "Kevin Greene," entry 408b for "quoteomatic," and entry 408c for "zolaonaol."

The address book interface 400 also contains a personal information list 410 for displaying the personal information for an entry in the address book. Selecting an entry from those listed in the contact list 406 causes the information for the corresponding person to be displayed in personal information list 410. For example, selecting entry 408a for Kevin Greene lists his personal information in the personal information list 410. The personal information includes his contact name 412 (Kevin Greene), an e-mail address 414 (kg@somewhere.com), and a category 416 (Uncategorized, which means the entry 408a was never placed into a category). Other pieces of information, including other communication identifiers, may be included in the personal information list 410.

Address book interface 400 also includes buttons 418-422 for adding, deleting, and modifying entries in the address book. Entries may be added to the address book by clicking on the "Add" button 418. This will invoke a dialog box in which the necessary information for a new entry in the address book can be entered. Existing entries can also be modified by selecting an entry from those listed in text box 406 and subsequently clicking on the "Edit" button 420. This will invoke a dialog box populated with information from the existing entry. This information can be changed, and information can be added to it. Finally, existing entries can be removed from the address book by selecting an entry from those listed in text box 406 and subsequently clicking on the "Delete" button 422. Any communication identifiers added to the address book through use of the address book interface 400 are considered to be known, so they are added to the list of known people.

Entries in the address book may be filed into different categories. The address book interface enables the user to view all entries in a specific category; it also enables the user to view all entries in the address book, regardless of category. The available categories are listed in a drop down category selection box 402. Selecting a category name from the category selection box 402 will filter the set of entries in the address book to include only those belonging to the selected category. Selecting "All" from the category selection box 402 will include all entries in the address book. The set of entries in the address book can be searched using the search text box 404. The search criteria can be entered into the search text box 404. The set of entries is filtered to contain only those entries meeting the search criteria entered into the search text box 404. The illustrated entries are the total entries may in the address book because the option "All" was selected from the selection box 402, and no search criteria have been entered into search text box 404. Thus the address book only contains the three entries listed in contact list 406.

Referring to FIG. 5, a buddy list interface 500 allows for manual addition of people to the list of known people through addition of screen names to a buddy list. A screen name is a communication identifier for a person in an instant messaging system. Messages are addressed to users of the instant messaging system using their screen names. The buddy list for a user of the instant messaging system is a list of screen names for people with which the user communicates. The buddy list interface 500 enables the user to expressly designate communication identifiers as known by adding them to his or her buddy list. These identifiers are then added to the list of known people.

The buddy list interface 500 contains a text box 502 that contains the buddy list for a screen name "InternetAnn". The buddy list includes multiple screen names. The buddy list in buddy list interface 500 contains the screen name 504a, "randomcontact2," the screen name 504b, "Boss," the screen name 504c, "Mom," the screen name 504d, "Dad," and the screen name 504e, "Brother."

The buddy list may be separated into one or more buddy groups, and each buddy may belong to one of the buddy groups. When an IM client program for a person appearing in the buddy list is available to receive communications (i.e., a state commonly referred to as "present"), the screen name of the buddy in the buddy list is displayed or visually distinguished from other buddies not presently available to receive communications or otherwise not having an equivalent state. In the interface shown, present buddies have their screen names displayed under a buddy group heading for the buddy group to which they belong. The buddy group headings also contain the number of screen names from that buddy group currently logged into the instant messaging system and the total number of people in that buddy group. For example, the buddy group heading 506a says that one out of the ten members of the buddy group named "Buddies" is logged into the system. That one member is the user with screen name 504a, since that screen name 504a is listed under the buddy group heading 506a. Likewise, buddy group heading 506b says that one out of three members of the "Co-Workers" buddy group is logged in, and that member is the user with screen name 504b. Similarly, the users with the screen names 504c, 504d, and 504e are logged into the system and are members of the buddy group named "Family," which only has one member currently not logged in, according to buddy group heading 506c. The buddy list interface 500 contains a "Setup" button 508, which, when selected enables the user to add screen names to the displayed buddy list. The screen names added to a user's buddy list using the buddy list interface 500 are considered to be known to the user, and are added to the list of known people. The address book interface 400 may provide the user with an option for preventing the addition of communication identifier to the list of known people when the identifier is added to the address book. The option may prevent the addition for the identifier currently being added, or when the option is selected, may prevent all entered identifiers from being added to the list of known people.

Exemplary techniques for inferring known people from the actions of the user are described in conjunction with FIGS. 6-9. Actions of the user while reading, sending and managing e-mail can lead to the inference that the people sending and receiving that e-mail are known to the user. In addition, the contacts of those people known to the user may be inferred to be known directly by the user. Inferred people are added to the list of known people after an optional user confirmation.

Figure 6:
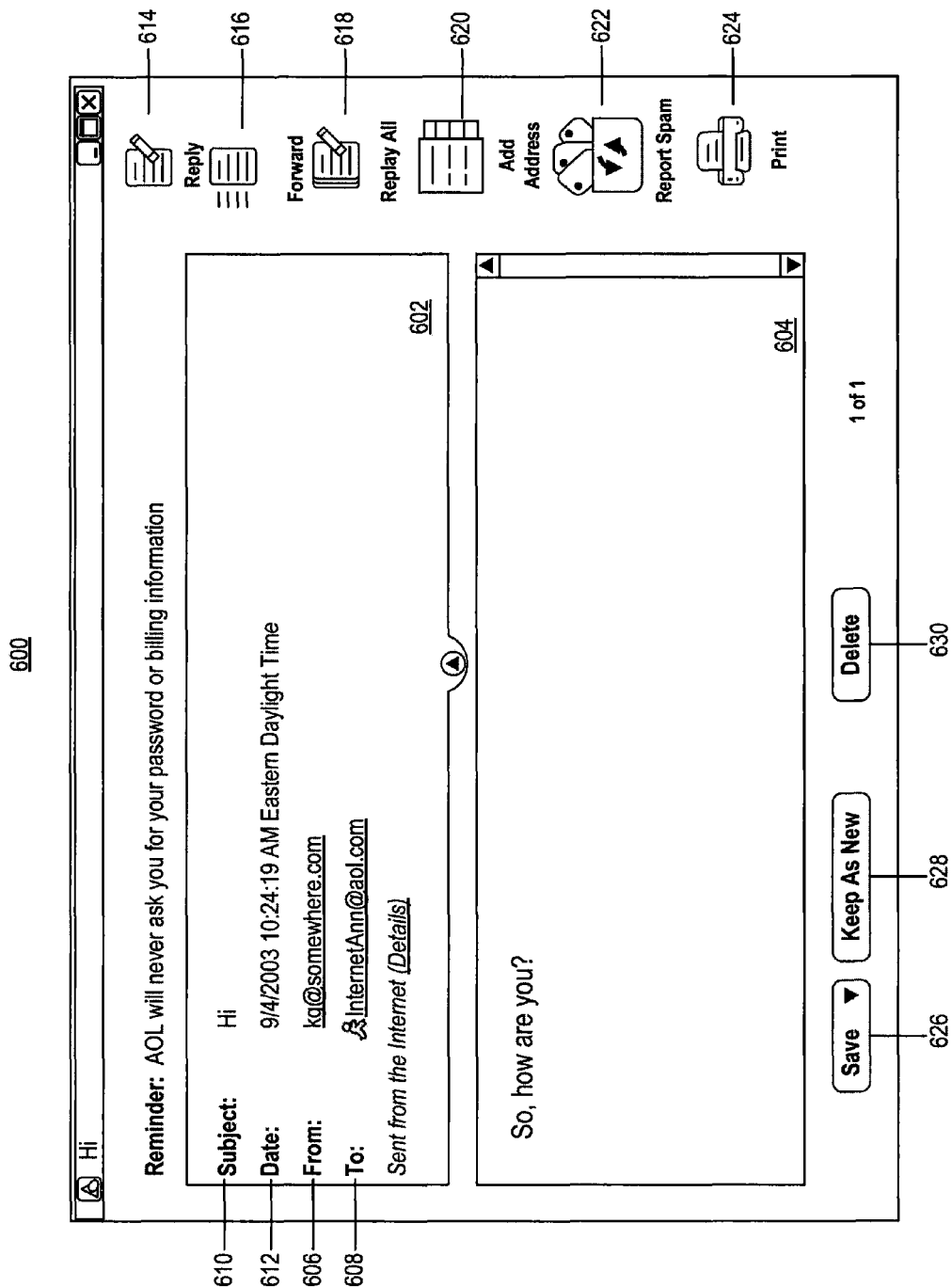
FIG. 6 is an illustration showing an interface for reading e-mail messages.

Referring to FIG. 6, use of an e-mail reading interface 600 can lead to the inference of people as known to the user. In using the e-mail reading interface 600, the user may perform certain actions while reading a message that signal that the user knows the person who sent the message. Conversely, the user may perform certain actions that signal that the user does not know the person who sent the message. If the sender of the e-mail is inferred to be known to the user based on these actions, the person who sent the e-mail is added to the list of known people.

The e-mail reading interface 600 has two major sections, 602 and 604, that show the details of the message that is currently being read. Section 602 lists the header information for the message that is currently being read. The header information includes the sender's address 606, the recipient's address 608, the subject 610 of the message, and the time 612 the message was received. The message shown was sent to InternetAnn@aol.com with a subject of "Hi" by kg@somewhere.com at 10:24 AM on Sep. 4, 2003. Section 604 contains the body of the message, which in this case is "So, how are you?"

To the right and below the contents of the displayed message are a series of buttons 614-630 that enable activity based on the displayed message. For example, a "Reply" button 614 invokes an interface for writing a reply to the sender of the displayed message. Similarly, a "Forward" button 616 invokes an interface for forwarding the displayed message. A "Reply All" button 618 has the same function as the "Reply" button 614, except that the reply message is addressed to all recipients of the displayed message.

An "Add Address" button 620 adds an entry to the address book for the sender of the displayed message. The entry includes the sender's address 606. A "Report Spam" button 622 sends a message to a service responsible for blocking spam e-mail messages. A "Print" button 624 sends the message to the printer. A "Save" button 626 expands into two options, one for saving the message on a host server, and one for saving the message locally. A "Keep As New" button 628 marks the displayed message as never having been read, and a "Delete" button 630 may immediately delete the message, or it may move the message to a temporary holding place for deleted messages.

The actions of the user while interacting with the e-mail reading interface 600 may lead to the inference that the user knows or does not know the sender of the messages that he is reading. In cases where the user is believed to know the sender of the message, the sender's e-mail address is added to the list of known people. For example, replying to the message by clicking on the "Reply" button 614 may support the inference that the sender is known. In addition, pressing the "Forward" button 616 to forward the message may support an inference that the sender, as well as all people to which the message is forwarded, are known. Similarly, pressing the "Reply All" button 618 may lead to an inference that the sender and all other recipients are known.

Pressing the "Add Address" button 620 to create an entry in the user's address book for the sender of the e-mail may lead to the inference that sender is known. On the other hand, clicking on the "Report Spam" button 622 may negate an inference that the sender is known to the user. Clicking the "Print" button 624, using the "Save" button 626, or marking the displayed message as not read with the "Keep As New" button 628 also may support an inference that the sender is known.

Leaving interface 600 open for a predetermined period of time (e.g., 30 seconds) is another action that may support an inference that the sender is know.

A number of techniques may be used to determine when a sender is inferred as known based on the above described actions. For example, a sender may be inferred as known based simply on the user performing a single one of the actions that support an inference that the sender is known. Alternatively, or additionally, combinations of actions may result in the inference that the sender is known. For example, some number of actions greater than one may be required to add the sender to the list of known people. Also, certain fixed combinations of actions may result in the addition of the sender to the list of known people. That is, certain combinations may be designated as indicating that the communication identifier is know and, when those combinations occur, the identifier is added to the list of known people. For example, replying to and saving the message may cause the sender to be added to the list of known people, but keeping the message as new and printing it may not.

As another example, each of the different possible actions may have an associated score indicative of how strongly the action suggests the identifier is known, and a certain aggregate score (a threshold score) may be required to add the sender to the list of known people. That is, the actions may be detected, an aggregate score may be determined from the associated scores, and a comparison to a threshold score may be made to infer whether the person is known to the user and, consequently, is added to the list of known people. An implementation of this technique may assign positive scores to actions supporting an inference, assign negative scores to actions negating an inference, and require a particular positive aggregate score before the identifier is inferred as known. Other methods of combining the actions of the user to infer that the sender is known to the user are possible.

When replying to a message using the "Reply All" button 618, all recipients of the message may not be known, especially when there is a large number of people to whom the original message was carbon copied. Additional actions may be required to show that the people to whom the message was carbon copied are known even though a message is sent to them, which might normally lead to the inference that the people are known. The number of people to whom the original message was carbon copied may influence the number or combinations of actions further needed to add the carbon copied recipients to the list of known people.

Figure 7:
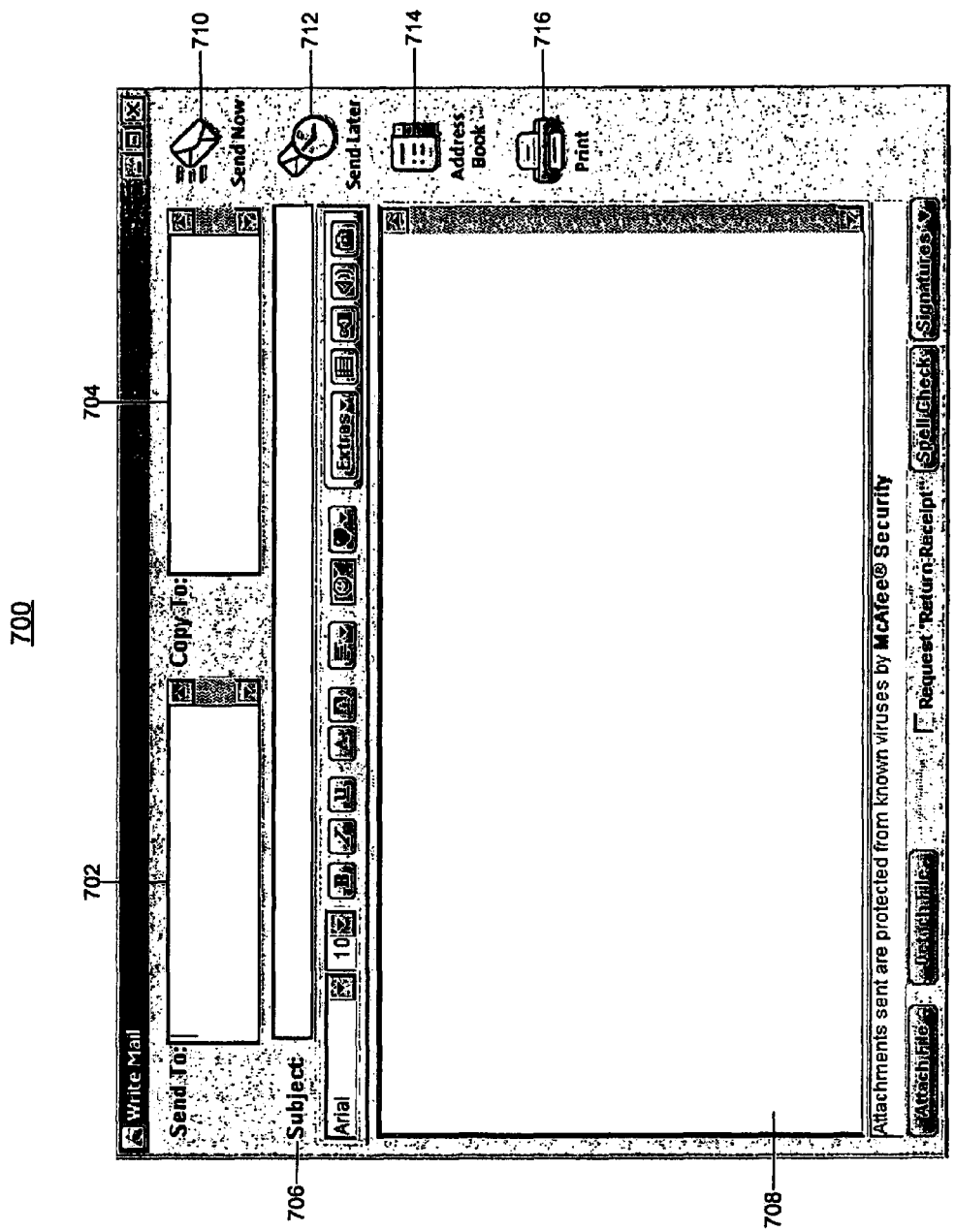
FIG. 7 is an illustration showing an interface for writing e-mail messages.

Referring to FIG. 7, use of an e-mail writing interface 700 can lead to people being added to the list of known people. In using the e-mail writing interface 700, the user may perform certain actions while writing a message that will signal that the user knows the people to whom the message will be sent. If the recipients of the e-mail are inferred to be known to the user, they are added to the list of known people.

The e-mail writing interface 700 contains multiple text fields 702-708 that can be used to specify the different parts of the message to be sent. For example, the user can specify the recipients of the message using a text field 702, labeled "Send To," and a text field 704, labeled "Copy To." The user can also specify the subject of the message in a "Subject" text field 706. Finally, the user can type the body of the message in a body text field 708.

A series of buttons 710 to 716 to the right of the text fields 702-708 govern how the message specified by the text fields 702-708 is processed. Clicking on a "Send Now" button 710 immediately processes and sends the message to the specified recipients. Clicking on a "Send Later" button 712 processes the message for sending to its intended recipients at a later time. An "Address Book" button 714 will invoke an address book interface 400. The address book interface 400 may be used to specify the recipients of the message. E-mail addresses from entries in the address book can be used to populate the text fields 702 and 704 that contain the recipients of the message. Clicking a "Print" button 716 sends the message to the printer.

The actions of the user while using the e-mail writing interface may lead to the inference that the intended recipients of the message that is being written are known to the user. The people entered in these text boxes 702 and 704 will be added to the list of known people if the user is inferred to know the people to whom the message will be sent. For example, using either the "Send Now" button or the "Send Later" button to send the message that is being written leads to the inference that the recipients of the message listed in text fields 702 and 704 are known. Likewise, printing the message with the "Print" button 716 leads to the inference that the intended recipients are known. In addition, the address book interface 400 that was invoked by the "Address Book" button 714 can be used to manually add entries to the address book, which will result in additions to the list of known people, as was described above.

If the recipients are inferred to be known, then they are added to the list of known people. Individual actions of the user while using the e-mail writing interface 700 that lead to the inference that the recipients are known may cause the recipients to be added to the list of known people, or a combination of actions may signal that the recipients should be added to the list of known people, as was described above.

The e-mail reading interface 600 and the e-mail writing interface 700 may also contain a button that enables the user to manually add the people with whom the user is communicating to the list of known people if the people are not added automatically in the manners described above. For example, clicking on the button in the e-mail reading interface 600 would cause the sender of the message to be added to the list of known people. Likewise, clicking on the button in the e-mail writing interface 700 would cause the recipient of the e-mail to be added to the list of known people.

Figure 8:
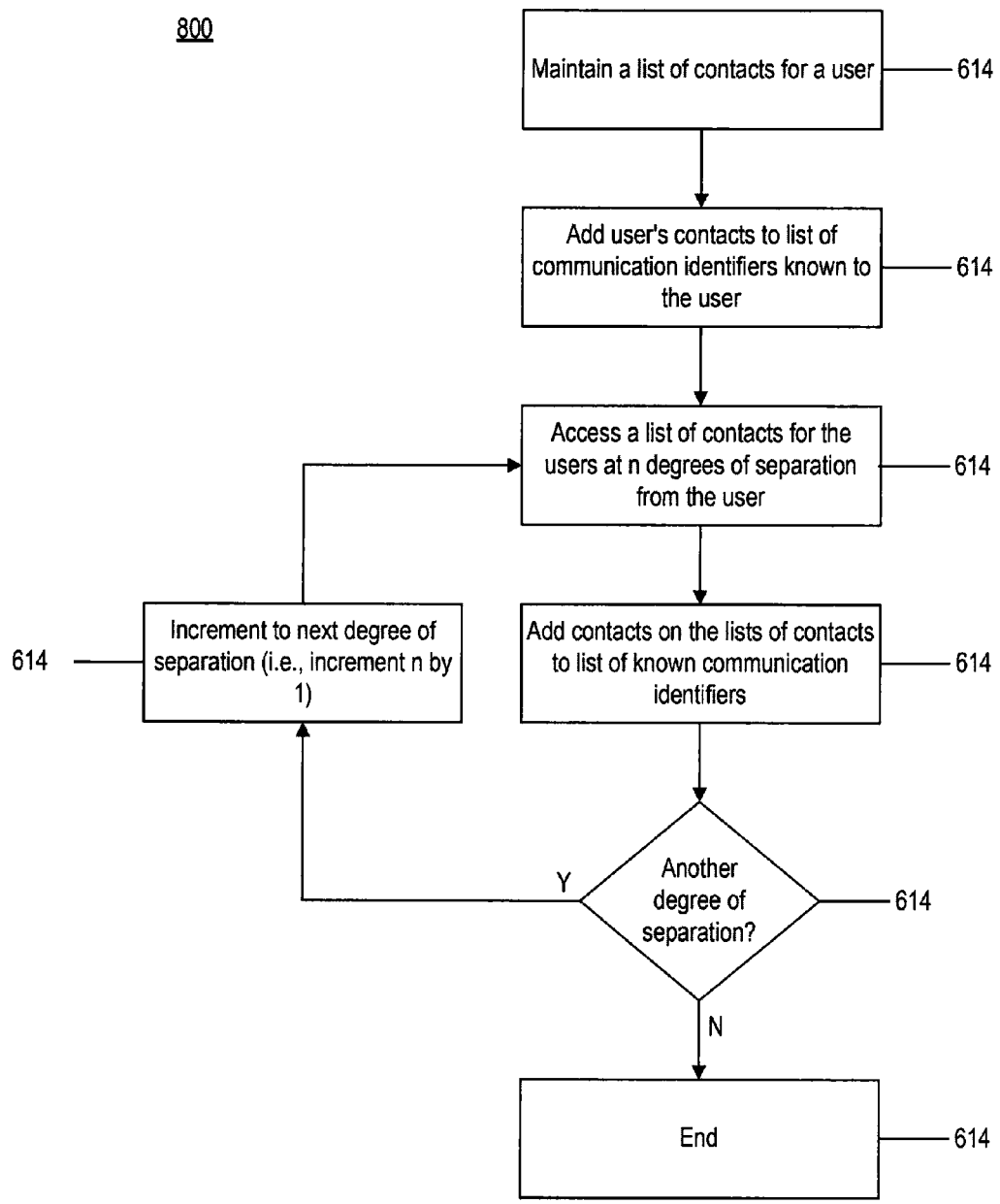
FIG. 8 is a flow chart showing a process for inferring contacts of other users as known.

Referring to FIG. 8, a process 800 may be used to infer people within a certain number of degrees of separation from the user as known to the user. The degree of separation between two entities describes a relationship between those entities. Typically, the characteristics of user contact lists (e.g., address book, buddy list, and/or white list) are evaluated to determine the number of degrees (or hops) that are required to link or relate two users.

For example, recipient A may list user B in recipient A's address book, user B may list user C in user B's address book, and user C may list sender D in user C's address book. Here, sender D is linked to recipient A by two degrees of separation (with user B as the first degree and user C as the second degree). Recipient A is related to user C by one degree of separation (user B) and user B is separated from sender D by one degree of separation (user C). Recipient A and user B, users B and C, and user C and sender D are each respectively separated by zero degrees of separation.

A list of contacts is maintained for the user (802). The list of contacts may be any personally maintained list or lists, for example, an address book, a buddy list for instant messaging, and/or a white list. The rest of process 800 will be described using an address book as an example of a list of contacts. The contacts in the user's address book are added to the user's list of known people (804).

Next, the contacts linked to the user (i.e., up to a desired degree of separation) are identified and added to the user's list of known people. To do so, the address books of each contact in the user's address book are accessed (806). These address books are not normally configured for direct access by the user. That is, the user does not normally have access to other user's address books such as the address books of the contacts in the user's address book (the user's address book is configured for direct access by the user). The other users' address books typically include communication identifiers selected by the other users.

The contacts in the user's contacts' address books (i.e., the contacts separated by one degree) then are added to the list of known people (808). If another degree of separation is desired (810), the degree of separation is incremented (812) such that the address books of the contacts that are separated from the user by one degree are accessed (806) and the contacts in those address books are added to the list of known people list (808). When a contact is added to the list of known people list, the contact's degree of separation from the user also may be added. The addition of contacts continues until the desired degree of separation is reached (810). Once the desired degree of separation has been reached, all of the contacts within that desired degree of separation from the user have been inferred as known to the user (814).

The desired degrees of separation may be a system parameter or, in some implementations, the user may be provided the user with the ability to set the desired degrees of separation. For example, the user may be provided with an interface that allows the user to decide whether degrees of separation will be used, and, if so, how many degrees should be used. Alternatively, the desired degrees of separation may be both a system parameter and able to be set by the user. For example, the system may include a default degrees of separation, which can be adjusted by the user if he or she so desires.

Process 800 may result in the list of known people not being updated when any users related to the intended user update their contact lists. That is, if a user related to the intended user adds a contact to the user's contact list, the new contact may not be reflected in the intended user's list of known people. This situation may not be overly detrimental, particularly in implementations where the list of known people is used as a white list to exempt certain e-mails from spam filtering. However, repeating process 800 on a periodic or aperiodic basis may mitigate this situation. Another manner of mitigating this situation is to use an update system in which changes to contact lists are tracked and lists of known people are updated accordingly in an incremental fashion or by triggering an update or re-initiation of process 800 when an update occurs.

Figure 9:
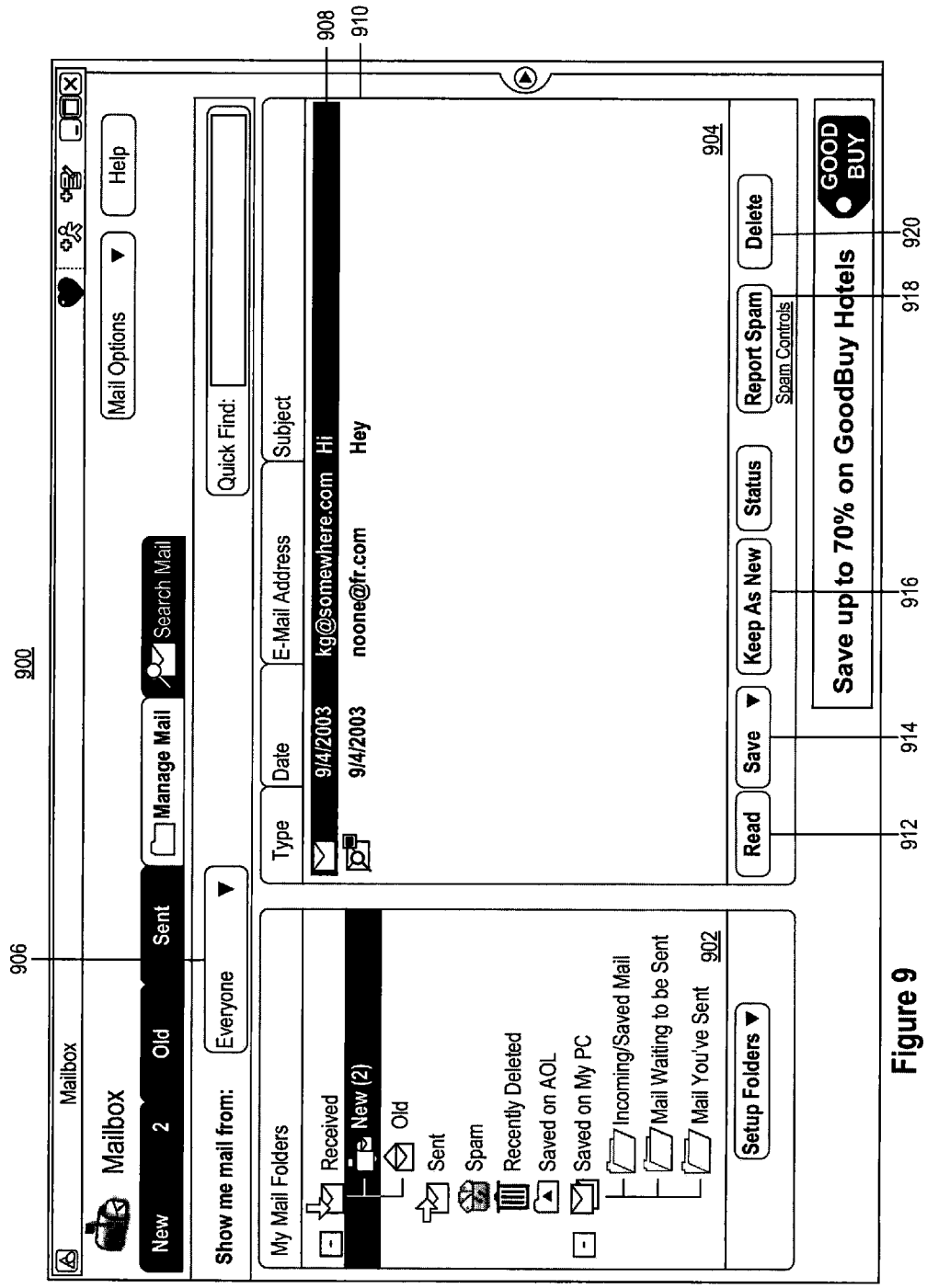
FIGS. 9, 10, and 11 are illustrations showing an interface for managing e-mail messages.

Referring to FIG. 9, using an e-mail managing interface 900 may result in additions to the list of known people. The actions of the user while interacting with the e-mail managing interface 900 may lead to the inference that certain people are known to the user. Conversely, the user may perform certain actions that signal that the user does not know certain people. If people are inferred as known to the user from these actions, the people are added to the list of known people.

Two main components of the e-mail managing interface 900 are the folder list 902 and the message list 904. The folder list 902 contains the different folders into which messages can be filed. When a folder is selected from the folder list 902, its contents are listed in the message list 904. In this case, the folder called "New" has been selected from the folder list 902, and its contents are listed in the message list 904. Drop down selection box 906 allows for the filtering of the messages shown in the message list 904 based on their sender. In this case, "Everyone" is chosen in the selection box 906, so all messages in the "New" folder are shown in the message list 904. These include a message 908 from kg@somewhere.com, and a message 910 from noone@fr.com, both sent on Sep. 4, 2003. Clicking and dragging a message from the message list 904 to the folder list 902 with the mouse files that message in the folder whose name is under the current position of the mouse, thus removing the message from the folder selected in the folder list 902.

A series of buttons below the message list 904 allow the user to work with the messages in the message list 904. For example, a "Read" button 912 will create an e-mail reading interface 600 for the message selected in the message list 904. Clicking on a "Save" button 914 will save the message selected in the message list 904, either to the hard drive of the local machine or to a remote server. A "Keep As New" button 916 will mark the selected message as never having been read. Clicking on a "Report Spam" button 918 will send a message to a service responsible for blocking spam messages with regards to the message selected in the message list 904. A "Delete" button 920 either immediately deletes the selected message or temporarily moves the selected message to a holding place for deleted messages.

The user's actions while using folders, messages, and buttons present in the e-mail managing interface 900 may result in the addition of people to the list of known people. Moving a message between the different folders of the folder list 902 may lead to the inference that the sender or recipients of the message are known. For example, dragging message 908 from the "New" folder to another folder, except for a spam or delete folder, may result in the inference that the sender of message is known to the user. Opening a message with the "Read" button 912 may support an inference that the sender of the message is known. Pressing the "Save" button 914 or the "Keep As New" button 916 also may result in the inference that the sender of the message is known to the user. On the other hand, use of the "Report Spain" button 918 and the "Delete" button 920 may negate an inference that the senders or recipients are known to the user. Similar to what was described above with respect to FIG. 6, individual actions or a combination of actions when using the e-mail managing interface 900 may lead to the inference that people are known to the user. Those people that are inferred to be known to the user are added to the list of known people after an optional confirmation by the user.

Figure 10:
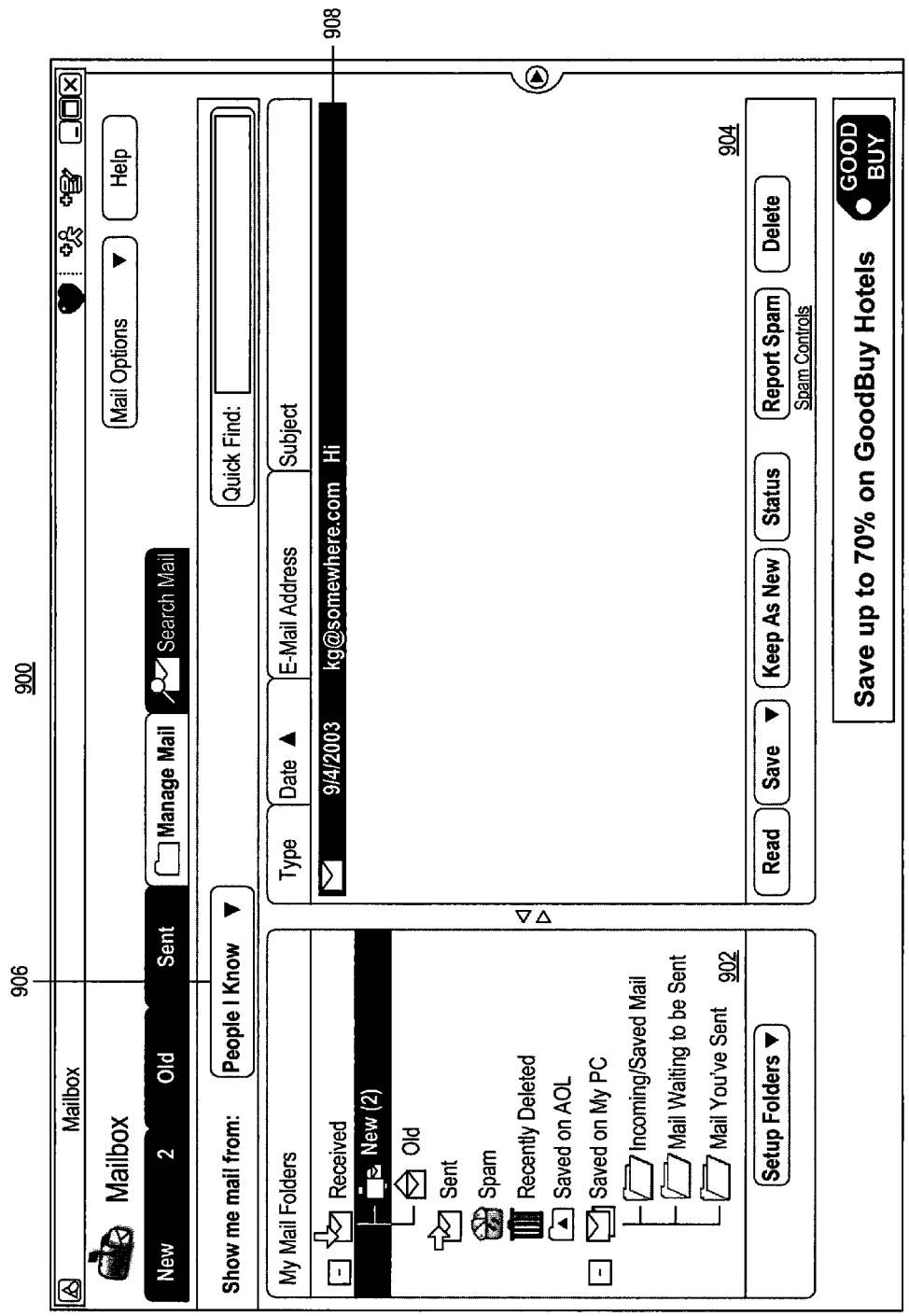
Figure 11:
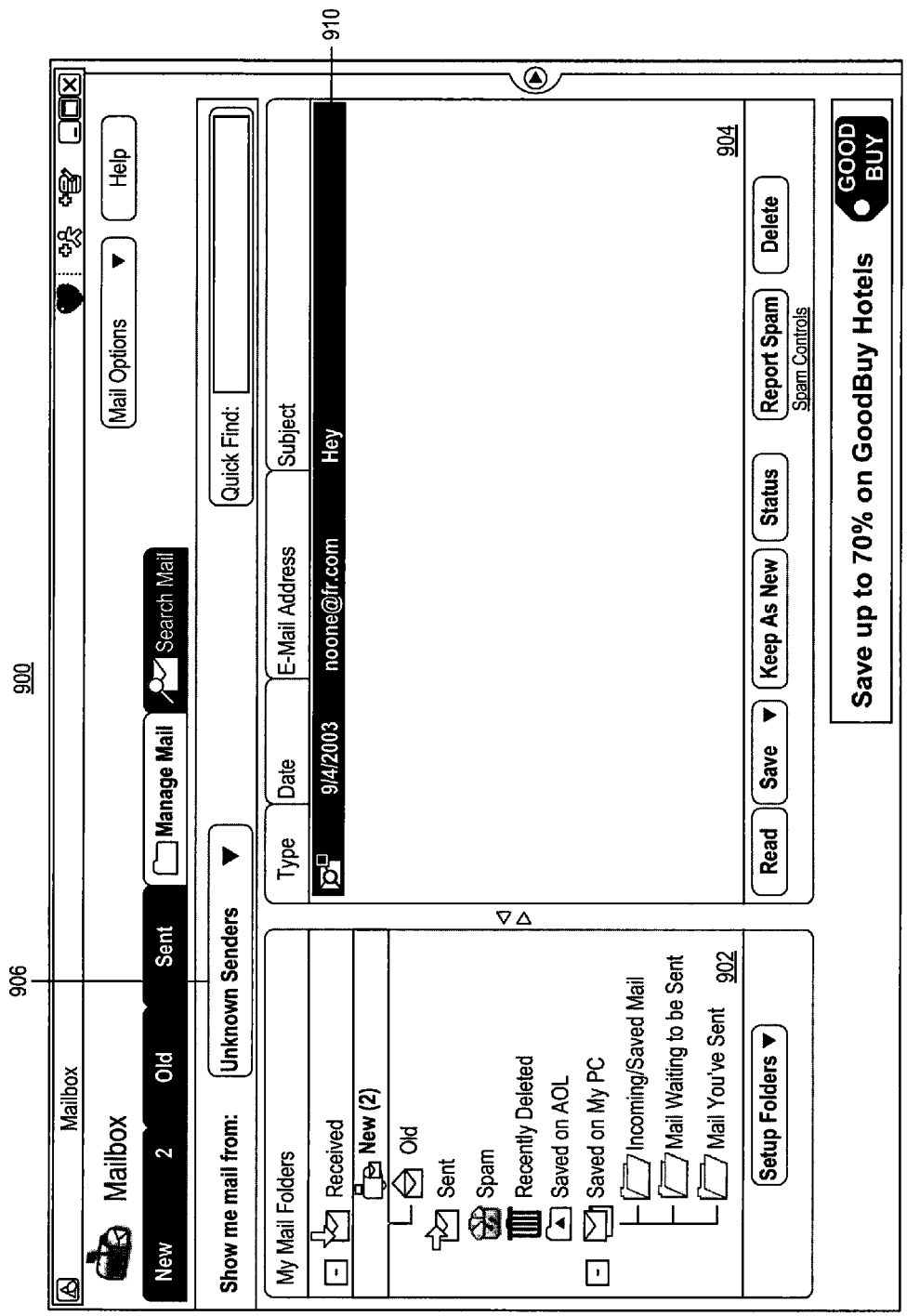

FIGS. 10-12 illustrate exemplary uses of the list of known people in controlling aspects of the user's communication. The list of known people can be used to control aspects of the user's communication using, for example, an e-mail or instant messaging client.

Referring to FIG. 10, the list of known people can be used to control the e-mail messages displayed on an e-mail managing interface 900. The e-mail managing interface 900 contains a folder list 902 into which messages can be filed. When a folder is selected from the folder list 902, its contents are listed in the message list 904. In this case, the folder called "New" has been selected from the folder list 902, and its contents are listed in the message list 904.

Drop down selection box 906 allows for the filtering of the messages shown in the message list 904 based on their sender. In this case, the option "People I Know" has been selected from the selection box 906. This causes the displayed messages to be filtered against the list of known people for the user. Messages from people that are in the list of known people are displayed in the message list 904, while messages from senders that are not in the list of known people do not appear in the message list 904.

For example, the message list 904 from FIG. 9, which also displayed the messages in the "New" folder, had two messages: message 908 from kg@somewhere.com and message 910 from noone@fr.com. The e-mail address kg@somewhere.com is in the list of known people for the user, while noone@fr.com is not. When "People I Know" is selected from the selection box 906, message 910 is filtered out from the set of messages shown to the user in the message list 904. The only message that is displayed is message 908 from kg@somewhere.com. Therefore, the list of known senders was used to limit the e-mail messages shown to the user to only those coming from people on the list.

Referring to FIG. 11, the list of known people can be used to control the e-mail messages displayed on an e-mail managing interface 900 in the opposite manner as was done with respect to FIG. 10. The e-mail managing interface contains a folder list 902 into which messages can be filed. When a folder is selected from the folder list 902, its contents are listed in the message list 904. In this case, the folder called "New" has been selected from the folder list 902, and its contents are listed in the message list 904.

Drop down selection box 906 allows for the filtering of the messages shown in the message list 904 based on their sender. In this case, the option "Unknown Senders" has been selected from the selection box 906. This causes the displayed messages to be filtered against the list of known people for the user in the opposite manner as was done with respect to FIG. 10. In other words, messages from people that are not in the list of known people are displayed in the message list 904, while messages from senders that are in the list of known people do not appear in the message list 904.

For example, the message list 904 from FIG. 9, which also showed the messages in the "New" folder, had two messages: message 908 from kg@somewhere.com and message 910 from noone@fr.com. The e-mail address kg@somewhere.com is in the list of known people, while noone@fr.com is not. When "Unknown Senders" is selected from the selection box 906, message 908 is filtered out from the set of messages shown to the user in the message list 904. The only message that is displayed is message 910 from noone@fr.com. Therefore, the list of known senders is used to limit the e-mail messages shown to the user to only those coming from people not on the list.

Referring to FIG. 12, an e-mail control interface 1200 enables further control over a user's e-mail messages based on the list of known people. The e-mail control interface contains a user selection box 1202. The user to which the controls specified in the e-mail control interface 1200 will apply is selected with user selection box 1202. A series of options 1204-1224 provide for different manners of filtering received e-mail.

Options 1204-1212 allow the user to define the senders from whom the selected user will receive e-mail. Option 1204 enables the user to receive e-mail from all senders. Selecting option 1204 will cause the selected user to receive e-mail from anyone, regardless of whether they appear on the list of known people. Option 1206 enables the user to receive e-mail only from America Online (AOL) members. Selecting option 1206 will cause the selected user to receive e-mail messages only from customers of the America Online internet service provider, while all other messages are blocked. Option 1208 enables the user to receive e-mail only from known people. Selecting option 1208 causes the selected user's e-mail to be filtered against the list of known people. Messages from people appearing on the list are accepted, while all other messages are blocked.

Option 1210 enables the user to block e-mail from all senders. Selecting this option 1210 will cause all of the e-mail messages addressed to the selected user to be blocked. Option 1212 enables the user to use a custom sender list to determine what mail is received. The custom sender list contains a white list and a black list. Messages from those people appearing on the white list are shown to the user, while messages from people appearing on the black list are blocked from the user. Options 1204-1212 may be mutually exclusive.

Option 1214 enables blocking any e-mail messages containing pictures or files. Selection of option 1214 causes all messages containing pictures or files to be blocked. Options 1216 and 1218 allow the user to define what happens to blocked messages. Option 1216 enables permanently deleting blocked messages. Selecting option 1216 causes all blocked messages to be deleted immediately, leaving no opportunity for the user to view them. Option 1218 enables delivery of blocked messages to a folder designated for spam. Selecting option 1218 causes blocked messages to be placed in the folder designated for spam. The user has the option of viewing these messages after they have been placed in the spam folder. A third option (not shown) may cause the blocked messages to be maintained in a temporary holding folder. The messages stored in the temporary holding folder may be deleted after a certain amount of time that may be selected by the user. Options 1216, 1218, and the third option are mutually exclusive.

Options 1220-1224 control what mail is received by the user selected in the selection box 1202. Option 1220 enables filtering of the incoming e-mail messages with a spam filter. Selecting this option 1220 will cause a user's e-mail messages to be filtered based on whether or not the messages are spam messages or not. The list of known people may be used by the spam filter when determining if a message is a spam message. For example, the spam filter could use the list of known people as a white list when determining which messages to keep. Messages from people on the white list may be accepted, while messages from people that are not on the list are rejected. Alternatively, the white list may be used to exempt communications from people on the white list from spam filtering, while communications from people not on the white list are subjected to spam filtering. As another example, the spam filter could use the list of known people to assign a spam score to incoming messages. Messages from people that are not on the list of known people may receive a higher spam score than those messages from people on the list. Those messages that are determined to be spam are delivered to the user's spam mailbox, and those messages that are not spam are delivered to the user's main mailbox.

Option 1222 enables filtering the incoming e-mail messages based on whether they contain one or more clickable hyperlinks or uniform resource locators (URLs). If this option 1222 is selected, messages with clickable URLs are delivered to the user's spam folder, and those messages that do not are delivered to the user's main mailbox. A second option (not shown) for handling messages with clickable URLs enables delivering messages with URLs directed to inappropriate or parentally controlled content to the user's spam folder and delivering all other messages to the user's main mailbox. Option 1224 enables filtering of the user's incoming e-mail messages based on whether they contain any of the words contained in a custom word list. If this option 1224 is selected, messages that contain words from the custom word list are delivered to the user's spam folder, and those messages that do not are delivered to the user's main mailbox.

The list of known people may be used in conjunction with the filtering performed by options 1222 and 1224 by exempting messages from known people from these controls. In other words, messages meeting the criteria indicated by options 1222 and 1224, when selected, may be sent to a spam folder, except for when the sender of the message is on the known list. For example, a message with a URL may be received. Normally, when option 1222 is selected, the message with the URL is place in a spam folder. When the message with the URL is from a known person, however, the message is not sent to the spam folder, but rather is delivered as normal.

A save button 1226 and a cancel button 1228 are also present on the e-mail control interface 1200. The save button 1226 saves any changes made to the options 1204-1224 for the user selected in the selection box 1202, while the cancel button 1228 discards any changes that have been made and restores the options to their previous settings.

In addition to the uses of the list of known people discussed with respect to FIGS. 10-12, there are other uses related to a user's communications with an instant messaging client. For example, the IM screen names of known people may be used to restrict instant messages or chat requests to only those people who the user knows. The IM screen names of known people also may be used to restrict who can view presence information of the user to those people the user knows. That is, other users may be restricted from viewing whether the user is online (i.e., logged into the IM system) unless the other users are people the user knows. Referring again to FIG. 5, presence information for "randomcontact2" is shown because "InternetAnn" is on the list of known people for "randomcontact2." Other people that do not have "InternetAnn" on their list of known people do not appear in the buddy list interface 500 because "InternetAnn" is restricted from viewing their presence information.

Figure 13:
FIGS. 13-15 are illustrations showing environments in which online presence information can be restricted using the list of known people.
Figure 14:
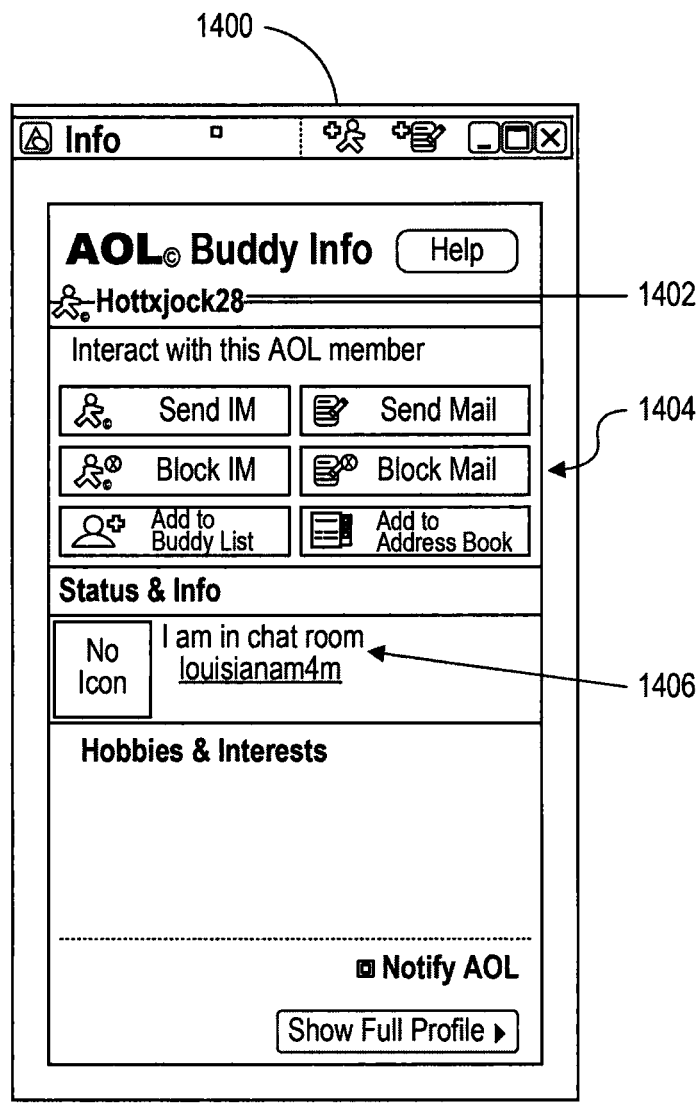
Figure 15:
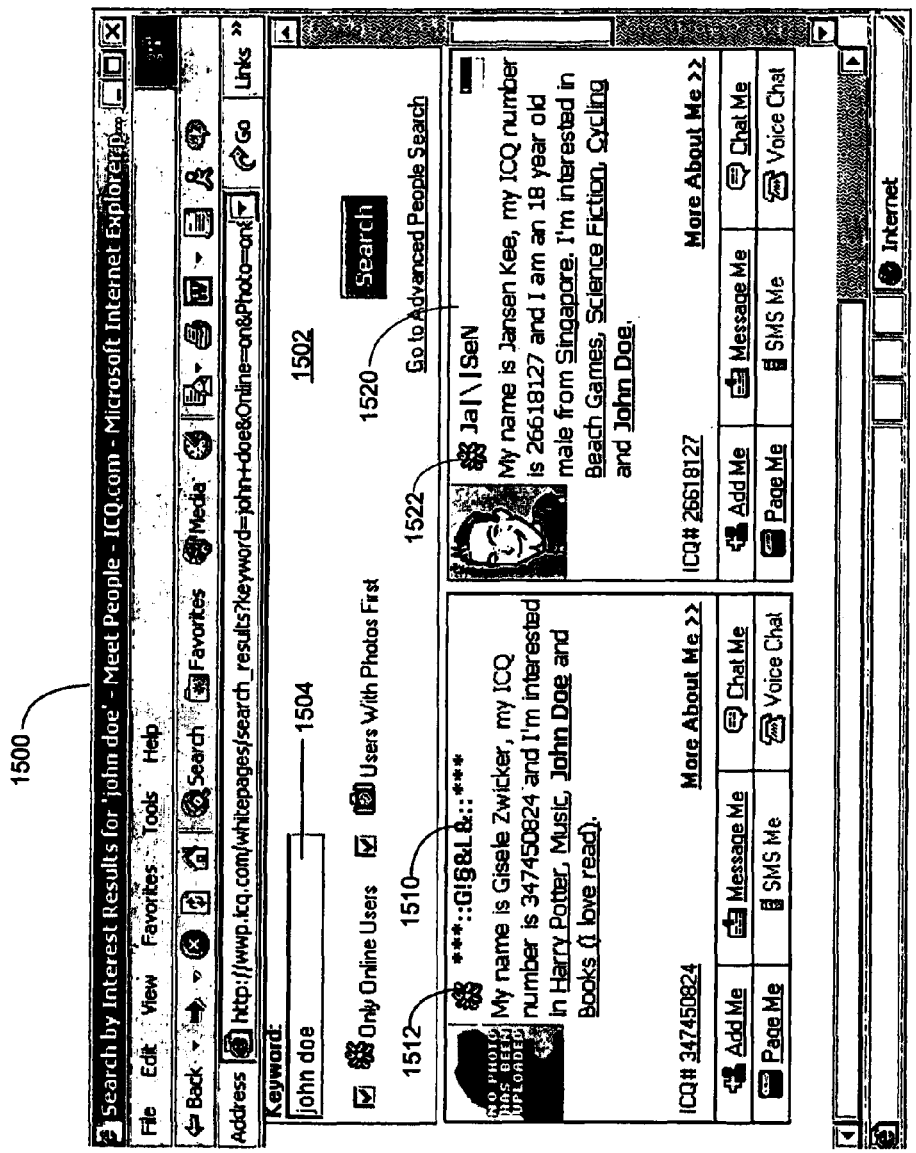

The list of known people also may be used to restrict displays of online presence information more generally. FIGS. 13, 14 and 15 show additional environments in which online presence information can be restricted using the list of known people.

Referring to FIG. 13, some services, such as America Online, allow users to search for other members. The list of members matching the users search criteria includes indications as to whether a member is online. As shown, an interface 1300 includes a window 1310 that displays search results for a person's search criteria (e.g., members who have John Doe somewhere in their profile). The search results include a list of members matching the search criteria. The results include the screen name, the member name, and the location of each member matching the criteria. An icon 1314 provides online presence information. Icon 1314 is displayed in window 1310 next to members who are currently online.

Referring to FIG. 14, some services such as America Online display online presence information in a user's member profile. A user's member profile may be displayed as the result of selecting a member from search results such as those shown in FIG. 13, or, for example, the member profile may be invoked by a user when the user comes across a screen name while using a communication service such chat or message boards. Other manners manner of invoking the member profile may be available depending on the service.

When a user invokes another user's member profile, an interface 1400 is provided. The interface includes the screen name 1402 of the user whose profile is being shown. Interface 1400 also includes a number of buttons 1404 that allow the invoking user to interact with the user whose profile is being shown. Interface 1400 also has an area 1406 that provides online presence information. In the exemplary profile illustrated, the member is currently online an in the chat room "louisianam4m." Area 1406 indicates that the member is not online when the member is not online.

Referring to FIG. 15, some instant messaging and other online services provide web pages that display online presence information. As shown, a web browser 1500 displays a search page 1502 for ICQ in which a person can search profiles of ICQ users. Profiles 1510 and 1520 are shown as a result of a search using the criteria "John Doe" anywhere in the profile. Icons 1512 and 1522, which are part of profiles 1510 and 1520 respectively, provide online presence information. Icons 1512 and 1522 are shown in one color when the user is online and in a different color when the user is not online.

In any of these environments, the online presence information may be restricted based on the list of known people. The online presence information may be restricted such that only some or all of the people known to a user may view the user's online presence information. For instance, icon 1314 may be absent when the person viewing the search results is not a person known to the user whose screen name is "Hotxjock28." Likewise, area 1406 may not provide any online presence information when the person viewing the profile is not known to the user whose screen name is "Hotxjock28." Lastly, icon 1512 or 1522 may indicate the user is not online, or indicate that the online presence information is unavailable, when the person viewing the profile 1510 or 1520 is not known to the user whose profile information is shown.

Further, the online presence information may be restricted or not provided to a potential receiver of the online presence information when the potential receiver requests the online presence information through an application such as an instant messaging application, or by virtue of displaying a web page, member profile, or member search result. In some environments that provide online presence information, the information may be provided in response to a request to receive the online presence information. In such environments, when the request is received, a determination as to whether the online presence information is communicated may be based on whether the potential receiver is included in the list of known people. The online presence information may be restricted or not provided to the potential receiver when the potential receiver is not included in the list.

In other implementations, the online presence information may be restricted or not provided to a potential receiver of the online presence information absent a request for the online presence information. In some environments, online presence information may be broadcast generally to users. Certain users may be excluded from the broadcast of online presence information when those users are not on the list of people known to the user.

Another use of the list of known people may include filtering out communications with questionable content sent to teens or younger individuals when the communication is from someone unknown to the teen or younger individual. Many times, inappropriate (e.g., pornographic) communications such as e-mail is sent to teens or younger individuals. There may be certain indicia that a communication is inappropriate, or that it may lead to inappropriate content.

One such indicia, for instance, is the presence of a Uniform Resource Locator (URL) located in the body of an e-mail. Other indicia may include certain words or phrases, such as vulgar or lewd words, included in the communication. Such indicia may be a stronger indicator that the communication is inappropriate when the e-mail is from someone unknown to the teen or young adult.

Some Internet Service Providers (ISPs), e.g. America Online, Inc. (AOL), allow a master account owner to designate associated accounts as teen or child accounts. Indicia of inappropriate communications, along with the list of known people, can be used to filter out potentially inappropriate content sent to a teen or child account.

Figure 16:
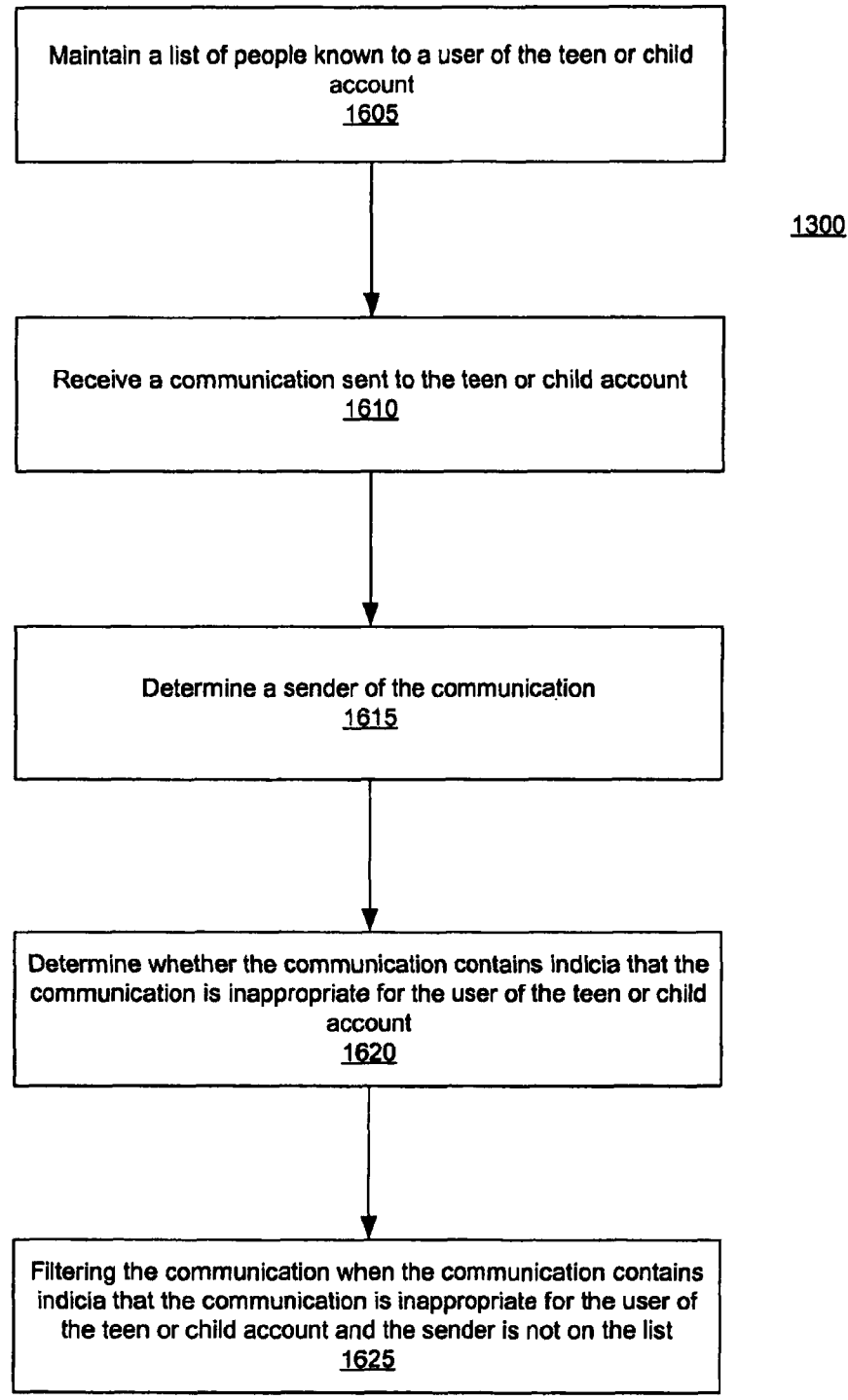
FIG. 16 is a flow chart showing a process for filtering communications sent to a teen or child account.

FIG. 16 is a flow chart showing a process 1600 for filtering communications sent to a teen or child account. A list of people known to the user of the teen or child account is maintained for example, using the techniques described above (1605). When a communication sent to the teen or child account is received (1610), the sender of the communication is determined (1615). The communication may include, for example, an e-mail or an instant message.

A determination also is made as to whether the communication contains indicia that the communication is inappropriate for the user of the teen or child account (1620). As described above, such indicia may include a URL located in the body of the communication and/or certain words being included in the body of the communication.

When the communication contains such indicia and the sender is not on the list of known people, the communication is filtered (1625). Filtering may include blocking or deleting the communication. Alternatively, or additionally, filtering may include placing the communication in a secured place that the master account owner can access, but the teen or child user can not. For example, the communications may be placed in a secure spam folder. The spam folder may be secured, for example, by preventing the teen or child account user from seeing the folder or by password protecting the folder.

Thus, for example, emails that contain URLs or certain words or phrases and that are sent to a teen or child account by someone not known to the teen or child (i.e., someone not on the list of known people) may be automatically deleted or blocked. Alternatively, such e-mails may be sent to a spam folder. When the spam folder is designed to be locked from teens or younger adults (e.g., by preventing them from seeing the folder or requiring a password to access the folder), this can potentially prevent them from being exposed to inappropriate content.

The techniques described above are not limited to any particular hardware or software configuration. Rather, they may be implemented using hardware, software, or a combination of both. The methods and processes described may be implemented as computer programs that are executed on programmable computers comprising at least one processor and at least one data storage system. The programs may be implemented in a high-level programming language and may also be implemented in assembly or other lower level languages, if desired.

Any such program will typically be stored on a computer-usable storage medium or device (e.g., CD-Rom, RAM, or magnetic disk). When read into the processor of the computer and executed, the instructions of the program cause the programmable computer to carry out the various operations described above.

A number of implementations have been described. Nevertheless, it will be understood that various modifications may be made. Accordingly, implementations other than those specifically described are within the scope of the following claims.

What is claimed is:

1. A method comprising:
    associating a score with each of a plurality of different actions that are possible to perform using a communication system, the score for a respective action of the plurality of different actions being indicative of how strongly the respective action suggests that users of the communication system associated with the respective action know each other;
    detecting, by at least one processor, actions on the communication system of a first user of the communications system with respect to a second user of the communication system and a third user of the communication system;
    identifying scores associated with the detected actions on the communication system: of the first user with respect to the second user and of the first user with respect to the third user, the identified scores comprising at least two different scores;
    determining, by the at least one processor, a first relationship score between the first user and the second user that indicates how strongly the first user and second user know each other within the communication system by aggregating the identified scores associated with the detected actions of the first user with respect to the second user on the communication system; and
    determining, by the at least one processor, a second relationship score between the first user and the third user that indicates how strongly the first user and third user know each other within the communication system by aggregating the identified scores associated with the detected actions of the first user with respect to the third user on the communication system.

2. The method as recited in claim 1, further comprising:
    receiving one or more electronic messages directed toward the first user from the second user; and
    presenting, to the first user, the one or more electronic messages from the second user based on the first relationship score between the first user and the second user being above a predetermined threshold score.

3. The method as recited in claim 2, further comprising:
    receiving one or more electronic messages directed toward the first user from the third user; and
    preventing presentation, to the first user, of the one or more electronic messages from the third user based on the second relationship score between the first user and the third user being below the predetermined threshold score.

4. The method as recited in claim 1, further comprising displaying information in an online profile for the second user available to the first user based on the first relationship score being above a predetermined threshold score.

5. The method as recited in claim 4, further comprising:
    detecting, by the least one processor, actions on the communication system of the first user of the communications system with respect to a third user of the communication system;
    identifying scores associated with the detected actions on the communication system of the first user with respect to the third user, the identified scores comprising at least two different scores;
    determining, by the at least one processor, a second relationship score between the first user and the third user that indicates how strongly the first user and third user know each other within the communication system by aggregating the identified scores associated with the detected actions of the first user with respect to the third user on the communication system; and preventing the display of information in an online profile for the third user to the first user based on the second relationship score being below the predetermined threshold score.

6. The method as recited in claim 1, wherein the scores associated with the plurality of different actions that are possible to perform using the communication system comprise positive scores associated with actions on the communication system that infer that the first and second users of the communication system know each other.

7. The method as recited in claim 6, wherein the actions on the communication system that infer that the first and second users of the communication system know each other comprise one or more of opening a message, replying to a message, adding the second user to a list of known co-users, saving a message, sharing a message, or leaving a message open for a predetermined amount of time.

8. The method as recited in claim 6, wherein the scores associated with the plurality of different actions that are possible to perform using the communication system comprise negative scores associated with actions on the communication system that negate an inference that the first and second users of the communication system know each other.

9. The method as recited in claim 8, wherein the actions on the communication system that negate an inference that the first and second users of the communication system know each other comprise one or more of deleting a message, reporting a message as spam, blocking a co-user, or ignoring a message.

10. The method as recited in claim 8, further comprising determining that the first relationship score is greater than the second relationship score.

11. The method as recited in claim 10, further comprising more prominently displaying messages from the second user than messages from the third user based on the determination that the first relationship score is greater than the second relationship score.

12. The method as recited in claim 8, further comprising determining an order of messages from the second and third users based on the first and second relationship scores.

13. The method as recited in claim 8, further comprising filtering messages from the second and third users based on the first and second relationship scores.

14. A communication system comprising:
at least one server;
a non-transitory storage medium comprising instructions, that when executed by the at least one server, cause the communication system to:
associate a score with each of a plurality of different actions that are possible to perform using the communication system, the score for a respective action of the plurality of different actions being indicative of how strongly the respective action suggests that users of the communication system associated with the respective action know each other;
detect actions on the communication system of a first user of the communication system with respect to a second user of the communication system and a third user of the communication system;
identify scores associated with the detected actions on the communication system: of the first user with respect to the second user and of the first user with respect to the third user, the identified scores comprising at least two different scores;
determine a first relationship score between the first user and the second user that indicates how strongly the first user and the second user know each other by aggregating the identified at least two different scores associated with the detected actions of the first user with respect to the second user on the communication system; and
determine a second relationship score between the first user and the third user that indicates how strongly the first user and third user know each other within the communication system by aggregating the identified scores associated with the detected actions of the first user with respect to the third user on the communication system.

15. The communication system as recited in claim 14, wherein the scores associated with the plurality of different actions that are possible to perform using the communication system comprise positive scores associated with actions on the communication system that infer that the first and second users of the communication system know each other.

16. The communication system as recited in claim 15, wherein the actions on the communication system that infer that the first and second users of the communication system know each other comprise one or more of opening a message, replying to a message, adding the second user to a list of known co-users, saving a message, sharing a message, or leaving a message open for a predetermined amount of time.

17. The communication system as recited in claim 16, wherein the scores associated with the plurality of different actions that are possible to perform using the communication system comprise negative scores associated with actions on the communication system that negate an inference that the first and second users of the communication system know each other.

18. The communication system as recited in claim 17, wherein the actions on the communication system that negate an inference that the first and second users of the communication system know each other comprise one or more of deleting a message, reporting a message as spam, blocking a co-user, or ignoring a message.

19. The communication system as recited in claim 18, wherein the instructions, when executed by the at least one server, cause the communication system to present one or more electronic messages from the second user to the first user based on the first relationship score being above a predetermined threshold score.

20. The communication system as recited in claim 19, wherein the instructions, when executed by the at least one server, cause the communication system to:
prevent presentation of one or more electronic messages from the third user to the first user based on the second relationship score between the first user and the third user being below the predetermined threshold score.

21. The communication system as recited in claim 20, wherein the instructions, when executed by the at least one server, cause the communication system to display information in an online profile for the second user to the first user based on the first relationship score being above a predetermined threshold score.

22. The communication system as recited in claim 21, wherein the instructions, when executed by the at least one server, cause the communication system to determine which of the first relationship score and the second relationship score is greater.

23. The communication system as recited in claim 22, wherein the instructions, when executed by the at least one server, cause the communication system to more prominently display messages from the second user than messages from the third user if the first relationship score is greater than the second relationship score.

24. The communication system as recited in claim 21, wherein the instructions, when executed by the at least one server, cause the communication system to determine an order of messages from the second and third users based on the first and second relationship scores.

25. The communication system as recited in claim 24, wherein the instructions, when executed by the at least one server, cause the communication system to filter messages from the second and third users based on the first and second relationship scores.

26. A non-transitory computer-readable medium storing instructions, that when executed by at least one processor, cause a computing device to perform steps comprising:
  associating a score with each of a plurality of different actions that are possible to perform using a communication system, the score for a respective action of the plurality of different actions being indicative of how strongly the respective action suggests that users of the communication system associated with the respective action know each other;
  detecting actions on the communication system by a user of the communication system with respect to a second user of the communication system and a third user of the communication system;
  identifying scores associated with the detected actions: of the first user with respect to the second user and of the first user with respect to the third user, the identified scores comprising at least two different scores;
  determining a first relationship score between the first user and the second user that indicates how strongly the first user and second user know each other within the communication system by aggregating the identified at least two different scores associated with the detected actions of the first user with respect to the second user on the communications system; and
  determining a second relationship score between the first user and the third user that indicates how strongly the first user and third user know each other within the communication system by aggregating the identified scores associated with the detected actions of the first user with respect to the third user on the communication system.

27. The non-transitory computer-readable medium as recited in claim 26, wherein the steps further comprise prominently displaying electronic messages from the second user when the first relationship score between the first user and the second user is above a threshold score.

28. The non-transitory computer-readable medium as recited in claim 27, wherein prominently displaying electronic messages comprises bolding the electronic messages.

29. The non-transitory computer-readable medium as recited in claim 27, wherein prominently displaying electronic messages comprises grouping electronic messages in a first portion of a user interface.

30. The non-transitory computer-readable medium as recited in claim 29, wherein the steps further comprise:
  grouping electronic messages from the third user in a second portion of the user interface based on the second relationship score between the first user and the third user being below the threshold score.

31. The non-transitory computer-readable medium as recited in claim 26, wherein the steps further comprise determining an order of display of electronic messages based on determining relationship scores of users who composed the electronic messages.

32. The non-transitory computer-readable medium as recited in claim 26, wherein the steps further comprise presenting electronic messages from co-users with relationship scores above a predetermined threshold score.

33. The non-transitory computer-readable medium as recited in claim 32, wherein the steps further comprise preventing presentation of electronic messages from co-users with relationship scores below the predetermined threshold score.

34. The non-transitory computer-readable medium as recited in claim 26, wherein the steps further comprise determining the first relationship score by adding positive scores associated with determined positive actions on the communications system.

35. The non-transitory computer-readable medium as recited in claim 34, wherein the positive actions on the communication system comprise one or more of opening a message, replying to a message, adding the second user to a list of known co-users, saving a message, sharing a message, or leaving a message open for a predetermined amount of time.

36. The non-transitory computer-readable medium as recited in claim 34, wherein the steps further comprise determining the relationship score by subtracting scores associated with determined negative actions on the communication system.

37. The non-transitory computer-readable medium as recited in claim 36, wherein the negative actions on the communication system comprise one or more of deleting a message, reporting a message as spam, blocking a co-user, or ignoring a message.

38. The non-transitory computer-readable medium as recited in claim 26, wherein the steps further comprise presenting presence information of co-users with relationship scores above a predetermined threshold score.

39. The non-transitory computer-readable medium as recited in claim 38, wherein the steps further comprise restricting presentation of presence information of co-users with relationship scores below the predetermined threshold score.

40. The non-transitory computer-readable medium as recited in claim 27, wherein the electronic messages from the second user comprise instant messages.

* * * * *